United States Patent
Choi et al.

(10) Patent No.: US 11,974,263 B2
(45) Date of Patent: Apr. 30, 2024

(54) METHOD OF USING ORBITAL ANGULAR MOMENTUM IN A WIRELESS COMMUNICATION SYSTEM AND APPARATUS THEREFOR

(71) Applicant: LG ELECTRONICS INC., Seoul (KR)

(72) Inventors: Kukheon Choi, Seoul (KR); Jaehoon Chung, Seoul (KR); Ilnam Cho, Seoul (KR); Kangjae Jung, Seoul (KR); Byeongyong Park, Seoul (KR); Uisheon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 351 days.

(21) Appl. No.: 17/476,745

(22) Filed: Sep. 16, 2021

(65) Prior Publication Data

US 2022/0078780 A1 Mar. 10, 2022

(30) Foreign Application Priority Data

Jul. 16, 2020 (KR) .................... 10-2020-0088507

(51) Int. Cl.
*H04W 72/044* (2023.01)
*H04B 7/0456* (2017.01)
*H04B 7/10* (2017.01)
*H04W 24/02* (2009.01)

(52) U.S. Cl.
CPC ........ *H04W 72/046* (2013.01); *H04B 7/0456* (2013.01); *H04B 7/10* (2013.01); *H04W 24/02* (2013.01)

(58) Field of Classification Search
CPC ........... H04W 74/0841; H04W 74/006; H04W 80/02; H04W 74/0833; H04L 5/0053
See application file for complete search history.

(56) References Cited

U.S. PATENT DOCUMENTS

| 2020/0228195 A1* | 7/2020 | Sasaki | H04B 7/0469 |
| 2023/0093039 A1* | 3/2023 | Lv | H04L 5/00 370/330 |
| 2023/0096819 A1* | 3/2023 | Ni | H04B 7/0639 343/702 |
| 2023/0171056 A1* | 6/2023 | Huang | H04L 5/0048 370/328 |

* cited by examiner

*Primary Examiner* — Habte Mered
(74) *Attorney, Agent, or Firm* — Fish & Richardson P.C.

(57) ABSTRACT

The present disclosure proposes a method using orbital angular momentum (OAM) and an apparatus therefor. The method performed by a UE may include receiving, from a base station, information for an OAM state set, wherein the OAM state set includes multiple OAM state subsets, and each of the multiple OAM state subsets includes one or two or more OAM states, receiving at least one OAM beam from the base station, determining a detectable at least one OAM state based on the at least one OAM beam, and transmitting, to the base station, information for an OAM state subset including the at least one OAM state within the OAM state set.

20 Claims, 27 Drawing Sheets

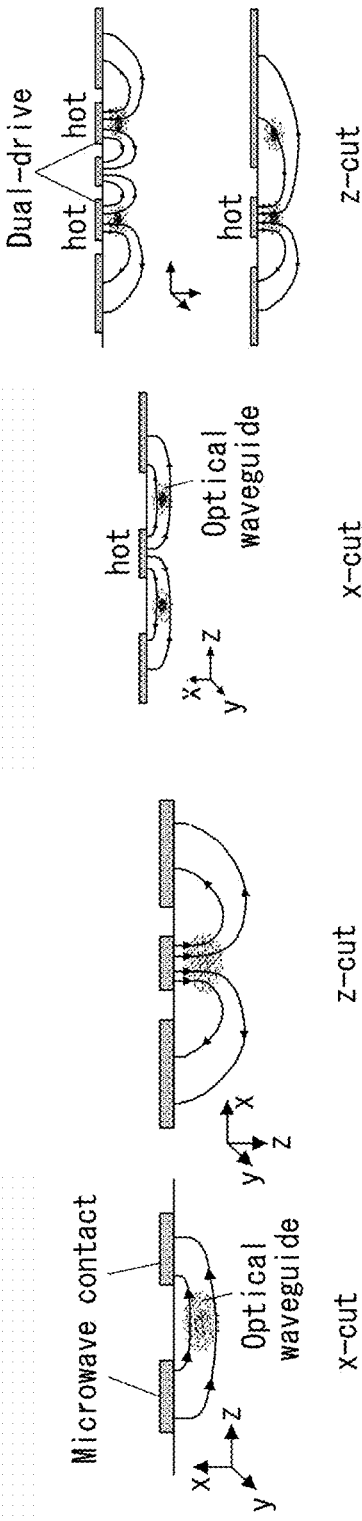
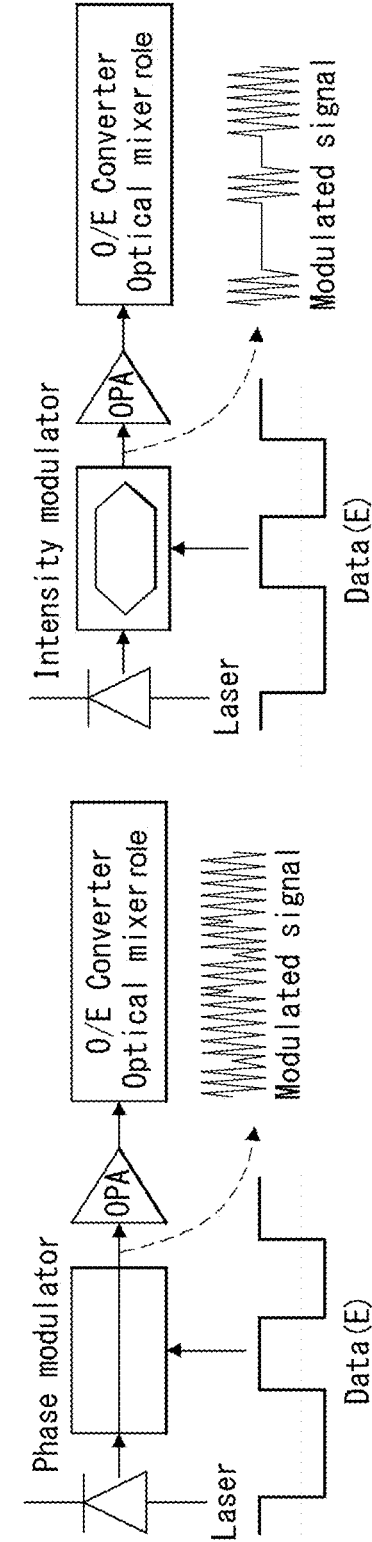
FIG. 16A
FIG. 16B
FIG. 16C
FIG. 16D

FIG. 23
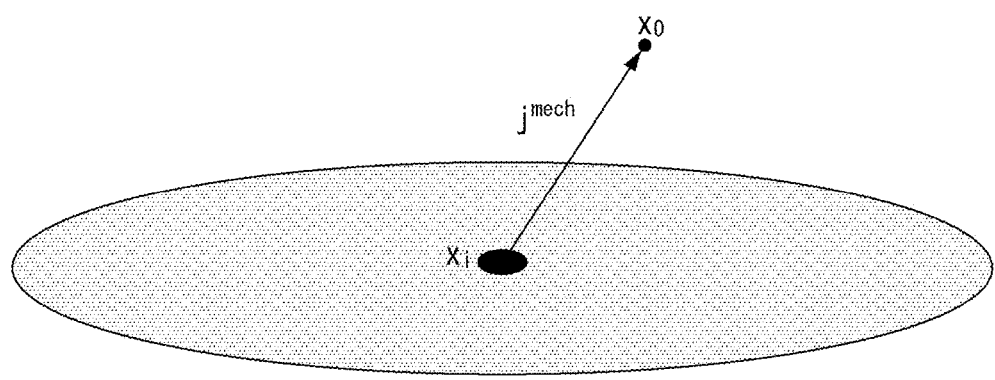
FIG. 24A        FIG. 24B        FIG. 24C        FIG. 24D
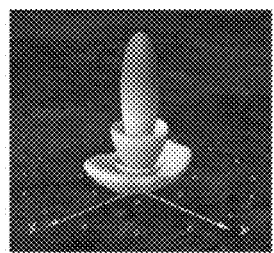 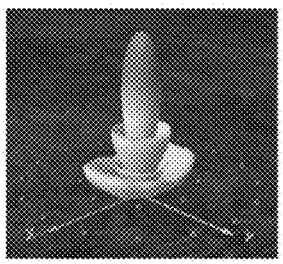 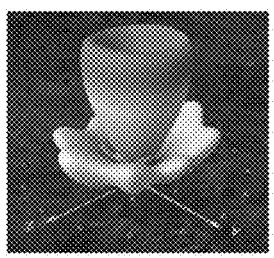 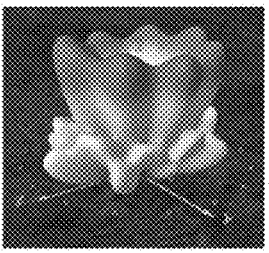
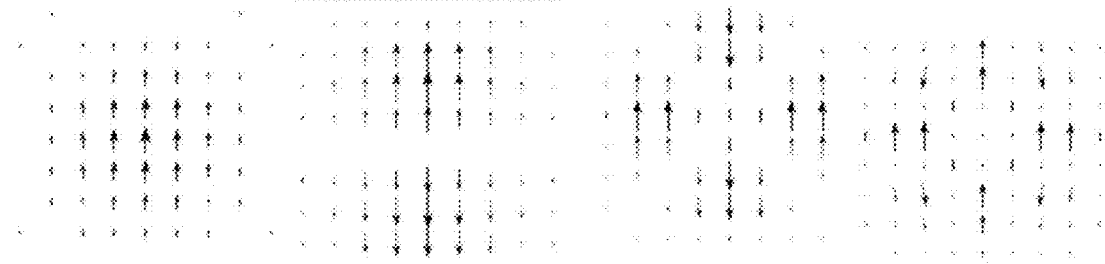

METHOD OF USING ORBITAL ANGULAR MOMENTUM IN A WIRELESS COMMUNICATION SYSTEM AND APPARATUS THEREFOR

CROSS-REFERENCE TO RELATED APPLICATION

The present application claims the benefit of an earlier filing date and right of priority to Application No. 10-2020-0088507 filed on 16 Jul. 2020 in Korea, the contents of which are hereby incorporated by reference in its entirety.

BACKGROUND OF THE DISCLOSURE

Field of the Disclosure

The present disclosure relates to a wireless communication system, and, more particularly, to a method using orbital angular momentum (OAM) and an apparatus therefor.

Related Art

A mobile communication system has been developed to provide a voice service while ensuring an activity of a user. However, in the mobile communication system, not only a voice, but also a data service is extended. At present, there is the shortage of resources due to an explosive increase in traffic, and users demand a higher speed service. As a result, a more developed mobile communication system is required.

Requirements for a next-generation mobile communication system should be able to support the acceptance of explosive data traffic, a dramatic increase in the data rate per user, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

SUMMARY

Furthermore, the present disclosure proposes a method of transmitting a detectable OAM state and an apparatus therefor.

Furthermore, the present disclosure proposes a method of applying a precoding matrix (or codebook) to OAM and an apparatus therefor.

Technical objects to be achieved in the disclosure are not limited to the aforementioned technical objects, and other technical objects not described above may be evidently understood by a person having ordinary skill in the art to which the disclosure pertains from the following description.

In an aspect, the present disclosure proposes a method of transmitting a detectable orbital angular momentum (OAM) state in a wireless communication system and an apparatus therefor.

The method performed by a UE may include receiving, from a base station, information for an OAM state set, wherein the OAM state set includes multiple OAM state subsets, and each of the multiple OAM state subsets includes one or two or more OAM states, receiving at least one OAM beam from the base station, determining a detectable at least one OAM state based on the at least one OAM beam, and transmitting, to the base station, information for an OAM state subset including the at least one OAM state within the OAM state set.

Furthermore, in the method of the present disclosure, the information for the OAM state set may be received through a higher layer signal, a medium access control-control element (MAC-CE), or downlink control information.

Furthermore, in the method of the present disclosure, the at least one OAM state may be determined based on an OAM component, received energy, and a frequency of the at least one OAM beam.

Furthermore, in the method of the present disclosure, the OAM state may be an orthogonal OAM state.

Furthermore, in the method of the present disclosure, an antenna array of the base station may be an antenna array forming a right-hand circular polarized beam.

Furthermore, in the method of the present disclosure, the right-hand circular polarized beam may be a beam having spin angular momentum (SAM)=−1.

Furthermore, in the method of the present disclosure, an antenna array of the base station may be an a×b array by r ring arrays.

Furthermore, in the method of the present disclosure, wherein the a×b array by r ring arrays may be based on a type-1 codebook $[v_{l,m}\varphi_n]_{32\times 1}$, and $$v_{l,m} = \begin{bmatrix} e_{1,m}I_{8\times 8} \\ e_{2,m}I_{8\times 8} \\ e_{3,m}I_{8\times 8} \\ e_{4,m}I_{8\times 8} \end{bmatrix}_{32\times 8},$$

$$\varphi_n = \begin{bmatrix} 1 \\ e^{j1\frac{2\pi\theta}{N}} \\ e^{j2l\frac{2\pi\theta}{N}} \\ e^{j3l\frac{2\pi\theta}{N}} \\ e^{j4l\frac{2\pi\theta}{N}} \\ e^{j5l\frac{2\pi\theta}{N}} \\ e^{j6l\frac{2\pi\theta}{N}} \\ e^{j7l\frac{2\pi\theta}{N}} \end{bmatrix}_{8\times 1},$$

$e_{k,m}$ may be an m-th beamforming element of k-th ring array ports, l may be an OAM state, ϑ may be an angle between adjacent elements based on a center of a single ring array, N may be a maximum number of OAM states, and I may be an identity matrix.

Furthermore, in the method of the present disclosure, an antenna array of the base station may be an r ring array by a×b arrays.

Furthermore, in the method of the present disclosure, the r ring array by a×b arrays may be based on a type-1 codebook $[\varphi_n v_{l,m}]_{32\times 1}$, and $$\varphi_n = \begin{bmatrix} 1 \cdot I_{4\times 4} \\ e^{j1\frac{2\pi\theta}{N}} I_{4\times 4} \\ e^{j2l\frac{2\pi\theta}{N}} I_{4\times 4} \\ e^{j3l\frac{2\pi\theta}{N}} I_{4\times 4} \\ e^{j4l\frac{2\pi\theta}{N}} I_{4\times 4} \\ e^{j5l\frac{2\pi\theta}{N}} I_{4\times 4} \\ e^{j6l\frac{2\pi\theta}{N}} I_{4\times 4} \\ e^{j7l\frac{2\pi\theta}{N}} I_{4\times 4} \end{bmatrix}_{32\times 4},$$

$$v_{l,m} = \begin{bmatrix} e_{1,m} \\ e_{2,m} \\ e_{3,m} \\ e_{4,m} \end{bmatrix}_{4\times 1},$$

$e_{k,m}$ may be an m-th beamforming element of k-th a×b array ports, I may be an OAM state, ϑ may be an angle between adjacent a×b arrays based on a center of a ring array, N may be a maximum number of OAM states, and I may be an identity matrix.

Furthermore, in an aspect, a user equipment (UE) configured to transmit a detectable orbital angular momentum (OAM) state in a wireless communication system may include at least one transceiver, at least one processor, and at least one memory operably connectable to the at least one processor and storing instructions that, based on being executed by the at least one processor, perform operations. The operations may include receiving, from a base station, information for an OAM state set, wherein the OAM state set includes multiple OAM state subsets, and each of the multiple OAM state subsets includes one or two or more OAM states, receiving at least one OAM beam from the base station, determining a detectable at least one OAM state based on the at least one OAM beam, and transmitting, to the base station, information for an OAM state subset including the at least one OAM state within the OAM state set.

Furthermore, in the UE of the present disclosure, the at least one OAM state may be determined based on an OAM component, received energy, and a frequency of the at least one OAM beam.

Furthermore, in the UE of the present disclosure, an antenna array of the base station may be an antenna array forming a right-hand circular polarized beam.

Furthermore, in the UE of the present disclosure, an antenna array of the base station may be an a×b array by r ring arrays, the a×b array by r ring arrays may be based on a type-1 codebook $[v_{l,m}\varphi_n]_{32\times 1}$, and $$v_{l,m} = \begin{bmatrix} e_{1,m}1_{8\times 8} \\ e_{2,m}1_{8\times 8} \\ e_{3,m}1_{8\times 8} \\ e_{4,m}1_{8\times 8} \end{bmatrix}_{32\times 8},$$

$$\varphi_n = \begin{bmatrix} 1 \\ e^{j1\frac{2\pi\theta}{N}} \\ e^{j2l\frac{2\pi\theta}{N}} \\ e^{j3l\frac{2\pi\theta}{N}} \\ e^{j4l\frac{2\pi\theta}{N}} \\ e^{j5l\frac{2\pi\theta}{N}} \\ e^{j6l\frac{2\pi\theta}{N}} \\ e^{j7l\frac{2\pi\theta}{N}} \end{bmatrix}_{8\times 1},$$

$e_{k,m}$ may be an m-th beamforming element of k-th ring array ports, I may be an OAM state, ϑ may be an angle between adjacent elements based on a center of a single ring array, N may be a maximum number of OAM states, and I may be an identity matrix.

Furthermore, in the UE of the present disclosure, an antenna array of the base station may be an r ring array by a×b arrays, the r ring array by a×b arrays may be based on a type-1 codebook $[\varphi_n v_{l,m}]_{32\times 1}$, and $$\varphi_n = \begin{bmatrix} 1 \cdot I_{4\times 4} \\ e^{j1\frac{2\pi\theta}{N}} I_{4\times 4} \\ e^{j2l\frac{2\pi\theta}{N}} I_{4\times 4} \\ e^{j3l\frac{2\pi\theta}{N}} I_{4\times 4} \\ e^{j4l\frac{2\pi\theta}{N}} I_{4\times 4} \\ e^{j5l\frac{2\pi\theta}{N}} I_{4\times 4} \\ e^{j6l\frac{2\pi\theta}{N}} I_{4\times 4} \\ e^{j7l\frac{2\pi\theta}{N}} I_{4\times 4} \end{bmatrix}_{32\times 4},$$

$$v_{l,m} = \begin{bmatrix} e_{1,m} \\ e_{2,m} \\ e_{3,m} \\ e_{4,m} \end{bmatrix}_{4\times 1},$$

$e_{k,m}$ may be an m-th beamforming element of k-th a×b array ports, I may be an OAM state, ϑ may be an angle between adjacent a×b arrays based on a center of a ring array, N may be a maximum number of OAM states, and I may be an identity matrix.

Furthermore, in an aspect, a base station configured to receive a detectable orbital angular momentum (OAM) state in a wireless communication system may include at least one transceiver, at least one processor, and at least one memory operably connectable to the at least one processor and storing instructions that, based on being executed by the at least one processor, perform operations. The operations may include transmitting, to a user equipment (UE), information for an OAM state set, wherein the OAM state set includes multiple OAM state subsets, and each of the multiple OAM state subsets includes one or two or more OAM states, transmitting at least one OAM beam to the UE, wherein a detectable at least one OAM state may be determined based on the at least one OAM beam, and receiving, from the UE, information for an OAM state subset including the at least one OAM state within the OAM state set.

Furthermore, in the base station of the present disclosure, the at least one OAM state may be determined based on an OAM component, received energy, and a frequency of the at least one OAM beam.

Furthermore, in the base station of the present disclosure, an antenna array of the base station may be an antenna array forming a right-hand circular polarized beam.

Furthermore, in the base station of the present disclosure, an antenna array of the base station may be an a×b array by r ring arrays, the a×b array by r ring arrays may be based on a type-1 codebook $[v_{l,m}\varphi_n]_{32\times 1}$, and $$v_{l,m} = \begin{bmatrix} e_{1,m}1_{8\times 8} \\ e_{2,m}1_{8\times 8} \\ e_{3,m}1_{8\times 8} \\ e_{4,m}1_{8\times 8} \end{bmatrix}_{32\times 8},$$

$$\varphi_n = \begin{bmatrix} 1 \\ e^{j1\frac{2\pi\theta}{N}} \\ e^{j2l\frac{2\pi\theta}{N}} \\ e^{j3l\frac{2\pi\theta}{N}} \\ e^{j4l\frac{2\pi\theta}{N}} \\ e^{j5l\frac{2\pi\theta}{N}} \\ e^{j6l\frac{2\pi\theta}{N}} \\ e^{j7l\frac{2\pi\theta}{N}} \end{bmatrix}_{8\times 1},$$

$e_{k,m}$ may be an m-th beamforming element of k-th ring array ports, l may be an OAM state, ϑ may be an angle between adjacent elements based on a center of a single ring array, N may be a maximum number of OAM states, and I may be an identity matrix.

Furthermore, in the base station of the present disclosure, an antenna array of the base station may be an r ring array by a×b arrays, the r ring array by a×b arrays may be based on a type-1 codebook $[\varphi_n v_{l,m}]_{32\times 1}$, and $$\varphi_n = \begin{bmatrix} 1 \cdot I_{4\times 4} \\ e^{j1\frac{2\pi\theta}{N}} I_{4\times 4} \\ e^{j2l\frac{2\pi\theta}{N}} I_{4\times 4} \\ e^{j3l\frac{2\pi\theta}{N}} I_{4\times 4} \\ e^{j4l\frac{2\pi\theta}{N}} I_{4\times 4} \\ e^{j5l\frac{2\pi\theta}{N}} I_{4\times 4} \\ e^{j6l\frac{2\pi\theta}{N}} I_{4\times 4} \\ e^{j7l\frac{2\pi\theta}{N}} I_{4\times 4} \end{bmatrix}_{32\times 4},$$

$$v_{l,m} = \begin{bmatrix} e_{1,m} \\ e_{2,m} \\ e_{3,m} \\ e_{4,m} \end{bmatrix}_{4\times 1},$$

$e_{k,m}$ may be an m-th beamforming element of k-th a×b array ports, l may be an OAM state, ϑ may be an angle between adjacent a×b arrays based on a center of a ring array, N may be a maximum number of OAM states, and I may be an identity matrix.

According to the present disclosure, a multiplexing gain can be maximized using OAM in a communication environment of a THz band because the transmission and reception of detectable OAM states are performed.

Furthermore, according to the present disclosure, a communication capacity can be increased using OAM because the transmission and reception of detectable OAM states are performed.

Furthermore, according to the present disclosure, beamforming performance can be improved by applying OAM to a precoding matrix (or codebook).

Effects which may be obtained in the disclosure are not limited to the above-described effects, and other technical effects not described above may be evidently understood by a person having ordinary skill in the art to which the disclosure pertains from the following description.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

FIGS. 16A through 16D are diagrams illustrating a modulator structure which may be applied to the present disclosure.

FIG. 23 is an example illustrating angular momentum.

FIGS. 24A to 24D are examples of various orthogonal beams and E field distribution diagrams according to OAM states.

DESCRIPTION OF EXEMPLARY EMBODIMENTS

Figure 1:
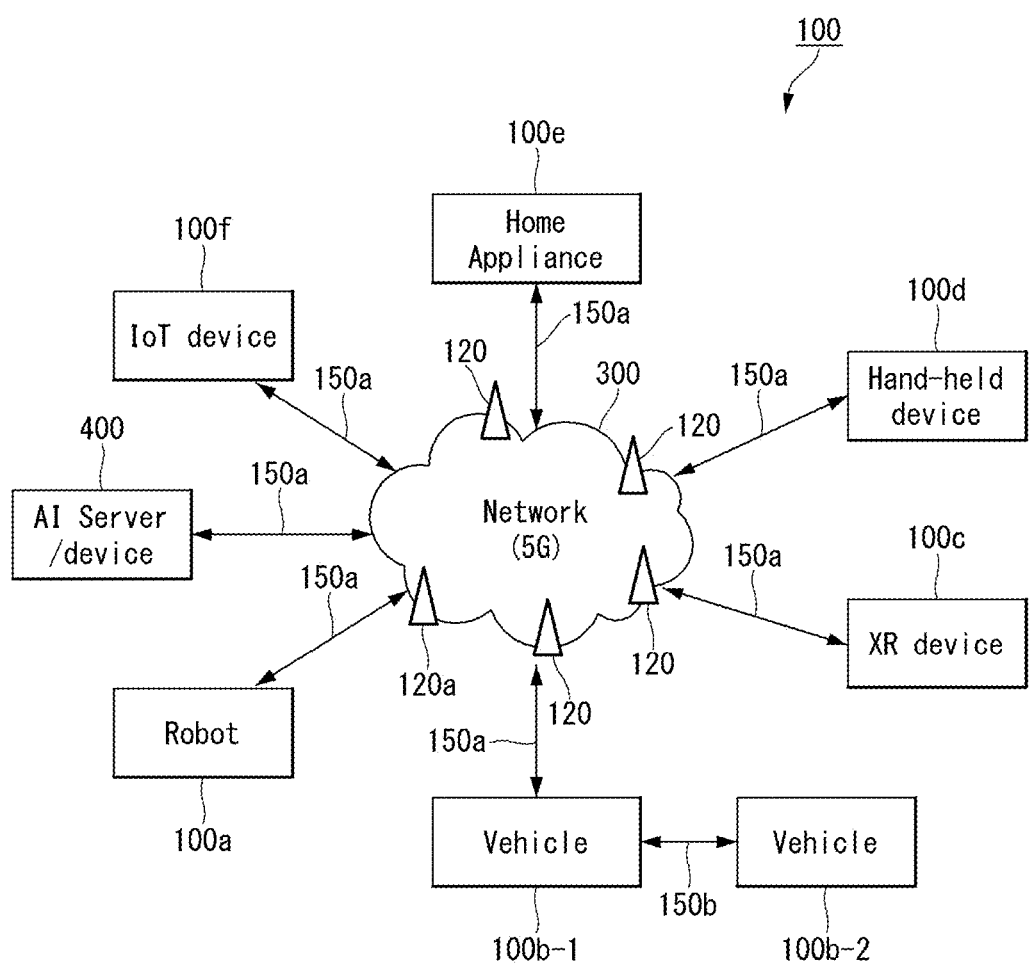
FIG. 1 is a diagram illustrating an example of a communication system which may be applied to the present disclosure.

Embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which may be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced Base Station (ABS), an access point, etc.

In embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an UpLink (UL). Likewise, the mobile station may serve as a receiver and the BS may serve as a transmitter, on a DownLink (DL).

Embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, embodiments of the present disclosure may be supported by the standard specifications, 3GPP TS 36.211, 3GPP TS 36.212, 3GPP TS 36.213, 3GPP TS 36.321 and 3GPP TS 36.331.

In addition, embodiments of the present disclosure are applicable to other radio access systems and are not limited to the above-described system. For example, embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to embodiments of the present disclosure with reference to the accompanying drawings. The detailed description, which will be given below with reference to the accompanying drawings, is intended to explain exemplary embodiments of the present disclosure, rather than to show the only embodiments that may be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Embodiments of the present disclosure may be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE, NR), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System which May be Applied to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a diagram illustrating an example of a communication system which may be applied to the present disclosure. Referring to FIG. 1, the communication system 100 which may be applied to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB)). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping), resource allocation processes, etc. may be performed.

Communication System which May be Applied to the Present Disclosure

Figure 2:
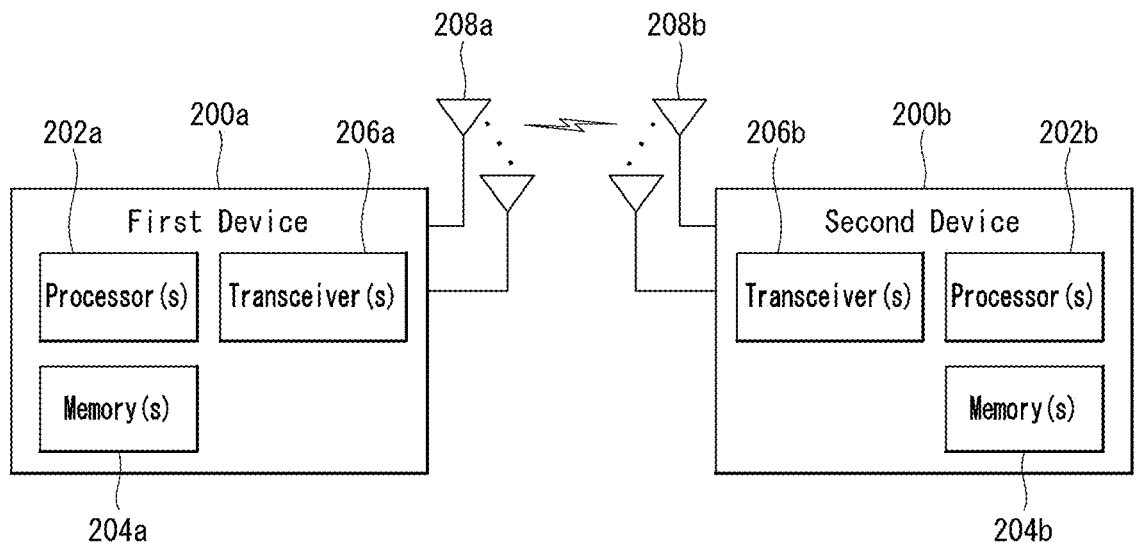
FIG. 2 is a diagram illustrating an example of a wireless apparatus which may be applied to the present disclosure.

FIG. 2 is a diagram illustrating an example of a wireless device which may be applied to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be connected with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be connected with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be connected with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be connected with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs) and/or one or more service data unit (SDU) according to the descriptions, functions, procedures, proposals, methods and/or operational flowcharts disclosed herein. One or more processors 202a and 202b may generate messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be connected with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be connected with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. For example, one or more transceivers 206a and 206b may be connected with one or more processors 202a and 202b to transmit/receive radio signals. For example, one or more processors 202a and 202b may perform control such that one or more transceivers 206a and 206b transmit user data, control information or radio signals to one or more other apparatuses. In addition, one or more processors 202a and 202b may perform control such that one or more transceivers 206a and 206b receive user data, control information or radio signals from one or more other apparatuses. In addition, one or more transceivers 206a and 206b may be connected with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Figure 3:
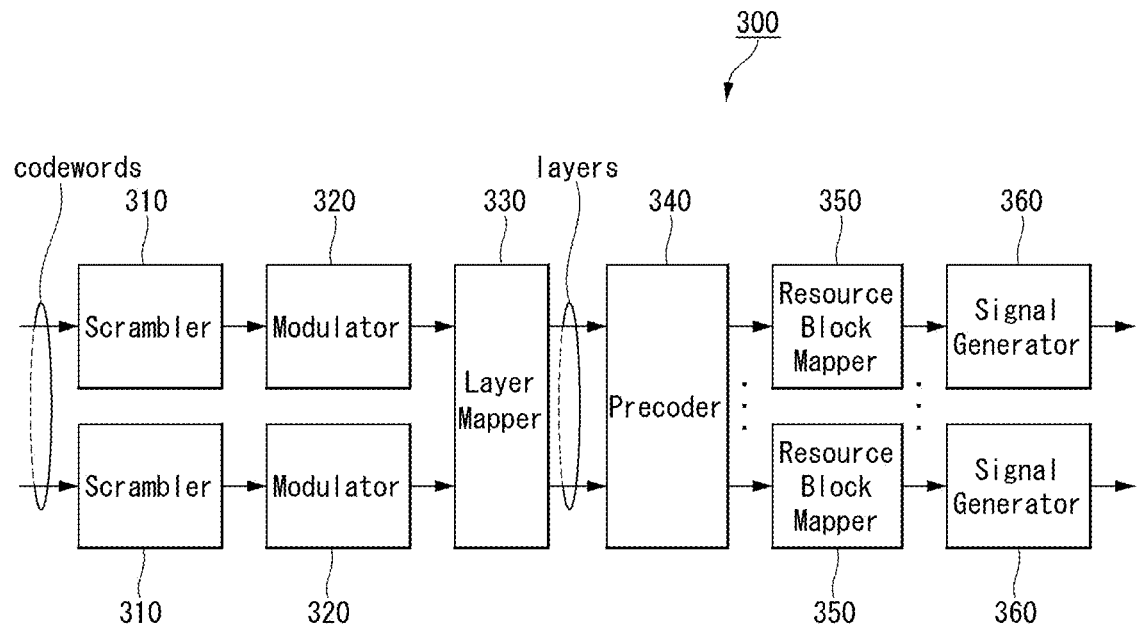
FIG. 3 is a diagram illustrating a method of processing a transmission signal applied to the present disclosure.

FIG. 3 is a diagram illustrating a method of processing a transmission signal applied to the present disclosure. As an example, the transmission signal may be processed by a signal processing circuit. In this case, a signal processing circuit 300 may include a scrambler 310, a modulator 320, a layer mapper 330, a precoder 340, a resource mapper 350, and a signal generator 360. In this case, for example, an operation/function of FIG. 3 may be performed by the processors 202a and 202b and/or the transceivers 206a and 206b of FIG. 2. Hardware elements of FIG. 3 may be implemented in the processors 202a and 202b and/or the transceivers 206a and 206b of FIG. 2. For example, blocks 310 to 350 may be implemented in the processors 202a and 202b of FIG. 2. and the block 360 of FIG. 2 may be implemented in the transceivers 206a and 206b of FIG. 2. A codeword may be transformed into a radio signal via the signal processing circuit 300 of FIG. 3. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 310. A scramble sequence used for scrambling may be generated based on an initialization value and the initialization value may include ID information of a wireless device. The scrambled bit sequence may be modulated into a modulated symbol sequence by the modulator 320. A modulation scheme may include pi/2-BPSK (pi/2-Binary Phase Shift Keying), m-PSK (m-Phase Shift Keying), m-QAM (m-Quadrature Amplitude Modulation), etc.

A complex modulation symbol sequence may be mapped to one or more transport layers by the layer mapper 330. Modulation symbols of each transport layer may be mapped to a corresponding antenna port(s) (precoding) by the precoder 340. An output z of the precoder 340 may be obtained by multiplying an output y of the layer mapper 330 by a precoding matrix W of N*M. In this case, N is the number of antenna ports, and M is the number of transport layers. In this case, the precoder 340 may perform precoding after performing transform precoding (e.g., discrete Fourier transform (DFT)) on complex modulation symbols. Furthermore, the precoder 340 may perform precoding without performing transform precoding.

The resource mapper 350 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 360 may generate the radio signal from the mapped modulated symbols and the generated radio signal may be transmitted to another device through each antenna. To this end, the signal generator 360 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (310 to 360) of FIG. 3. For example, the wireless device (e.g., 200a or 200b of FIG. 2) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Structure of Wireless Device which May be Applied to the Present Disclosure

Figure 4:
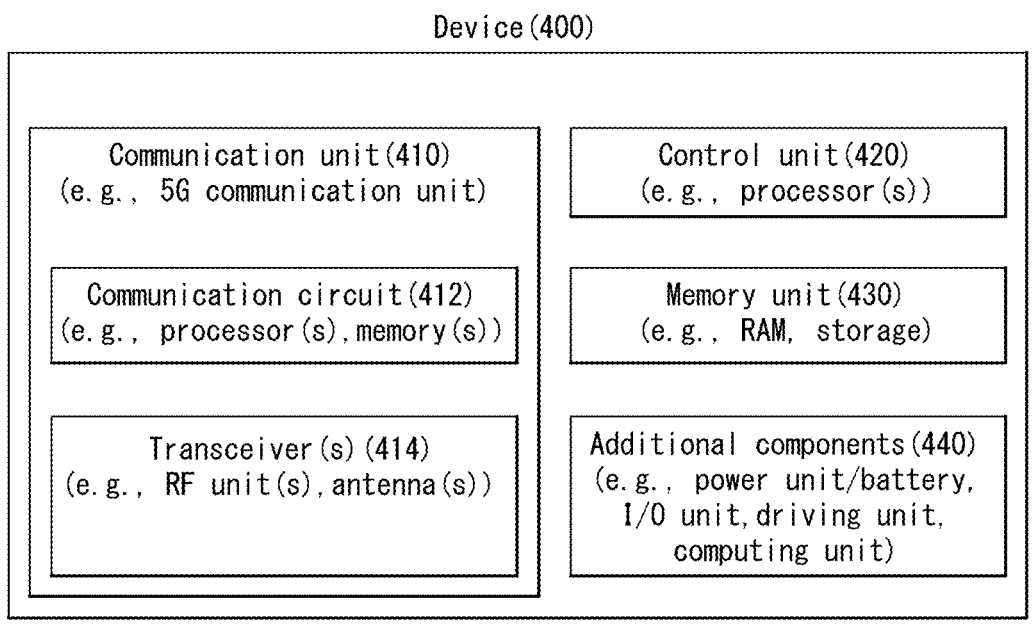
FIG. 4 is a diagram illustrating another example of a wireless device which may be applied to the present disclosure.

FIG. 4 is a diagram illustrating another example of a wireless device which may be applied to the present disclosure.

Referring to FIG. 4, a wireless device 400 may correspond to the wireless devices 200a and 200b of FIG. 2 and include various elements, components, units/portions and/or modules. For example, the wireless device 400 may include a communication unit 410, a control unit (controller) 420, a memory unit (memory) 430 and additional components 440. The communication unit may include a communication circuit 412 and a transceiver(s) 414. For example, the communication circuit 412 may include one or more processors 202a and 202b and/or one or more memories 204a and 204b of FIG. 2. For example, the transceiver(s) 414 may include one or more transceivers 206a and 206b and/or one or more antennas 208a and 208b of FIG. 2. The control unit 420 may be electrically connected with the communication unit 410, the memory unit 430 and the additional components 440 to control overall operation of the wireless device. For example, the control unit 420 may control electrical/mechanical operation of the wireless device based on a program/code/instruction/information stored in the memory unit 430. In addition, the control unit 420 may transmit the information stored in the memory unit 430 to the outside (e.g., another communication device) through the wireless/wired interface using the communication unit 410 over a wireless/wired interface or store information received from the outside (e.g., another communication device) through the wireless/wired interface using the communication unit 410 in the memory unit 430.

The additional components 440 may be variously configured according to the types of the wireless devices. For example, the additional components 440 may include at least one of a power unit/battery, an input/output unit, a driving unit or a computing unit. Without being limited thereto, the wireless device 400 may be implemented in the form of the robot (FIG. 1, 100a), the vehicles (FIGS. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 4, various elements, components, units/portions and/or modules in the wireless device 400 may be connected with each other through wired interfaces or at least some thereof may be wirelessly connected through the communication unit 410. For example, in the wireless device 400, the control unit 420 and the communication unit 410 may be connected by wire, and the control unit 420 and the first unit (e.g., 130 or 140) may be wirelessly connected through the communication unit 410. In addition, each element, component, unit/portion and/or module of the wireless device 400 may further include one or more elements. For example, the control unit 420 may be composed of a set of one or more processors. For example, the control unit 420 may be composed of a set of a communication control processor, an application processor, an electronic control unit (ECU), a graphic processing processor, a memory control processor, etc. In another example, the memory unit 430 may be composed of a random access memory (RAM), a dynamic RAM (DRAM), a read only memory (ROM), a flash memory, a volatile memory, a non-volatile memory and/or a combination thereof.

Hand-Held Device which May be Applied to the Present Disclosure

Figure 5:
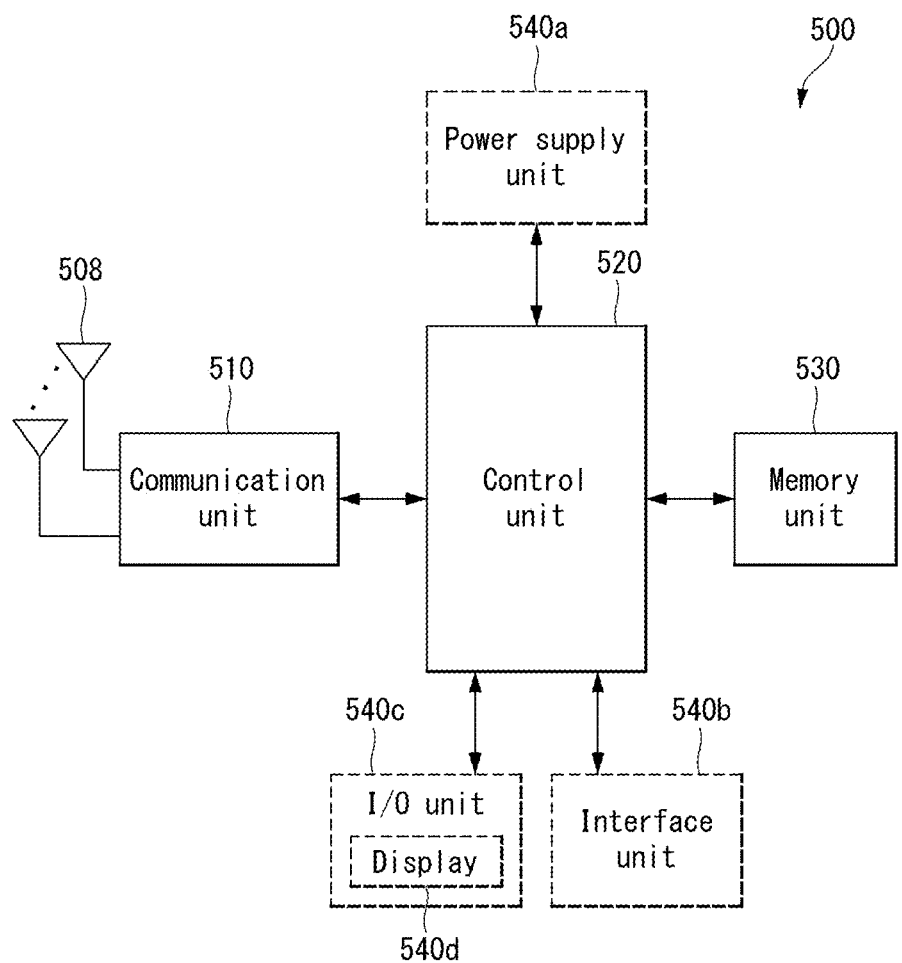
FIG. 5 is a diagram illustrating an example of a hand-held device which may be applied to the present disclosure.

FIG. 5 is a diagram illustrating an example of a hand-held device which may be applied to the present disclosure.

FIG. 5 shows a hand-held device which may be applied to the present disclosure. The hand-held device may include a smartphone, a smart pad, a wearable device (e.g., a smart watch or smart glasses), and a hand-held computer (e.g., a laptop). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 5, the hand-held device 500 may include an antenna unit (antenna) 508, a communication unit (transceiver) 510, a control unit (controller) 520, a memory unit (memory) 530, a power supply unit (power supply) 540a, an interface unit (interface) 540b, and an input/output unit 540c. An antenna unit (antenna) 508 may be part of the communication unit 510. The blocks 510 to 530/540a to 540c may correspond to the blocks 410 to 430/440 of FIG. 4, respectively.

The communication unit 510 may transmit and receive signals (e.g., data, control signals) to and from other wireless devices or base stations. The control unit 520 may control the components of the hand-held device 500 to perform various operations. The control unit 520 may include an application processor (AP). The memory unit 530 may store data/parameters/program/code/instructions necessary to drive the hand-held device 500. In addition, the memory unit 530 may store input/output data/information, etc. The power supply unit 540a may supply power to the hand-held device 500 and include a wired/wireless charging circuit, a battery, etc. The interface unit 540b may support connection between the hand-held device 500 and another external device. The interface unit 540b may include various ports (e.g., an audio input/output port and a video input/output port) for connection with the external device. The input/output unit 540c may receive or output video information/signals, audio information/signals, data and/or user input information. The input/output unit 540c may include a camera, a microphone, a user input unit, a display 540d, a speaker and/or a haptic module.

For example, in case of data communication, the input/output unit 540c may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 540c in various forms (e.g., text, voice, image, video and haptic).

Physical Channels and General Signal Transmission

In a radio access system, a UE receives information from a base station on a DL and transmits information to the base station on a UL. The information transmitted and received between the UE and the base station includes general data information and a variety of control information. There are many physical channels according to the types/usages of information transmitted and received between the base station and the UE.

Figure 6:
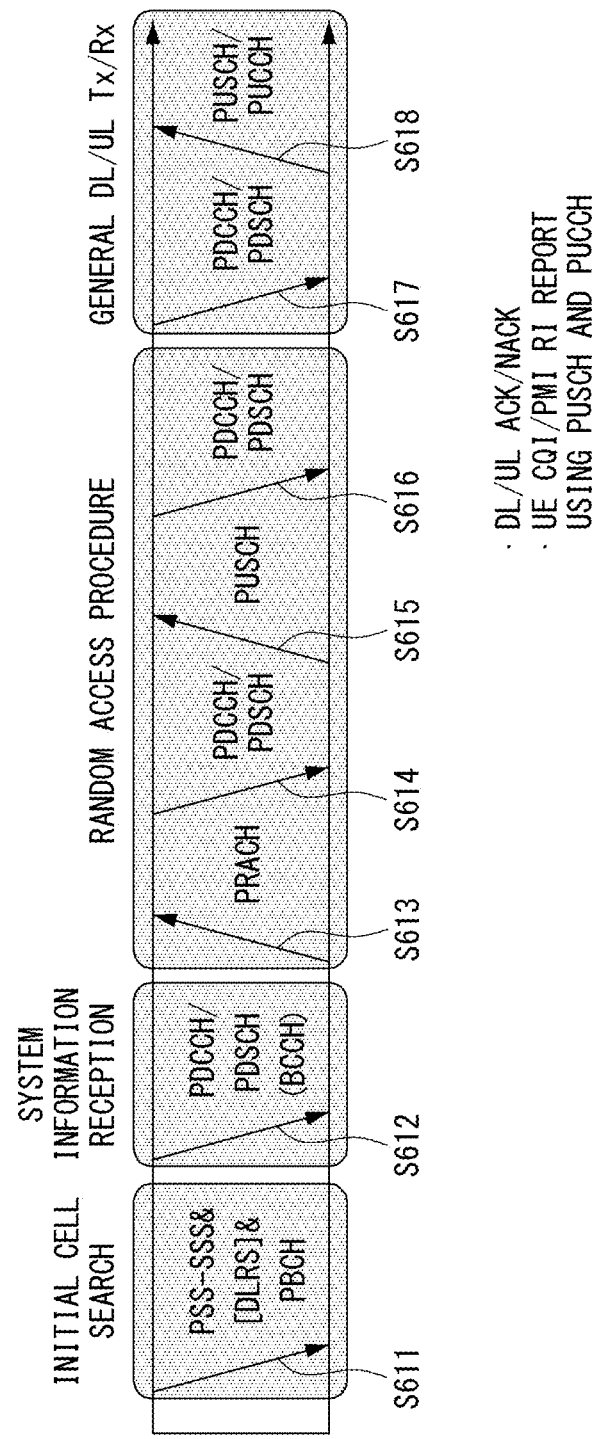
FIG. 6 is a diagram illustrating physical channels which may be applied to the present disclosure and a signal transmission method using the same.

FIG. 6 is a diagram illustrating physical channels which may be applied to the present disclosure and a signal transmission method using the same.

The UE which is turned on again in a state of being turned off or has newly entered a cell performs initial cell search operation in step S611 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S612, thereby acquiring more detailed system information.

Thereafter, the UE may perform a random access procedure such as steps S613 to S616 in order to complete access to the base station. To this end, the UE may transmit a preamble through a physical random access channel (PRACH) (S613) and receive a random access response (RAR) to the preamble through a physical downlink control channel and a physical downlink shared channel corresponding thereto (S614). The UE may transmit a physical uplink shared channel (PUSCH) using scheduling information in the RAR (S615) and perform a contention resolution procedure such as reception of a physical downlink control channel signal and a physical downlink shared channel signal corresponding thereto (S616).

The UE, which has performed the above-described procedures, may perform reception of a physical downlink control channel signal and/or a physical downlink shared channel signal (S617) and transmission of a physical uplink shared channel (PUSCH) signal and/or a physical uplink control channel (PUCCH) signal (S618) as general uplink/downlink signal transmission procedures.

The control information transmitted from the UE to the base station is collectively referred to as uplink control information (UCI). The UCI includes hybrid automatic repeat and request acknowledgement/negative-ACK (HARQ-ACK/NACK), scheduling request (SR), channel quality indication (CQI), precoding matrix indication (PMI), rank indication (RI), beam indication (BI) information, etc. In this case, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

Figure 7:
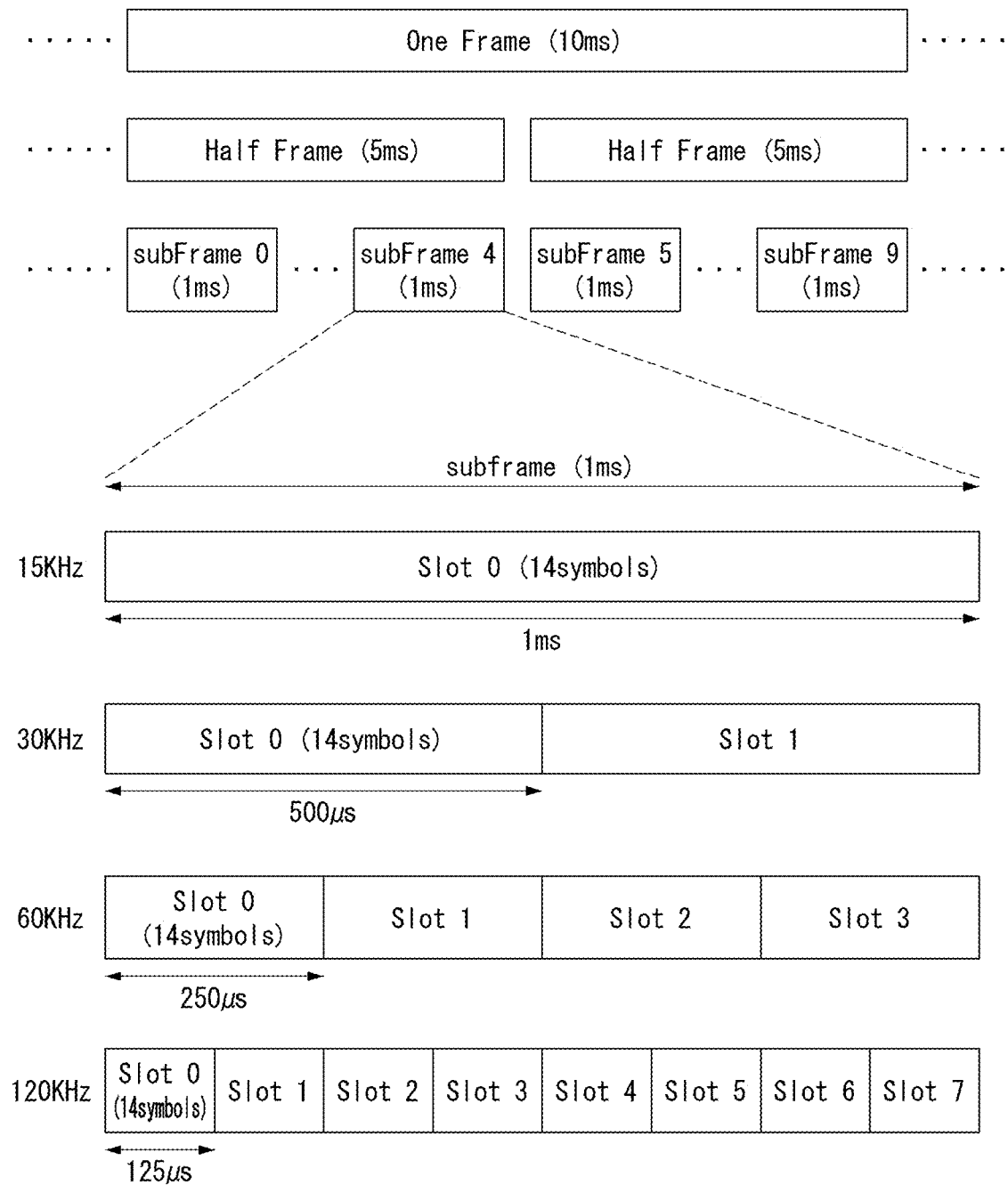
FIG. 7 is a diagram illustrating the structure of a radio frame which may be applied to the present disclosure.

FIG. 7 is a diagram illustrating the structure of a radio frame which may be applied to the present disclosure.

UL and DL transmission based on an NR system may be based on the frame shown in FIG. 7. In this case, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). In this case, each slot may include 12 or 14 OFDM(A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In Tables 1 and 2 above, Nslotsymb may indicate the number of symbols in a slot, Nframe,μslot may indicate the number of slots in a frame, and Nsubframe,μslot may indicate the number of slots in a subframe.

In addition, in a system, to which the present disclosure is applicable, OFDM(A) numerology (e.g., SCS, CP length) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In addition, for example, in a communication system, to which the present disclosure is applicable, the above-described numerology may be differently set. For example, a terahertz wave (THz) band may be used as a frequency band higher than FR2. In the THz band, the SCS may be set greater than that of the NR system, and the number of slots may be differently set, without being limited to the above-described embodiments. The THz band will be described below.

Figure 8:
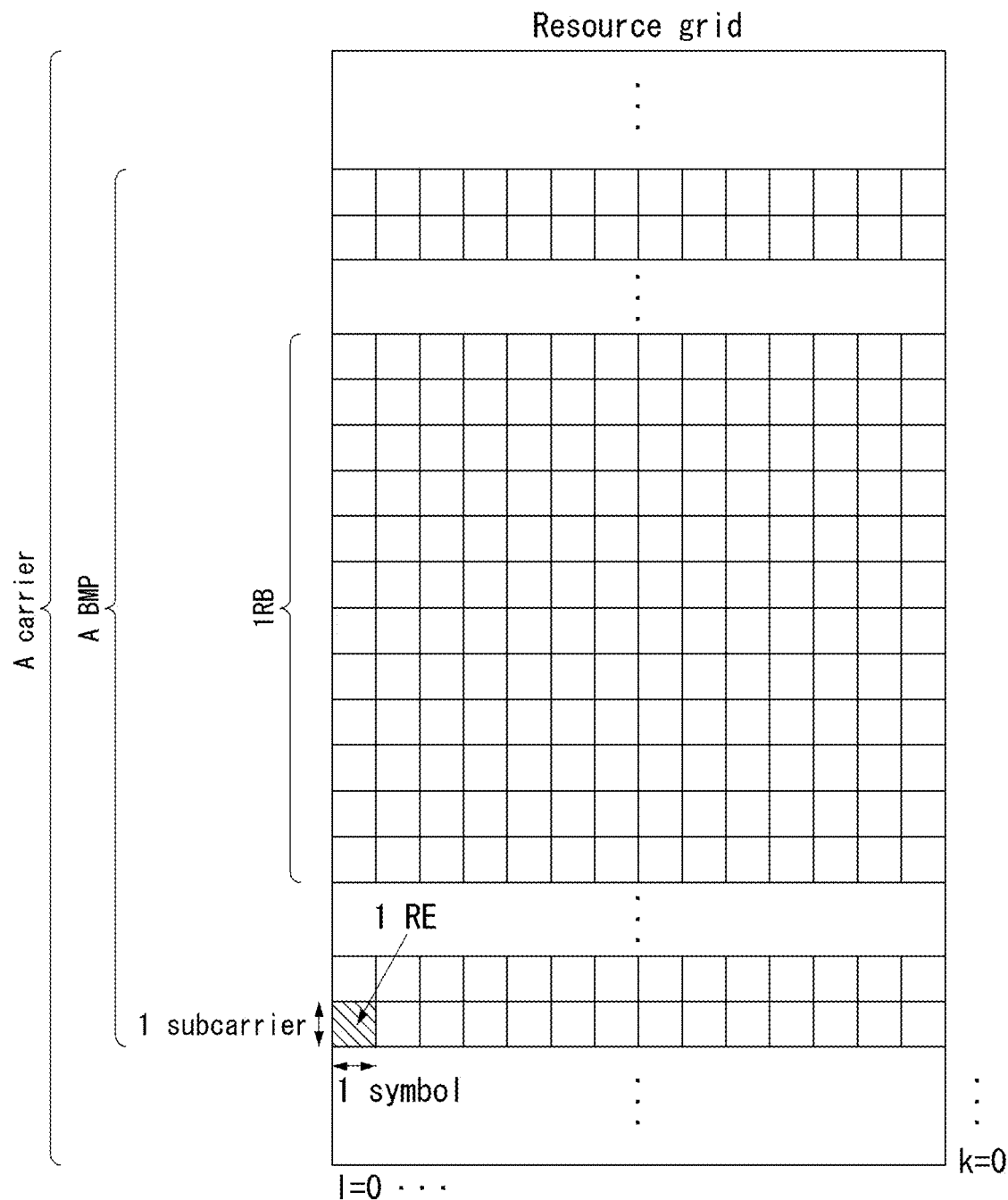
FIG. 8 is a diagram illustrating a slot structure which may be applied to the present disclosure.

FIG. 8 is a diagram illustrating a slot structure which may be applied to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P)RBs in the frequency domain and may correspond to one numerology (e.g., SCS, CP length).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

In this case, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 9:
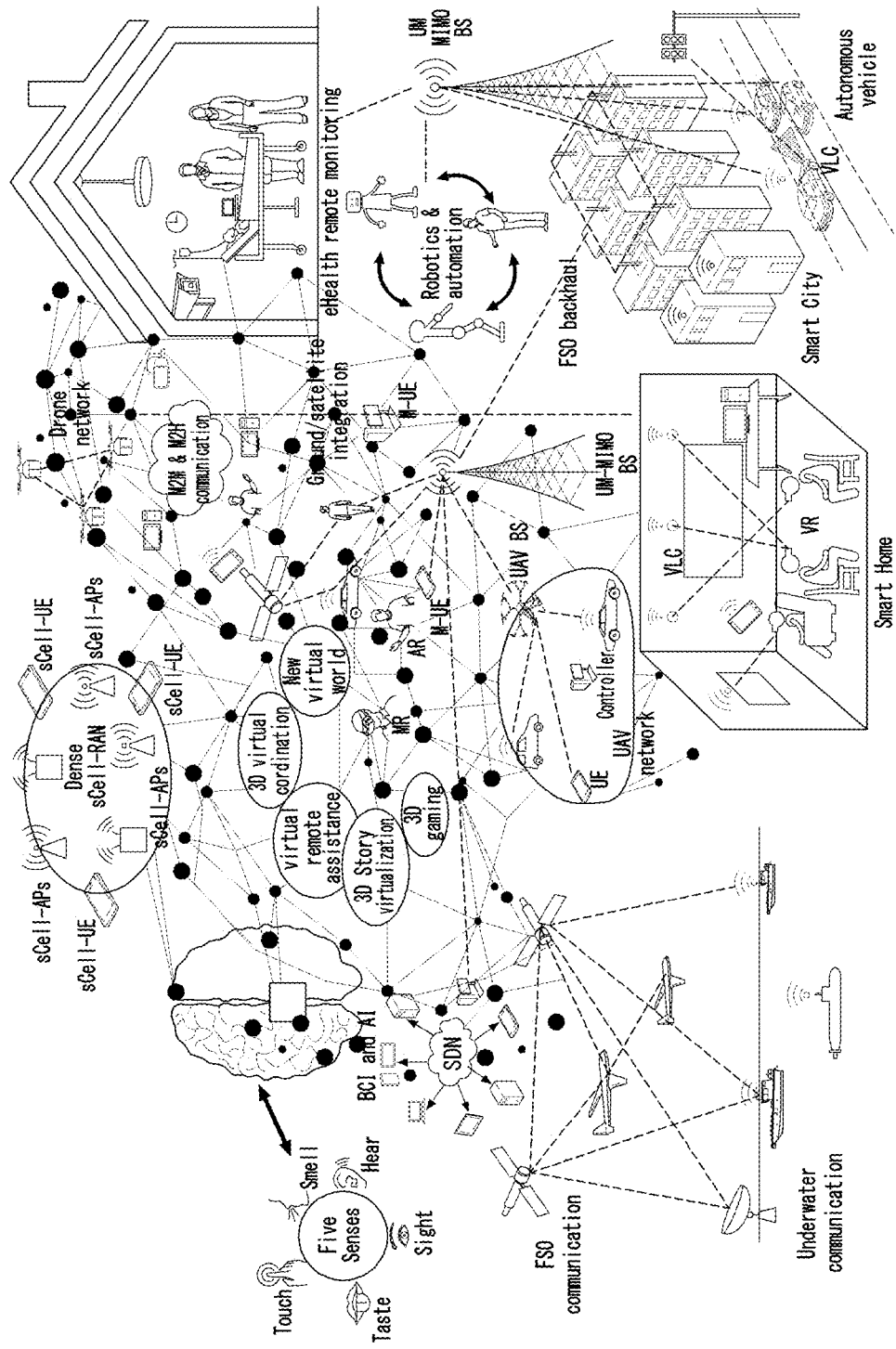
FIG. 9 is a diagram illustrating an example of a communication structure providable in a 6G system which may be applied to the present disclosure.

FIG. 9 is a diagram illustrating an example of a communication structure providable in a 6G system which may be applied to the present disclosure.

Referring to FIG. 9, the 6G system will have 50 times higher simultaneous wireless communication connectivity than a 5G wireless communication system. URLLC, which is the key feature of 5G, will become more important technology by providing end-to-end latency less than 1 ms in 6G communication. In this case, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCD. An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, the application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which may perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, back-propagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is back-propagated from the neural network backward (that is, from the output layer to the input layer), and the connection weight of each node of each layer of the neural network may be updated according to back-propagation. Change in updated connection weight of each node may be determined according to the learning rate. Calculation of the neural network for input data and back-propagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to a 6G system. For example, a data rate may increase by increasing bandwidth. This may be performed by using sub-TH communication with wide bandwidth and applying advanced massive MIMO technology.

Figure 10:
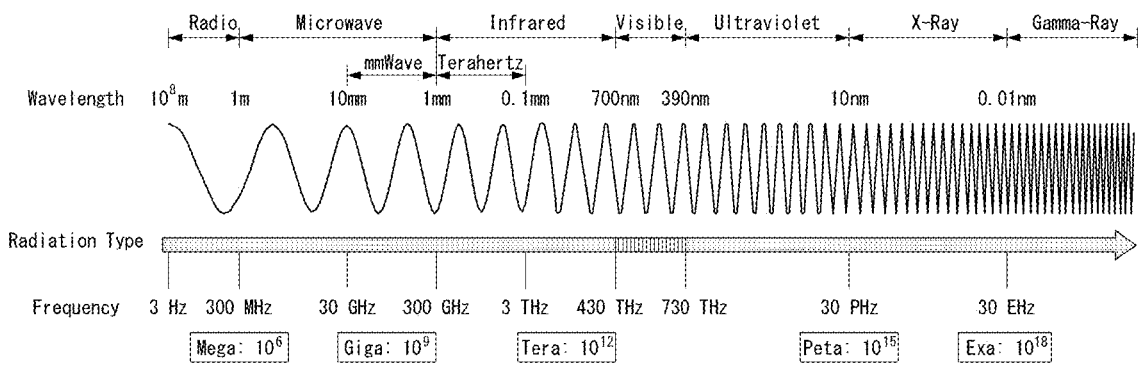
FIG. 10 is a diagram illustrating an electromagnetic spectrum which may be applied to the present disclosure.

FIG. 10 is a diagram illustrating an electromagnetic spectrum which may be applied to the present disclosure. For example, referring to FIG. 10, THz waves known as sub-millimeter radiation generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

THz Wireless Communication

Figure 11:
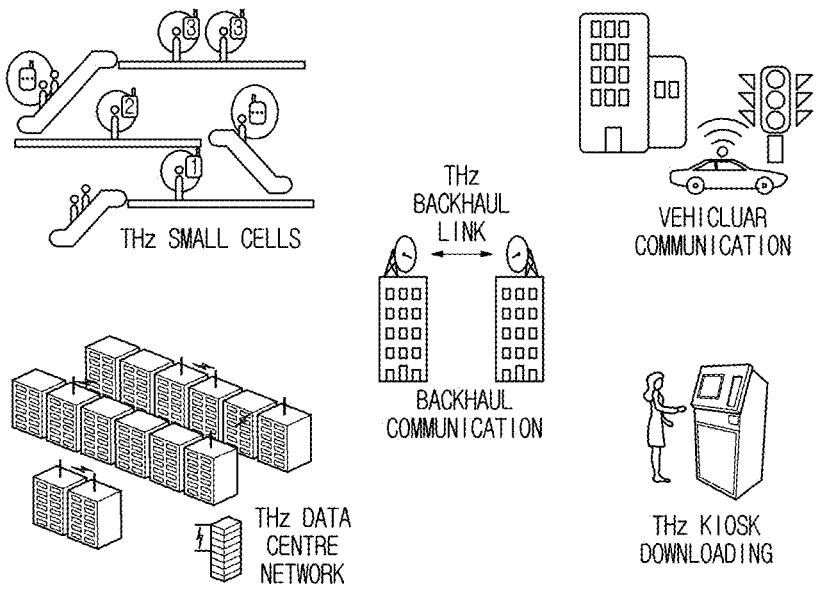
FIG. 11 is a diagram illustrating a THz communication method which may be applied to the present disclosure.

FIG. 11 is a diagram illustrating a THz communication method which may be applied to the present disclosure.

Referring to FIG. 11, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Specifically, referring to FIG. 11, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading. Table 5 below shows an example of technology which may be used in the THz wave.

TABLE 5

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 12:
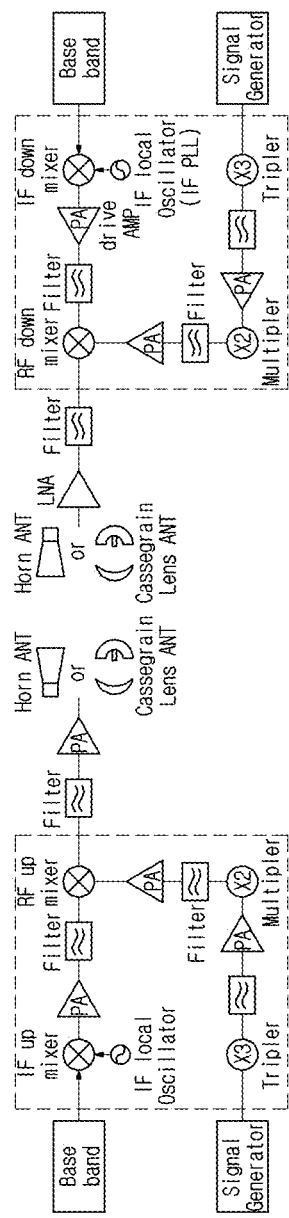
FIG. 12 is a diagram illustrating a THz wireless communication transceiver which may be applied to the present disclosure.

FIG. 12 is a diagram illustrating a THz wireless communication transceiver which may be applied to the present disclosure.

Referring to FIG. 12, THz wireless communication may be classified based on the method of generating and receiving THz. The THz generation method may be classified as an optical device or electronic device based technology.

In this case, the method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 12, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 12. In FIG. 12, IF represents an intermediate frequency, a tripler and a multiplier represents a multiplier, PA represents a power amplifier, and LNA represents a low noise amplifier, and PLL represents a phase-locked loop.

Figure 13:
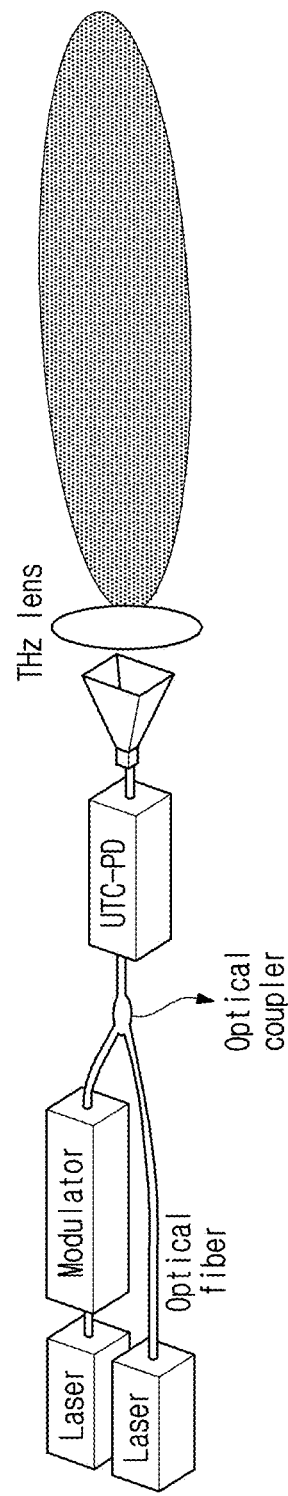
FIG. 13 is a diagram illustrating a THz signal generation method which may be applied to the present disclosure.
Figure 14:
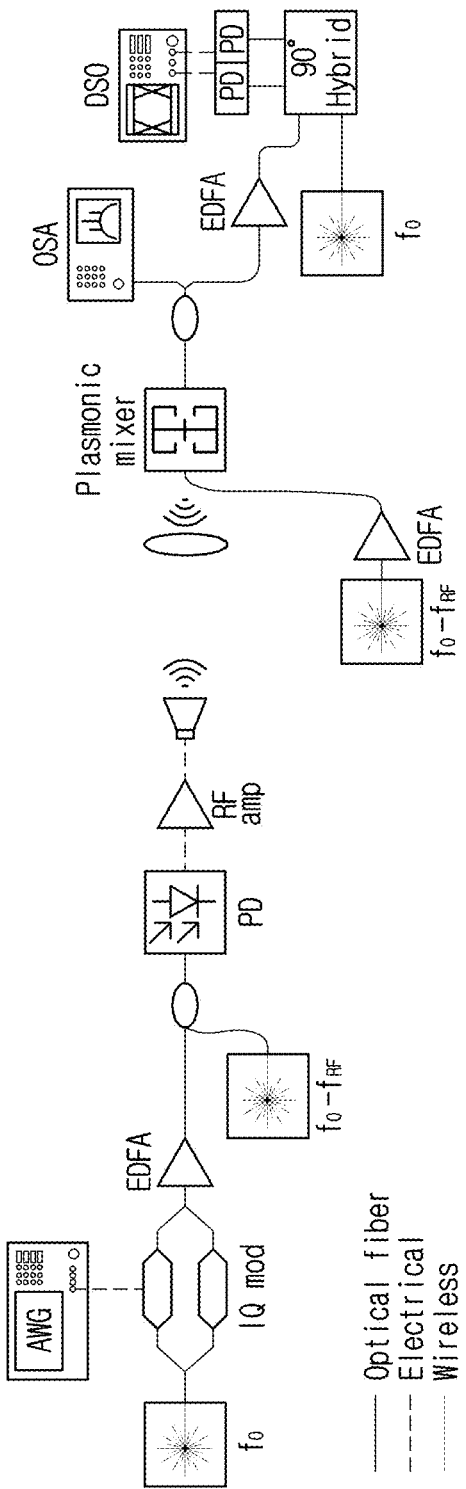
FIG. 14 is a diagram illustrating a wireless communication transceiver which may be applied to the present disclosure.

FIG. 13 is a diagram illustrating a THz signal generation method which may be applied to the present disclosure. FIG. 14 is a diagram illustrating a wireless communication transceiver which may be applied to the present disclosure.

Referring to FIGS. 13 and 14, the optical device-based THz wireless communication technology means a method of generating and modulating a THz signal using an optical device. The optical device-based THz signal generation technology refers to a technology that generates an ultra-high-speed optical signal using a laser and an optical modulator, and converts it into a THz signal using an ultrahigh-speed photodetector. This technology is easy to increase the frequency compared to the technology using only the electronic device, may generate a high-power signal, and may obtain a flat response characteristic in a wide frequency band. In order to generate the THz signal based on the optical device, as shown in FIG. 20, a laser diode, a broadband optical modulator, and an ultrahigh-speed photodetector are required. In the case of FIG. 20, the light signals of two lasers having different wavelengths are combined to generate a THz signal corresponding to a wavelength difference between the lasers. In FIG. 20, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 20, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion) are modularized as one component, and DSO represents a digital storage oscilloscope.

Figure 15:
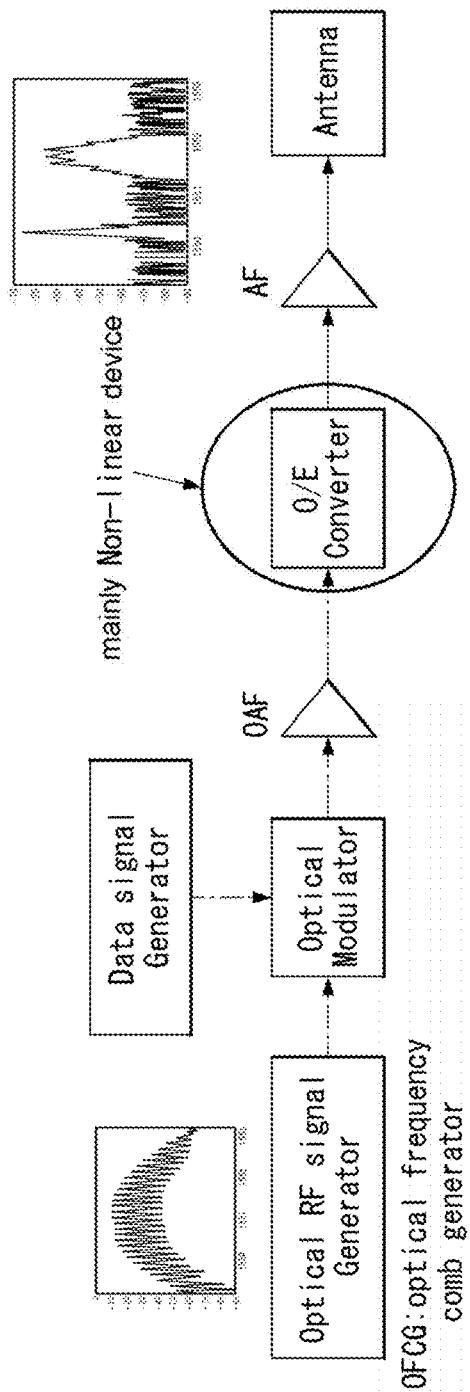
FIG. 15 is a diagram illustrating a transmitter structure which may be applied to the present disclosure.

FIG. 15 is a diagram illustrating a transmitter structure which may be applied to the present disclosure. FIGS. 16A through 16B are diagrams illustrating a modulator structure which may be applied to the present disclosure.

Referring to FIGS. 15 and 16, generally, the optical source of the laser may change the phase of a signal by passing through the optical wave guide. In this case, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the THz band depends on how to utilize the nonlinearity of the O/E converter. That is, for down-conversion into a desired THz band (THz band), design of the photoelectric converter (O/E converter) having the most ideal non-linearity to move to the corresponding THz band (THz band) is required. If a photoelectric converter (O/E converter) which is not suitable for a target frequency band is used, there is a high possibility that an error occurs with respect to the amplitude and phase of the corresponding pulse.

In a single carrier system, a THz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system may be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

CSI Related Operation

In a New Radio (NR) system, a channel state information-reference signal (CSI-RS) is used for time and/or frequency tracking, CSI computation, layer 1 (L1)-reference signal received power (RSRP) computation, and mobility. In this case, the CSI computation is related to CSI acquisition, and the L1-RSRP computation is related to beam management (BM). In a 6G (wireless communication) system, a CSI-related operation of NR may also be used/applied/referred.

Channel state information (CSI) collectively refers to information that may indicate the quality of a radio channel (or referred to as a link) formed between the UE and the antenna port.

Figure 17:
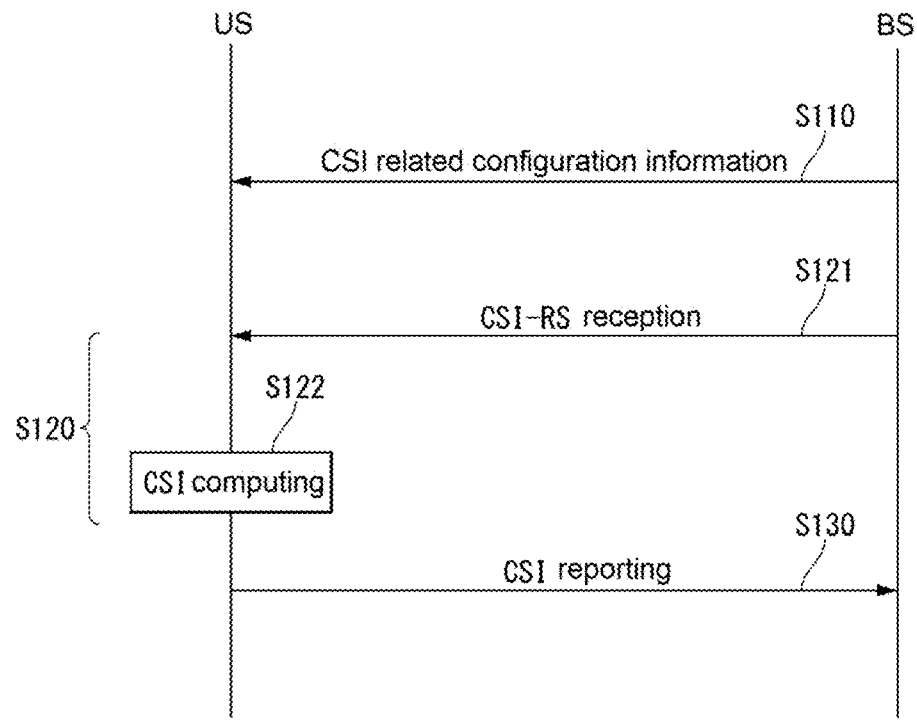
FIG. 17 is a flowchart illustrating an example of a CSI-related procedure.

FIG. 17 is a flowchart illustrating an example of a CSI-related procedure.

Referring to FIG. 17, In order to perform one of usages of the CSI-RS, a terminal (e.g., user equipment (UE)) receives, a CSI-IM resource set identifier (ID) and one resource set includes at least one CSI-IM resource. Each CSI-IM resource is identified by a CSI-IM resource ID.

The CSI resource configuration-related information may be represented as a CSI-ResourceConfig IE. The CSI resource configuration-related information defines a group including at least one of a non zero power (NZP) CSI-RS resource set, a CSI-IM resource set or a CSI-SSB resource set. That is, the CSI resource configuration-related information includes a CSI-RS resource set list. The CSI-RS resource set list may include at least one of an NZP CSI-RS resource set list, a CSI-IM resource set list or a CSI-SSB resource set list. The CSI-RS resource set is identified by a CSI-RS resource set ID. One resource set includes at least one CSI-RS resource. Each CSI-RS resource is identified by a CSI-RS resource ID.

As in FIG. 17, parameters (e.g., a BM-related "repetition" parameter and a tracking-related "trs-Info" parameter) indicating the usage of a CSI-RS for each NZP CSI-RS resource set may be configured.

Table 6 illustrates an example of an NZP CSI-RS resource set IE.

TABLE 6

| |
|---|
| -- ASN1START |
| -- TAG-NZP-CSI-RS-RESOURCESET-START |
| NZP-CSI-RS-ResourceSet : : = SEQUENCE { |
|    nzp-CSI -ResourceSetId     NZP-CSI-RS-ResourceSetId, |
|    nzp-CSI-RS-Rescources     SEQUENCE (SIZE (1. .maxNrofNZP-CSI-RS-ResourcesPerSet)) |
| OF NZP-CSI-RS-ResourceId, |
|    repetition     ENUMERATED { on, off } |
|    aperiodicTriggeringOffset     INTEGER(0..4) |
|    trs-Info     ENUMERATED {true} |
|    ... |
| } |
| -- TAG-NZP-CSI-RS-RESOURCESET-STOP |
| -- ASN1STOP | from a base station (e.g., BS, general Node B or gNB), configuration information related to the CSI through radio resource control (RRC) signaling (S110).

The configuration information related to the CSI may include at least one of CSI-interference management (IM) resource related information, CSI measurement configuration-related information, CSI resource configuration-related information, CSI-RS resource related information, or CSI report configuration-related information.

The CSI-IM resource related information may include CSI-IM resource information, CSI-IM resource set information, and the like. The CSI-IM resource set is identified by Furthermore, a repetition parameter corresponding to a higher layer parameter corresponds to "CSI-RS-ResourceRep" of an L1 parameter.

iii) The CSI report configuration-related information includes a report configuration type (reportConfigType) parameter indicating a time domain behavior and a report quantity (reportQuantity) parameter indicating a CSI-related quantity for a report. The time domain behavior may be periodic, aperiodic or semi-persistent.

The CSI report configuration-related information may be represented as a CSI-ReportConfig IE. Table 7 illustrates an example of the CSI-ReportConfig IE.

TABLE 7

| |
|---|
| -- ASN1START |
| -- TAG-CSI-RESOURCECONFIG-START |
| CSI-ReportConfig : :=     SEQUENCE{ |
|    reportConfigId     CSI-ReportConfigId, |
|    carrier     ServCellIndex     OPTIONAL,   -- Need S |
|    resourcesForChannelMeasurement     CSI-DesourceConfigId, |
|    csi-IM-ResourcesForInterference     CSI-ResourceConfigId     OPTIONAL,   - - Need R |
|    nzp-CSI-RS-RegcureasForInterference CSI-ResourceConfigId     OPTIONAL,   - - Need R |
|    reportConfigType     CHOICE { |
|       periodic     SEQUENCE { |
|          reportSlotConfig     CSI-ReportPeriodicityAndOffset, |
|          pucch-CSI-ResourceList     SEQUENCE (SIZE (1. . maxWYcfBNBs) ) OF |

TABLE 7-continued

```
pucch-CSI-Resource
    },
    semi PersistentOnPUCCH         SEQUENCE {
        reportSlotConfig               CSI-ReportPeriodicityAndOffset,
        pucch-CSI-ResourceList         SEQUENCE (SIZE (1. . maxNrofBWPs) ) OF
PUCCH-CSI-Resource
    },
    semiPersistentOnPUSCH          SEQUENCE {
        reportSlotConfig               ENUMERATED {sl5, sl10, sl26, sl40,
sl80, sl160, sl320},
        reportSlotOffsetList           SEQUENCE (SIZE (1 . . maxNrofUL-
Allocations; ) OF INTEGER(0. . 32) ,
        p0alpha                        P0-POSCH-AlphaSetId
    },
    aperiodic                      SEQUENCE {
        reportSlotOffsetList           SEQUENCE (SIZE (1. . maxNrofUL-Allocations) )
OF INTEGER (0. .32)
}
    },
    reportQuantity                 CHOICE {
        none                           NULL,
        cri-RI-PMI-CQI                 NULL,
        cri-RI-il-                     NULL,
        cri-RI-i1-CQI                  SEQUENCE {
            pdsch-BundleSizeForCSI         EMUERATED {n2, n4}             OPTIONAL
        },
        cri-RI-CQI                     NULL,
        cri-RSRP                       NULL,
        ssb-Index-RSRP                 NULL,
        cri-RI-LI-PMI-CQI              NULL
    },
```

The UE measures CSI based on configuration information related to the CSI (S120).

The CSI measurement may include (1) a CSI-RS reception process (S121) of the UE and (2) a process (S122) of computing CSI through a received CSI-RS. This is described in detail later.

Resource element (RE) mapping of a CSI-RS resource is configured in the CSI-RS in time and frequency domains by a higher layer parameter CSI-RS-ResourceMapping.

Table 8 illustrates an example of a CSI-RS-ResourceMapping IE.

In Table 8, density (D) indicates the density of CSI-RS resources measured in a RE/port/physical resource block (PRB). nrofPorts indicates the number of antenna ports.

The UE reports the measured CSI to the base station (S130).

In this case, when the quantity of CSI-ReportConfig in Table E is set as "none (or no report)", the UE may omit a report.

However, although the quantity is set as "none (or no report)", the UE may report the measured CSI to the base station.

TABLE 8

```
-- ASN1START
-- TAG-CSI-RS-RESOURCEMAPPING-START
CSI-RS-ResourceMapping :: =     SEQUENCE {
    frequencyDomainAllocation       CHOICE {
        row 1                           BIT STRING (SIZE (4) ),
        row 2                           BIT STRING (SIZE (12) ),
        row 4                           BIT STRING (SIZE (3) ),
        other                           BIT STRING (SIZE (6) ),
    },
    nrofPorts                       ENUMERATED {p1, p2, 24, p8, p12, p26, p24, p32},
    firstOFDMSymbolInTimeDomain     INTEGER (0 . . 13},
    firstOFDMSymbolInTimeDomain2    INTEGER (0 . . 12}
    cdm-Type                        ENUMERATED {noCDM, fd-CDM2, cdm4-FD2-TD2, cdm8-FD2-
TD4},
        density                         CHOICE {
        dot5                            ENUMERATED {evenPRBs, oddPRBs},
        one                                 NULL,
        three                           NULL,
        spare                           NULL
    },
    freqBand                        CSI-FrequencyOccupation,
    . . .
}
```

A case where the quantity is set as "none" is a case where an aperiodic TRS is triggered or a case where repetition is configured.

In this case, the report of the UE may be omitted only when repetition is set as "ON."

CSI Measurement

The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported. a 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. in addition, in ZP CSI-RS based IMR, each port emulates an interference layer having (a preferable channel and) precoded NZP CSI-RS. This is for intra-cell interference measurement with respect to a multi-user case and primarily targets MU interference.

The eNB transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥1 CSI resource set (given by higher layer parameter csi-RS-ResourceSetList). Here, the CSI resource setting corresponds to the CSI-RS-resourcesetlist. Here, S represents the number of configured CSI-RS resource sets. here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id. In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent. The number S of configured CSI-RS resource sets is limited to '1' with respect to periodic and semi-persistent CSI resource settings. Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI Computation

When interference measurement is performed on CSI-IM, each CSI-RS resource for channel measurement is associated with the CSI-IM resource for each resource by an order of CSI-RS resources and CSI-IM resources within a corresponding resource set. The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.

Each NZP CSI-RS port configured for interference measurement corresponds to an interference transport layer.

In all interference transport layers of the NZP CSI-RS port for interference measurement, an energy per resource element (EPRE) ratio is considered.

Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources which may be used by the UE are controlled by the eNB.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states. In the aperiodicTriggerStateList, each trigger state includes an associated CSI-ReportConfigs list indicating resource set IDs for a channel and selectively interference. In semiPersistentOnPUSCH-TriggerStateList, each trigger state includes one associated CSI-ReportConfig.

Furthermore, a time domain behavior of CSI reporting supports periodic, semi-persistent, aperiodic.

The periodic CSI reporting is performed on short PUCCH and long PUCCH. The periodicity and slot offset of the periodic CSI reporting may be configured through RRC and refer to the CSI-ReportConfig IE.

SP CSI reporting is performed on short PUCCH, long PUCCH, or PUSCH.

In the case of SP CSI on the short/long PUCCH, the periodicity and the slot offset are configured as the RRC and the CSI reporting to separate MAC CE is activated/deactivated.

In the case of the SP CSI on the PUSCH, the periodicity of the SP CSI reporting is configured through the RRC, but the slot offset is not configured through the RRC and the SP CSI reporting is activated/deactivated by DCI (format 0_1). A separated RNTI (SP-CSI C-RNTI) is used on a PUSCH with respect to SP CSI reporting.

The first CSI report timing follows a PUSCH time domain allocation value indicated in DCI. Subsequent CSI report timing follows a period configured by RRC.

DCI format 0_1 includes a CSI request field, and may activate/deactivate a specific configured SP-CSI trigger state. SP CSI reporting has the same or similar activation/deactivation as a mechanism having data transmission on an SPS PUSCH.

iii) Aperiodic CSI reporting is performed on a PUSCH, and is triggered by DCI. In this case, information related to the trigger of the aperiodic CSI reporting may be delivered/indicated/configured through a MAC-CE.

In the case of AP CSI having an AP CSI-RS, AP CSI-RS timing is configured by RRC, and timing for AP CSI reporting is dynamically controlled by DCI.

A method (e.g., transmission in order of an RI, a WB PMI/CQI, an SB PMI/CQI) of dividing and reporting CSI at multiple reporting instances applied to PUCCH-based CSI report in LTE is not applied to NR. Instead, in NR, a specific CSI report is limited so that it is not configured in a short/long PUCCH, and a CSI omission rule is defined. Furthermore, in relation to AP CSI reporting timing, a PUSCH symbol/slot location is dynamically indicated by DCI. Furthermore, candidate slot offsets are configured by RRC. With respect to CSI reporting, a slot offset (Y) is configured for each reporting setting. With respect to a UL-SCH, a slot offset K2 is separately configured.

2 CSI latency classes (low latency class and high latency class) are defined from a viewpoint of CSI computation complexity. Low latency CSI is a WB CSI including a maximum 4 ports type-I codebook or a maximum 4-ports non-PMI feedback CSI. High latency CSI refers to different CSI except low latency CSI. With respect to a normal UE, (Z, Z') is defined in a unit of OFDM symbols. In this case, Z indicates a minimum CSI processing time until a CSI report is performed after aperiodic CSI triggering DCI is received. Furthermore, Z' indicates a minimum CSI processing time until a CSI report is performed after a CSI-RS for channel/interference is received.

Additionally, a UE reports the number of pieces of CSI which may be simultaneously computed.

Reporting Configurations

The UE shall calculate CSI parameters (if reported) assuming the following dependencies between CSI parameters (if reported)

conditioned on the reported CQI, PMI, RI and CRI

CQI shall be calculated conditioned on the reported PMI, RI and CRI

PMI shall be calculated conditioned on the reported RI and CRI

RI shall be calculated conditioned on the reported CRI.

The Reporting configuration for CSI may be aperiodic (using PUSCH), periodic (using PUCCH) or semi-persistent (using PUCCH, and DCI activated PUSCH). The CSI-RS Resources may be periodic, semi-persistent, or aperiodic. Table 9 shows the supported combinations of CSI Reporting configurations and CSI-RS Resource configurations and how the CSI Reporting is triggered for each CSI-RS Resource configuration. Periodic CSI-RS is configured by higher layers. Semi-persistent CSI-RS is activated and deactivated as described in predefined standard (e.g., 3GPP TS 38.214, Subclause 5.2.1.5.2). Aperiodic CSI-RS is configured and triggered/activated as described in predefined standard (e.g., 3GPP TS 38.214, Subclause 5.2.1.5.1).

TABLE 9

| CSI-RS Configuration | Periodic CSI Reporting | Semi-Persistent CSI Reporting | Aperiodic CSI Reporting |
|---|---|---|---|
| Periodic CSI-RS | No dynamic triggering | For reporting on PUCCH, the UE receives an activation command [10, TS 38.321]; for reporting on PUSCH, the UE receives triggering on DCI | Triggered by DCI: additionally, activation command [10, TS 38.321] possible as defined in Subclause 5.2.1.5.1. |

TABLE 9-continued

| CSI-RS Configuration | Periodic CSI Reporting | Semi-Persistent CSI Reporting | Aperiodic CSI Reporting |
|---|---|---|---|
| Semi-Persistent CSI-RS | Not Supported | For reporting on PUCCH, the UE receives an activation command [10, TS 38.321]; for reporting on PUSCH, the UE receives triggering on DCI | Triggered by DCI: additionally, activation command [10, TS 38.321] possible as desined in Sublcause 5.2.1.5.1. |
| Aperiodic CSI-RS | Not Supported | Not Supported | Triggered by DCI: additionally, activation command [10, TS 38.321] possible as defined in Subclause 5.2.1.5.1. |

Furthermore, information related to activation/deactivation/trigger by a MAC-CE related to Semi-Persistent/Aperiodic CSI reporting defined in a predefined standard (e.g., 3GPP TS38.321) is described.

Activation/Deactivation of Semi-Persistent CSI-RS/CSI-IM Resource Set

The network may activate and deactivate the configured Semi-persistent CSI-RS/CSI-IM resource sets of a Serving Cell by sending the SP CSI-RS/CSI-IM Resource Set Activation/Deactivation MAC CE described in subclause.

The configured Semi-persistent CSI-RS/CSI-IM resource sets are initially deactivated upon configuration and after a handover.

The MAC entity shall:
if the MAC entity receives an SP CSI-RS/CSI-IM Resource Set Activation/Deactivation MAC CE on a Serving Cell:
2> indicate to lower layers the information regarding the SP CSI-RS/CSI-IM Resource Set Activation/Deactivation MAC CE.

Aperiodic CSI Trigger State Subselection

The network may select among the configured aperiodic CSI trigger states of a Serving Cell by sending the Aperiodic CSI Trigger State Subselection MAC CE described in subclause 6.1.3.13.

The MAC entity shall:
if the MAC entity receives an Aperiodic CSI trigger State Subselection MAC CE on a Serving Cell:
2> indicate to lower layers the information regarding Aperiodic CSI trigger State Subselection MAC CE.

Precoding Matrix Indicator (PMI)

Hereinafter, a Type I single Panel codebook is described.

For 2 antenna ports {3000, 3001} and the UE configured with higher layer parameter codebookType set to 'typeI-SinglePanel' each PMI value corresponds to a codebook index given in Table 10. The UE is configured with the higher layer parameter twoTX-CodebookSubsetRestriction. The bitmap parameter twoTX-CodebookSubsetRestriction forms the bit sequence $a_5, \ldots, a_1, a_0$ where $a_0$ is the LSB and $a_5$ is the MSB and where a bit value of zero indicates that PMI reporting is not allowed to correspond to the precoder associated with the bit. Bits 0 to 3 are associated respectively with the codebook indices 0 to 3 for $\upsilon=1$ layer, and bits 4 and 5 are associated respectively with the codebook indices 0 and 1 for $\upsilon=2$ layers.

Codebooks for 1-layer and 2-layer CSI reporting using antenna ports 3000 to 3001 is are given in Table 10.

TABLE 10

| | Number of layers $\upsilon$ | |
|---|---|---|
| Codebook index | 1 | 2 |
| 0 | $\frac{1}{\sqrt{2}}\begin{bmatrix}1\\1\end{bmatrix}$ | $\frac{1}{2}\begin{bmatrix}1 & 1\\1 & -1\end{bmatrix}$ |
| 1 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 2 | $\frac{1}{\sqrt{2}}\begin{bmatrix}1\\-1\end{bmatrix}$ | — |
| 3 | $\frac{1}{\sqrt{2}}\begin{bmatrix}1\\-j\end{bmatrix}$ | — |

For 4 antenna ports {3000, 3001, 3002, 3003}, 8 antenna ports {3000, 3001, ..., 3007}, 12 antenna ports {3000, 3001, ..., 3011}, 16 antenna ports {3000, 3001, ..., 3015}, 24 antenna ports {3000, 3001, ..., 3023}, and 32 antenna ports {3000, 3001, ..., 3031}, and the UE configured with higher layer parameter codebookType set to 'typeI-SinglePanel', except when the number of layers $\upsilon \in \{2,3,4\}$ (where $\upsilon$ is the associated RI value), each PMI value corresponds to three codebook indices $i_{1,1}, i_{1,2}, i_2$. When the number of layers $\upsilon \in \{2,3,4\}$ each PMI value corresponds to four codebook indices $i_{1,1}, i_{1,2}, i_{1,3}, i_2$. The composite codebook index $i_1$ is defined by $$i_1 = \begin{cases} [i_{1,1} \; i_{1,2}] & \upsilon \notin \{2,3,4\} \\ [i_{1,1} \; i_{1,2} \; i_{1,3}] & \upsilon \in \{2,3,4\} \end{cases}$$

The codebooks for 1-8 layers are given respectively in Tables 14 to 27. The mapping from $i_{1,3}$ to $k_1$ and $k_2$ for 2-layer reporting is given in Table 12. The mapping from $i_{1,3}$ to $k_1$ and $k_2$ for 3-layer reporting and 4-layer reporting when $P_{CSI-RS} < 16$ is given in Table 13. The quantities $\varphi_n$, $\theta_p$, $u_m$, $v_{l,m}$, and $\tilde{v}_{l,m}$ are given by $$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

$$\tilde{v}_{l,m} = \begin{bmatrix} u_m & e^{j\frac{4\pi l}{O_1 N_1}} u_m & \ldots & e^{j\frac{4\pi l(N_1/2-1)}{O_1 N_1}} u_m \end{bmatrix}^T.$$

The values of $N_1$ and $N_2$ are configured with the higher layer parameter n1-n2, respectively. The supported configurations of $(N_1, N_2)$ for a given number of CSI-RS ports and the corresponding values of $(O_1, O_2)$ are given in Table 11. The number of CSI-RS ports, $P_{CSI-RS}$, is $2N_1N_2$.

UE shall only use $i_{1,2} = 0$ and shall not report $i_{1,2}$ if the value of N2 is 1.

The bitmap parameter n1-n2 forms the bit sequence $a_{A_c-1}, \ldots, a_1, a_0$ where $a_0$ is the LSB and $a_{A_c-1}$ is the MSB and where a bit value of zero indicates that PMI reporting is not allowed to correspond to any precoder associated with the bit. The number of bits is given by $A_c = N_1 O_1 N_2 O_2$. Except when the number of layers $\upsilon \in \{3,4\}$ and the number of antenna ports is 16, 24, or 32, bit $a_{N_2 O_2 l + m}$ is associated with all precoders based on the quantity $v_{l,m}$, $l = 0, \ldots, N_1 O_1 - 1$, $m = 0, \ldots, N_2 O_2 - 1$. When the number of layers $\upsilon \in \{3,4\}$ and the number of antenna ports is 16, 24, or 32, bits $a_{(N_2 O_2 (2l-1)+m) \bmod N_1 O_1 N_2 O_2}$, $a_{N_2 O_2 (2l)+m}$, and $a_{N_2 O_2 (2l+1)+m}$ are each associated with all precoders based on the quantity $\tilde{v}_{l,m}$, $l = 0, \ldots, N_1 O_1 / 2 - 1$, $m = 0, \ldots, N_2 O_2 - 1$;

if one or more of the associated bits is zero, then PMI reporting is not allowed to correspond to any precoder based on $v_{l,m}$.

For UE configured with higher layer parameter codebookType set to 'typeI-SinglePanel', the bitmap parameter typeI-SinglePanel-ri-Restriction forms the bit sequence $r_7, \ldots, r_1, r_0$ where $r_0$ is the LSB and $r_7$ is the MSB. When $r_i$ is zero, $i \in \{0, 1, \ldots, 7\}$, PMI and RI reporting are not allowed to correspond to any precoder associated with $\upsilon = i+1$ layers.

For UE configured with higher layer parameter reportQuantity set to 'cri-RI-i1-CQI', the bitmap parameter typeI-SinglePanel-codebookSubsetRestriction-i2 forms the bit sequence $b_{15}, \ldots, b_1, b_0$ where $b_0$ is the LSB and $b_{15}$ is the MSB. The bit $b_i$ is associated with precoders corresponding to codebook index $i_2 = i$. When $b_i$ is zero, the randomly selected precoder for CQI calculation is not allowed to correspond to any precoder associated with the bit $b_i$.

Supported configurations of $(N_1, N_2)$ and $(O_1, O_2)$ are given in Table 11.

TABLE 11

| Number of CSI-RS antenna ports, $P_{CSI-RS}$ | $(N_1, N_2)$ | $(O_1, O_2)$ |
|---|---|---|
| 4 | (2, 1) | (4, 1) |
| 8 | (2, 2) | (4, 4) |
|   | (4, 1) | (4, 1) |
| 12 | (3, 2) | (4, 4) |
|   | (6, 1) | (4, 1) |

TABLE 11-continued

| Number of CSI-RS antenna ports, $P_{CSI-RS}$ | $(N_1, N_2)$ | $(O_1, O_2)$ |
|---|---|---|
| 16 | (4, 2) | (4, 4) |
|   | (8, 1) | (4, 1) |
| 24 | (4, 3) | (4, 4) |
|   | (6, 2) | (4, 4) |
|   | (12, 1) | (4, 1) |
| 32 | (4, 4) | (4, 4) |
|   | (8, 2) | (4, 4) |
|   | (16, 1) | (4, 1) |

Mapping of $i_{1,3}$ to $k_1$ and $k_2$ for 2-layer CSI reporting are given in Table 12.

TABLE 12

| | $N_1 > N_2 > 1$ | | $N_1 = N_2$ | | $N_1 = 2, N_2 = 1$ | | $N_1 > 2, N_2 = 1$ | |
|---|---|---|---|---|---|---|---|---|
| $i_{1,3}$ | $k_1$ | $k_2$ | $k_1$ | $k_2$ | $k_1$ | $k_2$ | $k_1$ | $k_2$ |
| 0 | 0 | 0 | 0 | 0 | 0 | 0 | 0 | 0 |
| 1 | $O_1$ | 0 | $O_1$ | 0 | $O_1$ | 0 | $O_1$ | 0 |
| 2 | 0 | $O_2$ | 0 | $O_2$ |   |   | $2O_1$ | 0 |
| 3 | $2O_1$ | 0 | $O_1$ | $O_2$ |   |   | $3O_1$ | 0 |

Mapping of $i_{1,3}$ to $k_1$ and $k_2$ for 3-layer and 4-layer CSI reporting when $P_{CSI-RS} < 16$ is given in Table 13.

TABLE 13

| | $N_1 = 2, N_2 = 1$ | | $N_1 = 4, N_2 = 1$ | | $N_1 = 6, N_2 = 1$ | | $N_1 = 2, N_2 = 2$ | | $N_1 = 3, N_2 = 2$ | |
|---|---|---|---|---|---|---|---|---|---|---|
| $i_{1,3}$ | $k_1$ | $k_2$ | $k_1$ | $k_2$ | $k_1$ | $k_2$ | $k_1$ | $k_2$ | $k_1$ | $k_2$ |
| 0 | $O_1$ | 0 | $O_1$ | 0 | $O_1$ | 0 | $O_1$ | 0 | $O_1$ | 0 |
| 1 |   |   | $2O_1$ | 0 | $2O_1$ | 0 | 0 | $O_2$ | 0 | $O_2$ |
| 2 |   |   | $3O_1$ | 0 | $3O_1$ | 0 | $O_1$ | $O_2$ | $O_1$ | $O_2$ |
| 3 |   |   |   |   | $4O_1$ | 0 |   |   | $2O_1$ | 0 |

Codebook for 1-layer CSI reporting using antenna ports 3000 to 2999+PCSI-RS is given in Tables 14 to 16.

TABLE 14

| codebookMode = 1 | | | |
|---|---|---|---|
| $i_{1,1}$ | $i_{1,2}$ | $i_2$ | |
| $0, 1, \ldots, N_1 O_1 - 1$ | $0, 1, \ldots, N_2 O_2 - 1$ | $0, 1, 2, 3$ | $W_{i_{1,1}, i_{1,2}, i_2}^{(1)}$ | where $W_{l,m,n}^{(1)} = \dfrac{1}{\sqrt{P_{CSI-RS}}} \begin{bmatrix} v_{l,m} \\ \varphi_n v_{l,m} \end{bmatrix}$.

TABLE 15

| codebookMode = 2, $N_2 > 1$ | | | | | |
|---|---|---|---|---|---|
| | | $i_2$ | | | |
| $i_{1,1}$ | $i_{1,2}$ | 0 | 1 | 2 | 3 |
| $0, 1, \ldots, \dfrac{N_1 O_1}{2} - 1$ | $0, 1, \ldots, \dfrac{N_2 O_2}{2} - 1$ | $W_{2i_{1,1}, 2i_{1,2}, 0}^{(1)}$ | $W_{2i_{1,1}, 2i_{1,2}, 1}^{(1)}$ | $W_{2i_{1,1}, 2i_{1,2}, 2}^{(1)}$ | $W_{2i_{1,1}, 2i_{1,2}, 3}^{(1)}$ |
| | | $i_2$ | | | |
| $i_{1,1}$ | $i_{1,2}$ | 4 | 5 | 6 | 7 |

TABLE 15-continued

| codebookMode = 2, $N_2 > 1$ | | | | | |
|---|---|---|---|---|---|
| $0, 1, \ldots, \frac{N_1O_2}{2} - 1$ | $0, 1, \ldots, \frac{N_2O_2}{2} - 1$ | $W^{(1)}_{2i_{1,1}+1,2i_{1,2},0}$ | $W^{(1)}_{2i_{1,1}+1,2i_{1,2},1}$ | $W^{(1)}_{2i_{1,1}+1,2i_{1,2},2}$ | $W^{(1)}_{2i_{1,1}+1,2i_{1,2},3}$ |
| | | | $i_2$ | | |
| $i_{1,1}$ | $i_{1,2}$ | 8 | 9 | 10 | 11 |
| $0, 1, \ldots, \frac{N_1O_1}{2} - 1$ | $0, 1, \ldots, \frac{N_2O_2}{2} - 1$ | $W^{(1)}_{2i_{1,1},2i_{1,2}+1,0}$ | $W^{(1)}_{2i_{1,1},2i_{1,2}+1,1}$ | $W^{(1)}_{2i_{1,1},2i_{1,2}+1,2}$ | $W^{(1)}_{2i_{1,1},2i_{1,2}+1,3}$ |
| | | | $i_2$ | | |
| $i_{1,1}$ | $i_{1,2}$ | 12 | 13 | 14 | 15 |
| $0, 1, \ldots, \frac{N_1O_1}{2} - 1$ | $0, 1, \ldots, \frac{N_2O_2}{2} - 1$ | $W^{(1)}_{2i_{1,1}+1,2i_{1,2}+1,0}$ | $W^{(1)}_{2i_{1,1}+1,2i_{1,2}+1,1}$ | $W^{(1)}_{2i_{1,1}+1,2i_{1,2}+1,2}$ | $W^{(1)}_{2i_{1,1}+1,2i_{1,2}+1,3}$ | where $W^{(1)}_{l,m,n} = \frac{1}{\sqrt{P_{CSI-RS}}} \begin{bmatrix} v_{l,m} \\ \varphi_n v_{l,m} \end{bmatrix}$.

TABLE 16

| codebookMode = 2, $N_2 = 1$ | | | | | |
|---|---|---|---|---|---|
| | | | $i_2$ | | |
| $i_{1,1}$ | $i_{1,2}$ | 0 | 1 | 2 | 3 |
| $0, 1, \ldots, \frac{N_1O_1}{2} - 1$ | 0 | $W^{(1)}_{2i_{1,1},0,0}$ | $W^{(1)}_{2i_{1,1},0,1}$ | $W^{(1)}_{2i_{1,1},0,2}$ | $W^{(1)}_{2i_{1,1},0,3}$ |
| | | | $i_2$ | | |
| $i_{1,1}$ | $i_{1,2}$ | 4 | 5 | 6 | 7 |
| $0, 1, \ldots, \frac{N_1O_1}{2} - 1$ | 0 | $W^{(1)}_{2i_{1,1}+1,0,0}$ | $W^{(1)}_{2i_{1,1}+1,0,1}$ | $W^{(1)}_{2i_{1,1}+1,0,2}$ | $W^{(1)}_{2i_{1,1}+1,0,3}$ |
| | | | $i_2$ | | |
| $i_{1,1}$ | $i_{1,2}$ | 8 | 9 | 10 | 11 |
| $0, 1, \ldots, \frac{N_1O_1}{2} - 1$ | 0 | $W^{(1)}_{2i_{1,1}+2,0,0}$ | $W^{(1)}_{2i_{1,1}+2,0,1}$ | $W^{(1)}_{2i_{1,1}+2,0,2}$ | $W^{(1)}_{2i_{1,1}+2,0,3}$ |
| | | | $i_2$ | | |
| $i_{1,1}$ | $i_{1,2}$ | 12 | 13 | 14 | 15 |
| $0, 1, \ldots, \frac{N_1O_1}{2} - 1$ | 0 | $W^{(1)}_{2i_{1,1}+3,0,0}$ | $W^{(1)}_{2i_{1,1}+3,0,1}$ | $W^{(1)}_{2i_{1,1}+3,0,2}$ | $W^{(1)}_{2i_{1,1}+3,0,3}$ | where $W^{(1)}_{l,m,n} = \frac{1}{\sqrt{P_{CSI-RS}}} \begin{bmatrix} v_{l,m} \\ \varphi_n v_{l,m} \end{bmatrix}$.

Codebook for 2-layer CSI reporting using antenna ports 3000 to 2999+PCSI-RS is given in Tables 17 to 19.

TABLE 17

| codebookMode = 1 | | | |
|---|---|---|---|
| $i_{1,1}$ | $i_{1,2}$ | $i_2$ | |
| $0, 1, \ldots, N_1O_1 - 1$ | $0, \ldots, N_2O_2 - 1$ | 0, 1 | $W^{(2)}_{i_{1,1},i_{1,1}+k_1,i_{1,2},i_{1,2}+k_2,i_2}$ | where $W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$.

and the mapping from $i_{1,3}$ to $k_1$ and $k_2$ is given in Table 5.2.2.2.1-3.

TABLE 18

| | | $i_2$ | |
|---|---|---|---|
| $i_{1,1}$ | $i_{1,2}$ | 0 | 1 |
| $0, \ldots, \frac{N_1 O_1}{2} - 1$ | $0, \ldots, \frac{N_2 O_2}{2} - 1$ | $W^{(2)}_{2i_{1,1}, 2i_{1,1}+k_1, 2i_{1,2}, 2i_{1,2}+k_2, 0}$ | $W^{(2)}_{2i_{1,1}, 2i_{1,1}+k_1, 2i_{1,2}, 2i_{1,2}+k_2, 0}$ |

| | | $i_2$ | |
|---|---|---|---|
| $i_{1,1}$ | $i_{1,2}$ | 2 | 3 |
| $0, \ldots, \frac{N_1 O_1}{2} - 1$ | $0, \ldots, \frac{N_2 O_2}{2} - 1$ | $W^{(2)}_{2i_{1,1}+1, 2i_{1,1}+1+k_1, 2i_{1,2}, 2i_{1,2}+k_2, 0}$ | $W^{(2)}_{2i_{1,1}+1, 2i_{1,1}+1+k_1, 2i_{1,2}, 2i_{1,2}+k_2, 1}$ |

| | | $i_2$ | |
|---|---|---|---|
| $i_{1,1}$ | $i_{1,2}$ | 4 | 5 |
| $0, \ldots, \frac{N_1 O_1}{2} - 1$ | $0, \ldots, \frac{N_2 O_2}{2} - 1$ | $W^{(2)}_{2i_{1,1}, 2i_{1,1}+k_1, 2i_{1,2}, 2i_{1,2}+1+k_2, 0}$ | $W^{(2)}_{2i_{1,1}, 2i_{1,1}k_1, 2i_{1,2}+1, 2i_{1,2}+1+k_2, 1}$ |

| | | $i_2$ | |
|---|---|---|---|
| $i_{1,1}$ | $i_{1,2}$ | 6 | 7 |
| $0, \ldots, \frac{N_1 O_1}{2} - 1$ | $0, \ldots, \frac{N_2 O_2}{2} - 1$ | $W^{(2)}_{2i_{1,1}+1, 2i_{1,1}+1+k_1, 2i_{1,2}+1, 2i_{1,2}+1+k_2, 0}$ | $W^{(2)}_{2i_{1,1}+1, 2i_{1,1}+1+k_1, 2i_{1,2}+1, 2i_{1,2}+1+k_2, 1}$ | where $W^{(2)}_{l, l', m, m', n} = \frac{1}{\sqrt{2 P_{CSI-RS}}} \begin{bmatrix} v_{l,m} & v_{l',m'} \\ \varphi_n v_{l,m} & -\varphi_n v_{l',m'} \end{bmatrix}$.

and the mapping from $i_{1,3}$ to $k_1$ and $k_2$ is given in Table 5.2.2.2.1-3.

TABLE 19

| | | $i_2$ | | | |
|---|---|---|---|---|---|
| $i_{1,1}$ | $i_{1,2}$ | 0 | 1 | 2 | 3 |
| $0, \ldots, \frac{N_1 O_1}{2} - 1$ | 0 | $W^{(2)}_{2i_{1,1}, 2i_{1,1}+k_1, 0, 0, 0}$ | $W^{(2)}_{2i_{1,1}, 2i_{1,1}+k_1, 0, 0, 1}$ | $W^{(2)}_{2i_{1,1}+1, 2i_{1,1}+1+k_1, 0, 0, 0}$ | $W^{(2)}_{2i_{1,1}+1, 2i_{1,1}+1+k_1, 0, 0, 1}$ |

| | | $i_2$ | | | |
|---|---|---|---|---|---|
| $i_{1,1}$ | $i_{1,2}$ | 4 | 5 | 6 | 7 |
| $0, \ldots, \frac{N_1 O_1}{2} - 1$ | 0 | $W^{(2)}_{2i_{1,1}+2, 2i_{1,1}+2+k_1, 0, 0, 0}$ | $W^{(2)}_{2i_{1,1}+2, 2i_{1,1}+2+k_1, 0, 0, 1}$ | $W^{(2)}_{2i_{1,1}+3, 2i_{1,1}+3+k_1, 0, 0, 0}$ | $W^{(2)}_{2i_{1,1}+3, 2i_{1,1}+3+k_1, 0, 0, 1}$ | where $W^{(2)}_{l, l', m, m', n} = \frac{1}{\sqrt{2 P_{CSI-RS}}} \begin{bmatrix} v_{l,m} & v_{l',m'} \\ \varphi_n v_{l,m} & -\varphi_n v_{l',m'} \end{bmatrix}$.

and the mapping from $i_{1,3}$ to $k_1$ is given in Table 5.2.2.2.1-3.

Codebook for 3-layer CSI reporting using antenna ports 3000 to 2999+P$_{CSI-RS}$ is given in Tables 20 to 21.

TABLE 20

| | | | |
|---|---|---|---|
| codebookMode = 1-2, $P_{CSI-RS} < 16$ | | | |
| $i_{1,1}$ | $i_{1,2}$ | $i_2$ | |
| $0, \ldots, N_1 O_1 - 1$ | $0, 1, \ldots, N_2 O_2 - 1$ | $0, 1$ | $W^{(3)}_{i_{1,1}, i_{1,1}+k_1, i_{1,2}, i_{1,2}+k_2, i_2}$ | where $W^{(3)}_{l, l', m, m', n} = \frac{1}{\sqrt{3 P_{CSI-RS}}} \begin{bmatrix} v_{l,m} & v_{l',m'} & v_{l,m} \\ \varphi_n v_{m,l} & \varphi_n v_{l',m'} & -\varphi_n v_{l,m} \end{bmatrix}$.

and the mapping from $i_{1,3}$ to $k_1$ and $k_2$ is given in Table 5.2.2.2.1-4.

TABLE 21

| | codebookMode = 1-2, $P_{CSI-RS} \geq 16$ | | |
|---|---|---|---|
| $i_{1,1}$ | $i_{1,2}$ | $i_{1,3}$ | $i_2$ |
| $0, \ldots, \frac{N_1 O_1}{2} - 1$ | $0, \ldots, N_2 O_2 - 1$ | $0, 1, 2, 3$ | $0, 1$    $W^{(3)}_{i_{1,1},i_{1,2},i_{1,3},i_2}$ | where $W^{(3)}_{l,m,p,n} = \frac{1}{\sqrt{eP_{CSI-RS}}} \begin{bmatrix} \tilde{v}_{l,m} & \tilde{v}_{l,m} & \tilde{v}_{l,m} \\ \theta_p \tilde{v}_{l,m} & -\tilde{\theta}_p \tilde{v}_{l,m} & \theta_p \tilde{v}_{l,m} \\ \varphi_n \tilde{v}_{l,m} & \varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} \end{bmatrix}$.

Codebook for 4-layer CSI reporting using antenna ports 3000 to 2999+PCSI-RS is given in Tables 22 to 23.

TABLE 22

| | codebookMode = 1-2, $P_{CSI-RS} < 16$ | |
|---|---|---|
| $i_{1,1}$ | $i_{1,2}$ | $i_2$ |
| $0, \ldots, N_1 O_1 - 1$ | $0, 1, \ldots, N_2 O_2 - 1$ | $0, 1$    $W^{(4)}_{i_{1,1},i_{1,1}+k_1,i_{1,2},i_{1,2}+k_2,i_2}$ | where $W^{(4)}_{l,l',m,m',n} = \frac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$.

and the mapping from $i_{1,3}$ to $k_1$ and $k_2$ is given in Table 5.2.2.2.1-4.

TABLE 23

| | codebookMode = 1-2, $P_{CSI-RS} \geq 16$ | | |
|---|---|---|---|
| $i_{1,1}$ | $i_{1,2}$ | $i_{1,3}$ | $i_2$ |
| $0, \ldots, \frac{N_1 O_1}{2} - 1$ | $0, \ldots, N_2 O_2 - 1$ | $0, 1, 2, 3$ | $0, 1$    $W^{(4)}_{i_{1,1},i_{1,2},i_{1,3},i_2}$ | where $W^{(4)}_{l,m,p,n} = \frac{1}{\sqrt{4P_{CSI-RS}}} \begin{bmatrix} \tilde{v}_{l,m} & \tilde{v}_{l,m} & \tilde{v}_{l,m} & \tilde{v}_{l,m} \\ \theta_p \tilde{v}_{l,m} & -\tilde{\theta}_p \tilde{v}_{l,m} & \theta_p \tilde{v}_{l,m} & -\theta_p \tilde{v}_{l,m} \\ \varphi_n \tilde{v}_{l,m} & \varphi_n \tilde{v}_{l,m} & -\varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} & \varphi_n \theta_p \tilde{v}_{l,m} \end{bmatrix}$.

Codebook for 5-layer CSI reporting using antenna ports 3000 to 2999+PCSI-RS is given in Table 24.

TABLE 24

| | codebookMode = 1-2 | | |
|---|---|---|---|
| | $i_{1,1}$ | $i_{1,2}$ | $i_2$ |
| $N_2 > 1$ | $0, \ldots, N_1 O_1 - 1$ | $0, \ldots, N_2 O_2 - 1$ | $0, 1$    $W^{(5)}_{i_{1,1},i_{1,1}+O_1,i_{1,1}+O_1,i_{1,2},i_{1,2}+O_2,i_2}$ |
| $N_1 > 2, N_2 = 1$ | $0, \ldots, N_1 O_1 - 1$ | $0$ | $0, 1$    $W^{(5)}_{i_{1,1},i_{1,1}+O_1,i_{1,1}+2O_1,0,0,0,i_2}$ | where $W^{(5)}_{l,l',m,m',m'',n} = \frac{1}{\sqrt{5P_{CSI-RS}}} \begin{bmatrix} v_{l,m} & v_{l,m} & v_{l',m'} & v_{l',m'} & v_{l'',m''} \\ \varphi_n v_{l,m} & -\varphi_n v_{l,m} & v_{l',m'} & -v_{l',m'} & v_{l'',m''} \end{bmatrix}$.

Codebook for 6-layer CSI reporting using antenna ports 3000 to 2999+PCSI-RS is given in Table 25.

TABLE 25

| | codebookMode = 1-2 | | |
|---|---|---|---|
| | $i_{1,1}$ | $i_{1,2}$ | $i_2$ |
| $N_2 > 1$ | $0, \ldots, N_1 O_1 - 1$ | $0, \ldots, N_2 O_2 - 1$ | $0, 1$    $W^{(6)}_{i_{1,1},i_{1,1}+O_1,i_{1,1}+O_1,i_{1,2},i_{1,2}+O_2,i_2}$ |
| $N_1 > 2, N_2 = 1$ | $0, \ldots, N_1 O_1 - 1$ | $0$ | $0, 1$    $W^{(6)}_{i_{1,1},i_{1,1}+O_1,i_{1,1}+2O_1,0,0,0,i_2}$ | where $W^{(6)}_{l,l',m,m',m'',n} =$ $\frac{1}{\sqrt{6P_{CSI-RS}}} \begin{bmatrix} v_{l,m} & v_{l,m} & v_{l',m'} & v_{l',m'} & v_{l'',m''} & v_{l'',m''} \\ \varphi_n v_{l,m} & -\varphi_n v_{l,m} & \varphi_n v_{l',m'} & -\varphi_n v_{l',m'} & v_{l'',m''} & -v_{l'',m''} \end{bmatrix}$.

Codebook for 7-layer CSI reporting using antenna ports 3000 to 2999+PCSI-RS is given in Table 26.

TABLE 26

| | codebookMode = 1-2 | | | |
|---|---|---|---|---|
| | $i_{1,1}$ | $i_{1,2}$ | $i_2$ | |
| $N_1 = 4, N_2 = 1$ | $0, \ldots, \frac{N_1 O_1}{2} - 1$ | 0 | 0, 1 | $W^{(7)}_{i_{1,1}, i_{1,1}+O_1, i_{1,1}+2O_1, i_{1,1}+3O_1, 0,0,0,0,i_2}$ |
| $N_1 > 4, N_2 = 1$ | $0, \ldots, N_1 O_1 - 1$ | 0 | 0, 1 | $W^{(7)}_{i_{1,1}, i_{1,1}+O_1, i_{1,1}+2O_1, i_{1,1}+3O_1, 0,0,0,0,i_2}$ |
| $N_1 = 2, N_2 = 2$ | $0, \ldots, N_1 O_1 - 1$ | $0, \ldots, N_2 O_2 - 1$ | 0, 1 | $W^{(7)}_{i_{1,1}, i_{1,1}+O_1, i_{1,1}, i_{1,1}+O_1, i_{1,2}, i_{1,2}+O_2, i_{1,2}+O_2, i_2}$ |
| $N_1 > 2, N_2 = 2$ | $0, \ldots, N_1 O_1 - 1$ | $0, \ldots, \frac{N_2 O_2}{2} - 1$ | 0, 1 | $W^{(7)}_{i_{1,1}, i_{1,1}+O_1, i_{1,1}, i_{1,1}+O_1, i_{1,2}, i_{1,2}+O_2, i_{1,2}+O_2, i_2}$ |
| $N_1 > 2, N_2 > 2$ | $0, \ldots, N_1 O_1 - 1$ | $0, \ldots, N_2 O_2 - 1$ | 0, 1 | $W^{(7)}_{i_{1,1}, i_{1,1}+O_1, i_{1,1}, i_{1,1}+O_1, i_{1,2}, i_{1,2}+O_2, i_{1,2}+O_2, i_2}$ | where $W^{(7)}_{l,l',l'',l''',m,m',m'',m''',n} =$ $$\frac{1}{\sqrt{7 P_{CSI-RS}}} \begin{bmatrix} v_{l,m} & v_{l,m} & v_{l',m'} & v_{l',m'} & v_{l'',m''} & v_{l'',m''} & v_{l''',m'''} & v_{l''',m'''} \\ \varphi_n v_{l,m} & -\varphi_n v_{l,m} & \varphi_n v_{l',m'} & v_{l',m'} & -v_{l'',m''} & v_{l''',m'''} & -v_{l''',m'''} \end{bmatrix}$$

Codebook for 8-layer CSI reporting using antenna ports 3000 to 2999+PCSI-RS is given in Table 27.

TABLE 27

| | codebookMode = 1-2 | | | |
|---|---|---|---|---|
| | $i_{1,1}$ | $i_{1,2}$ | $i_2$ | |
| $N_1 = 4, N_2 = 1$ | $0, \ldots, \frac{N_1 O_1}{2} - 1$ | 0 | 0, 1 | $W^{(8)}_{i_{1,1}, i_{1,1}+O_1, i_{1,1}+2O_1, i_{1,1}+3O_1, 0,0,0,0,i_2}$ |
| $N_1 > 4, N_2 = 1$ | $0, \ldots, N_1 O_1 - 1$ | 0 | 0, 1 | $W^{(8)}_{i_{1,1}, i_{1,1}+O_1, i_{1,1}+2O_1, i_{1,1}+3O_1, 0,0,0,0,i_2}$ |
| $N_1 = 2, N_2 = 2$ | $0, \ldots, N_1 O_1 - 1$ | $0, \ldots, N_2 O_2 - 1$ | 0, 1 | $W^{(8)}_{i_{1,1}, i_{1,1}+O_1, i_{1,1}, i_{1,1}+O_1, i_{1,2}, i_{1,2}+O_2, i_{1,2}+O_2, i_2}$ |
| $N_1 > 2, N_2 = 2$ | $0, \ldots, N_1 O_1 - 1$ | $0, \ldots, \frac{N_2 O_2}{2} - 1$ | 0, 1 | $W^{(8)}_{i_{1,1}, i_{1,1}+O_1, i_{1,1}, i_{1,1}+O_1, i_{1,2}, i_{1,2}+O_2, i_{1,2}+O_2, i_2}$ |
| $N_1 > 2, N_2 > 2$ | $0, \ldots, N_1 O_1 - 1$ | $0, \ldots, N_2 O_2 - 1$ | 0, 1 | $W^{(8)}_{i_{1,1}, i_{1,1}+O_1, i_{1,1}, i_{1,1}+O_1, i_{1,2}, i_{1,2}+O_2, i_{1,2}+O_2, i_2}$ | where $W^{(8)}_{l,l',l'',l''',m,m',m'',m''',n} = \frac{1}{\sqrt{8 P_{CSI-RS}}}$ $$\begin{bmatrix} v_{l,m} & v_{l,m} & v_{l',m'} & v_{l',m'} & v_{l'',m''} & v_{l'',m''} & v_{l''',m'''} & v_{l''',m'''} \\ \varphi_n v_{l,m} & -\varphi_n v_{l,m} & \varphi_n v_{l',m'} & -\varphi_n v_{l',m'} & v_{l'',m''} & -v_{l'',m''} & v_{l''',m'''} & -v_{l''',m'''} \end{bmatrix}$$

In Beyond 5G communication, there are scenarios which include the existing spectrum (under 6 GHz, mmWave) and attempt to use an ultra wide band of a THz band. A common THz band indicates 100 GHz to 10 THz, but even 100 GHz to 300 GHz are considered as an initial THz region. The THz band is different from the existing under 100 GHz band channel in that the number of existing multipaths is significantly (1 to 3 clusters) is reduced. Accordingly, in an LoS environment or an environment using one to two reflection plates, there is a good possibility that the THz band will be used in a communication scenario having very low mobility. Orbital Angular Momentum (OAM) is discussed as replacing the multiplexing of the existing H/V Polarization maximum 2, but may be used as N multiplexing depending on an antenna Array application, thereby being capable of increasing a communication capacity. For example, the transmission side can maximize a multiplexing gain by simultaneously transmitting beams capable of sufficiently satisfying orthogonality among beams using OAM, and the reception side can perform reception based on a corresponding OAM states.

The present disclosure proposes a method (hereinafter a first embodiment) for OAM-based multiplexing by considering a THz band (e.g., 100 GHz to 10 THz) communication environment. That is, communication can be performed through OAM-based multiplexing in a way that a base station indicates a capability for an (orthogonal) OAM state and/or a UE transmits a detectable (orthogonal) OAM state.

Furthermore, the present disclosure proposes a method of using/indicating a precoding matrix (or codebook) which may be applied to OAM (and/or OAM-based transmission and reception) and a corresponding method (hereinafter a second embodiment). In other words, there is proposed a precoding matrix which may be applied to OAM (and/or OAM-based transmission and reception) because the existing precoding matrix indication method according to polarization has a problem in representing OAM. That is, the second embodiment may be called a method of applying a phase value for OAM within a codebook.

Hereinafter, in the present disclosure, prior to a description of the proposed methods, after a possibility in which OAM may be used and problems in using OAM are described and the concept of radio OAM/OAM is described, the proposed methods are described.

OAM Transmission Possibility

In order to check an OAM transmission possibility (or availability possibility), an OAM beam is generated using a high frequency structure simulator (HFSS).

Figure 18A:
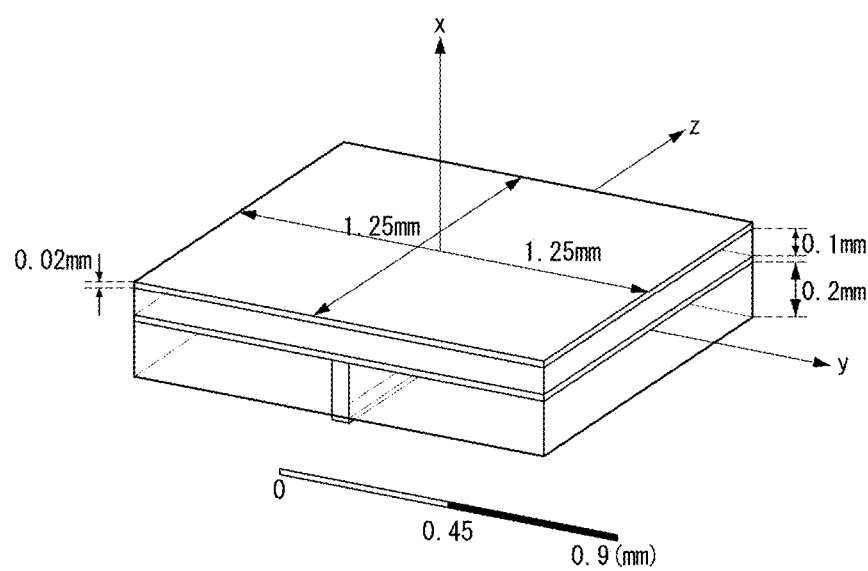
FIG. 18A illustrates a patch antenna designed for an HFSS.
Figure 18B:
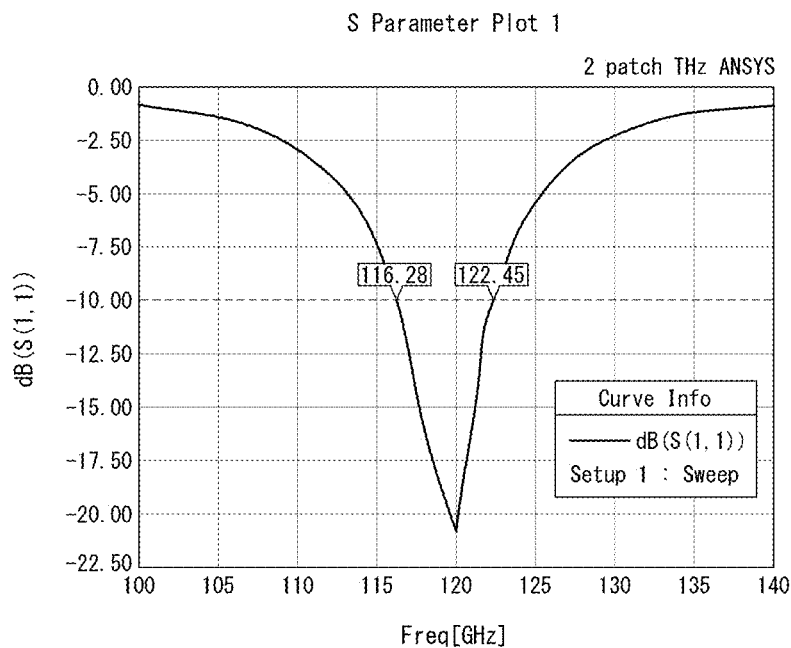
FIG. 18B illustrates frequency characteristics of the antenna of FIG. 18A.
Figure 18C:
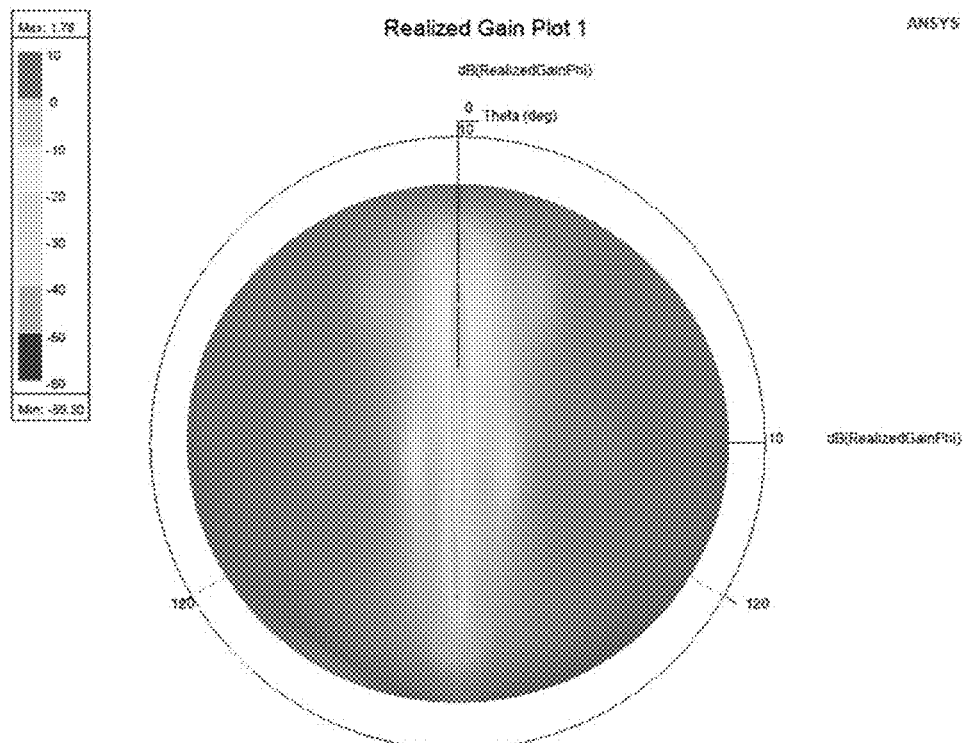
FIG. 18C illustrates H-pole realized gains of the antenna of FIG. 18A.
Figure 18D:
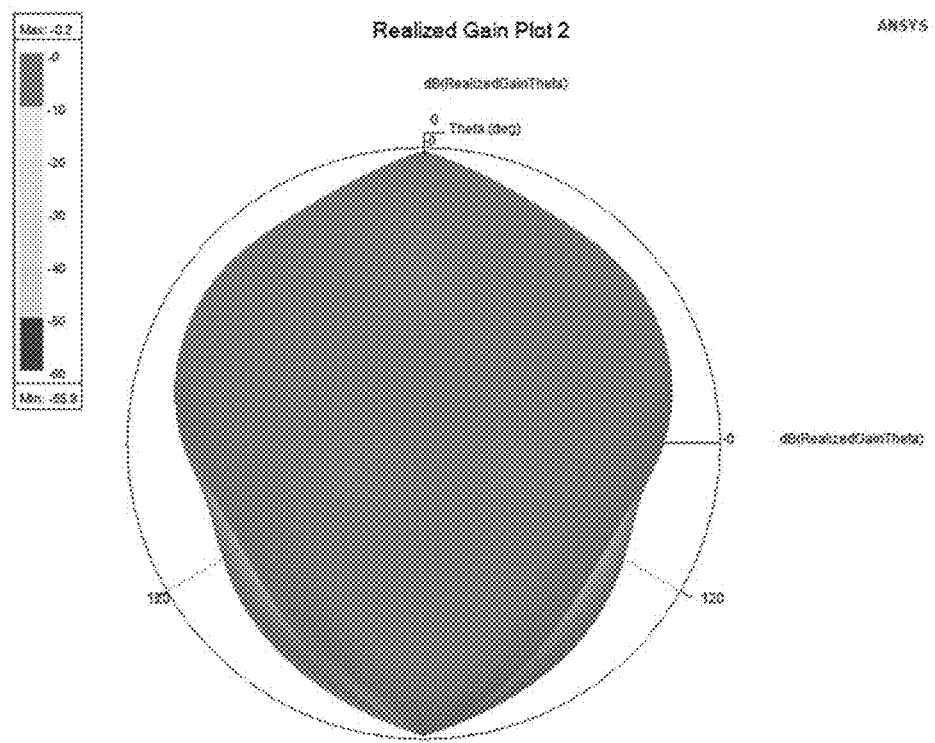
FIG. 18D illustrates V-pole realized gains of the antenna of FIG. 18A.

FIG. 18A illustrates a patch antenna designed for an HFSS. The corresponding patch antenna is a 120 GHz single patch antenna (i.e., v-pole antenna). FIG. 18B illustrates frequency characteristics of the antenna of FIG. 18A. FIG. 18C illustrates H-pole realized gains of the antenna of FIG. 18A. FIG. 18D illustrates V-pole realized gains of the antenna of FIG. 18A. From the results of FIG. 18B, it may be seen that the antenna of FIG. 18A is a 120 GHz antenna. Furthermore, referring to FIGS. 18C to 18D, it may be seen that single antenna performance of FIG. 18A illustrates a peak realized gain of 3.4 dBi and a ratio of a peak V-pole and an H-pole realized gain indicates 1.98 dB.

Figure 19A:
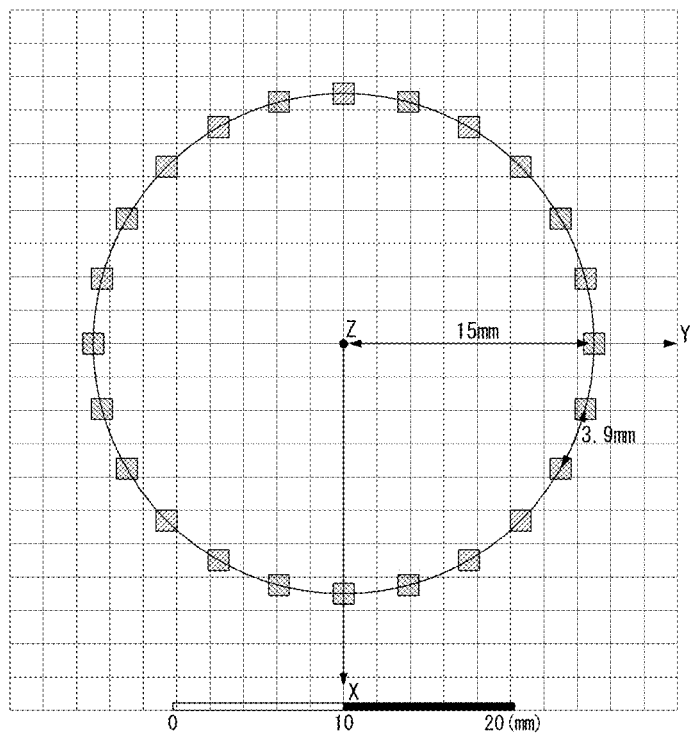
FIGS. 19A to 19B illustrate 1×24 circular arrays (s=−1) designed to fix spin angular momentum (SAM).
Figure 19B:
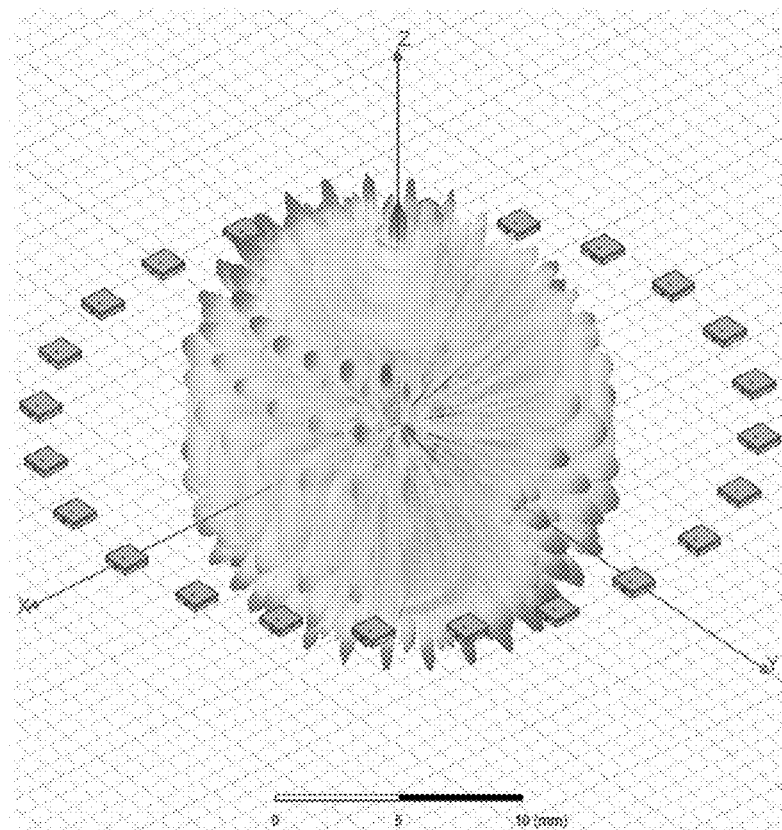

FIGS. 19A to 19B illustrate 1×24 circular arrays (s=−1) designed to fix spin angular momentum (SAM) (to improve OAM state estimation accuracy). Specifically, FIG. 19A illustrates an antenna array configured as the antenna of FIG. 18A having the characteristic of FIGS. 18B to 18D. FIG. 19B illustrates beams of the antenna array of FIG. 19A. In the case of the antenna array of FIG. 19A, the number of OAM states does not exceed 12 due to a maximum OAM state number equation. Furthermore, the antenna array of FIG. 19A is configured or deployed as a distance D=3.9 mm antenna elements and a distance R=15 mm between the center of coordinates and the array in order to satisfy a D<<R condition. In this case, the OAM state may be represented by applying a phase of $$\exp^{jlk\times\frac{2\pi\times 24}{360}}$$

to a k-th single antenna of a ring array (1×24).

Figure 20A:
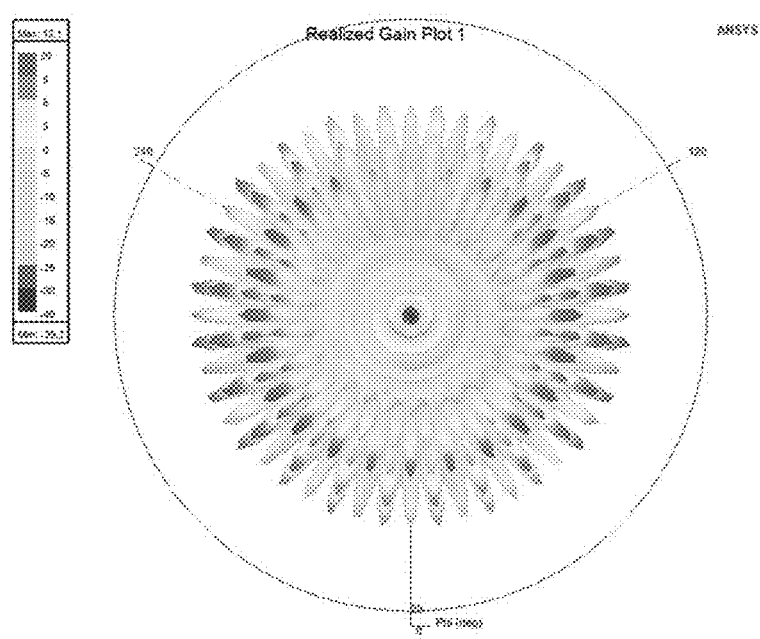
FIG. 20A illustrates realized gains in OAM state I=0.
Figure 20B:
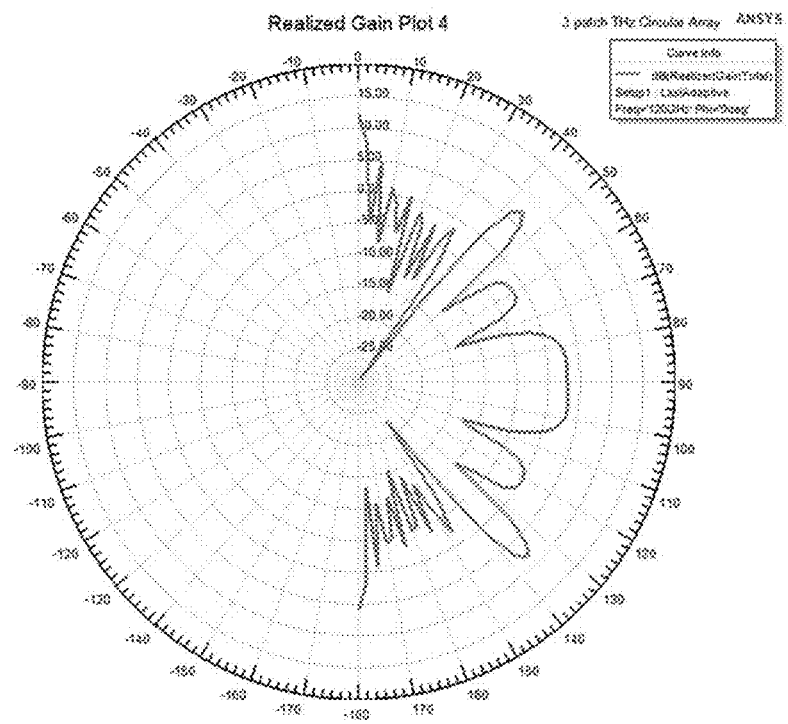
FIG. 20B illustrates a vertical cross section of realized gains in OAM state I=0.
Figure 20C:
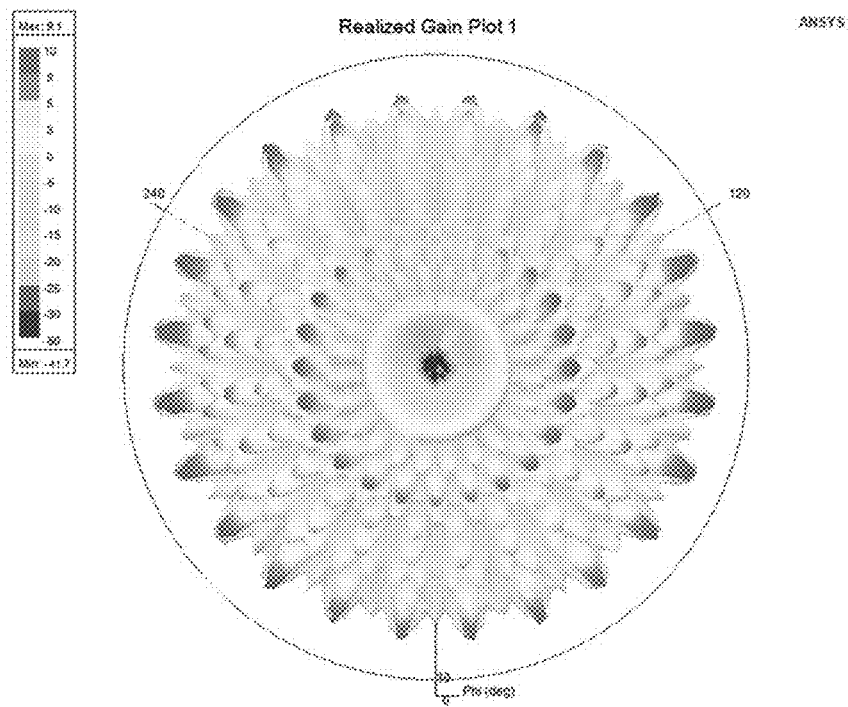
FIG. 20C illustrates realized gains in OAM state I=8.
Figure 20D:
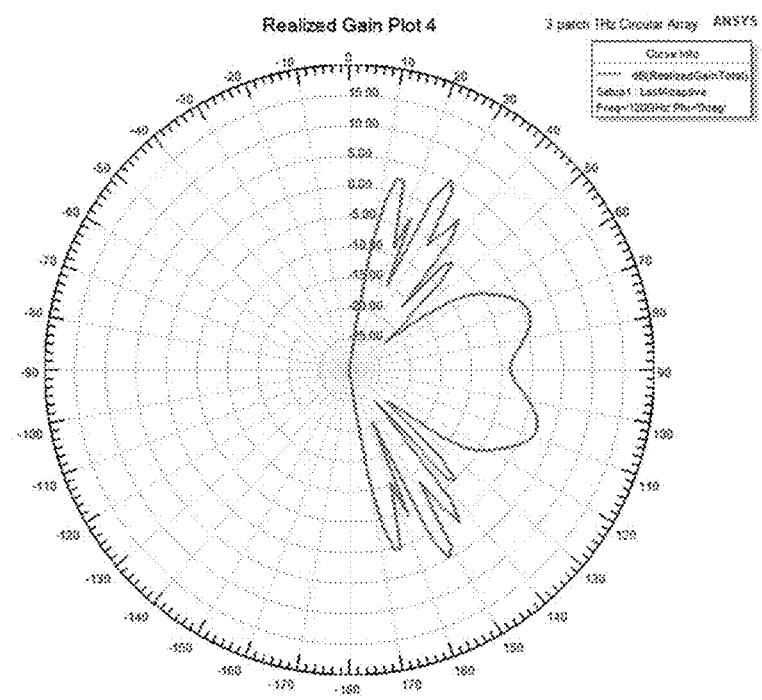
FIG. 20D illustrates a vertical cross section of realized gains in OAM state I=8.

FIGS. 20A to 20D illustrate an example (orthogonal OAM state I=0, I=8) of OAM having orthogonal beams in the antenna array of FIG. 19A. Specifically, FIG. 20A illustrates realized gains in OAM state I=0. FIG. 20B illustrates a vertical cross section of (phi=0) of realized gains in OAM state I=0. FIG. 20C illustrates realized gains in OAM state I=8. FIG. 20D illustrates a vertical cross section of (phi=0) of realized gains in OAM state I=8.

Figure 21A:
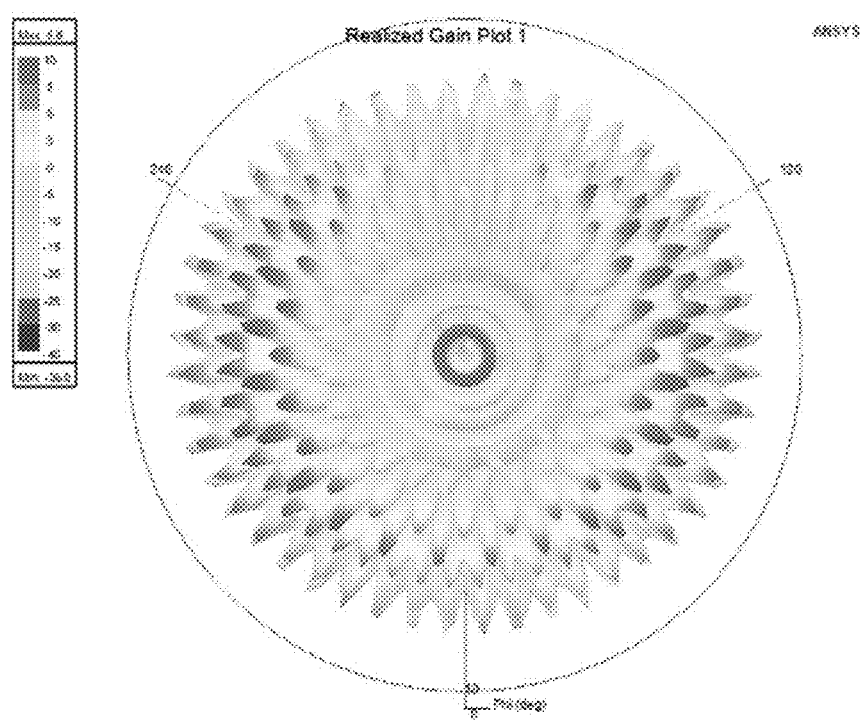
FIG. 21A illustrates realized gains in OAM state I=2.
Figure 21B:
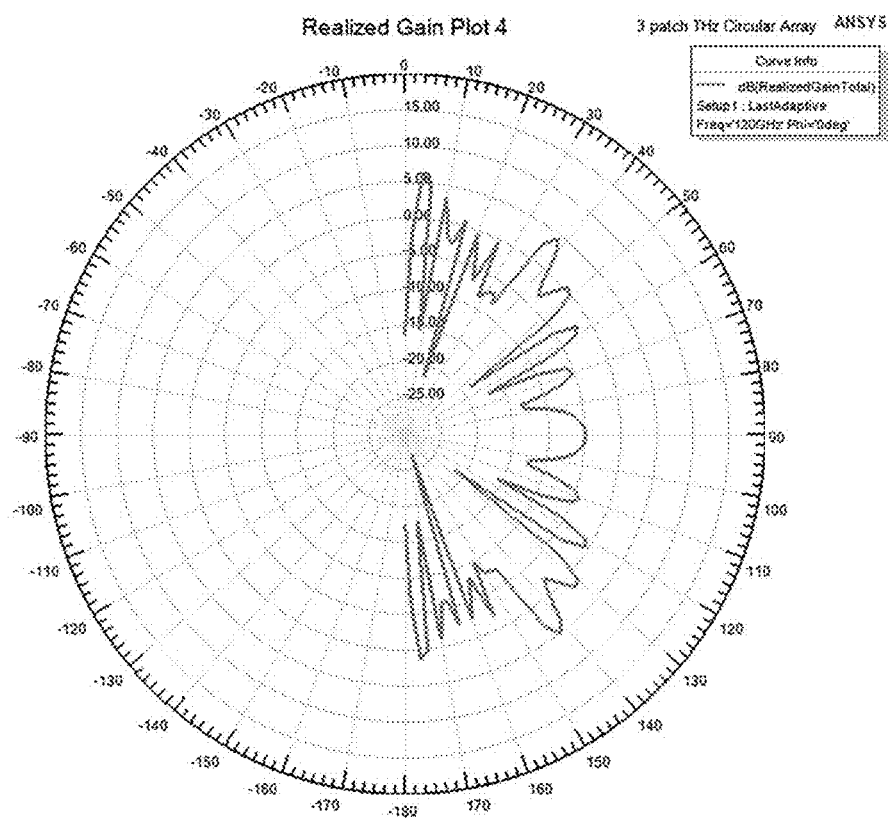
FIG. 21B illustrates a vertical cross section of realized gains in OAM state I=2.
Figure 21C:
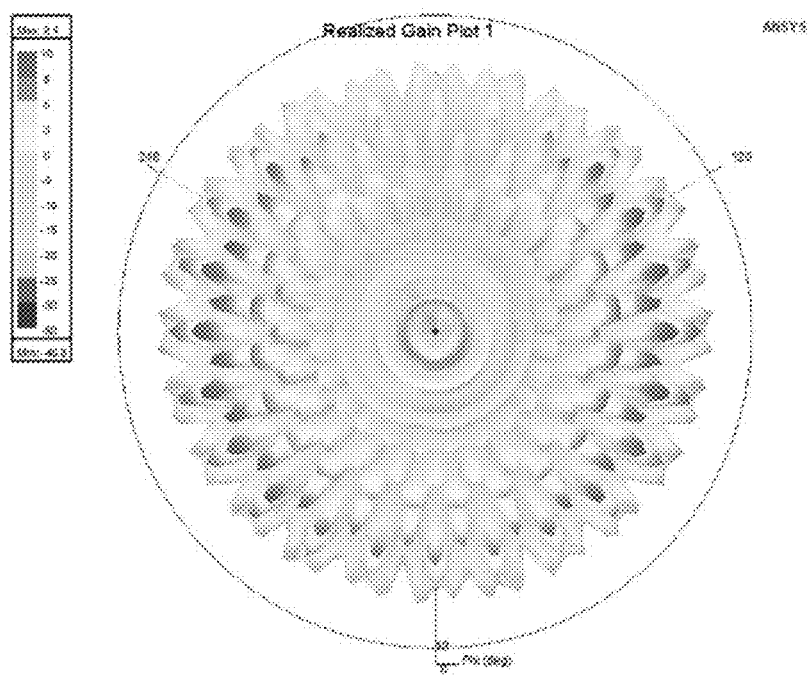
FIG. 21C illustrates realized gains in OAM state I=3.
Figure 21D:
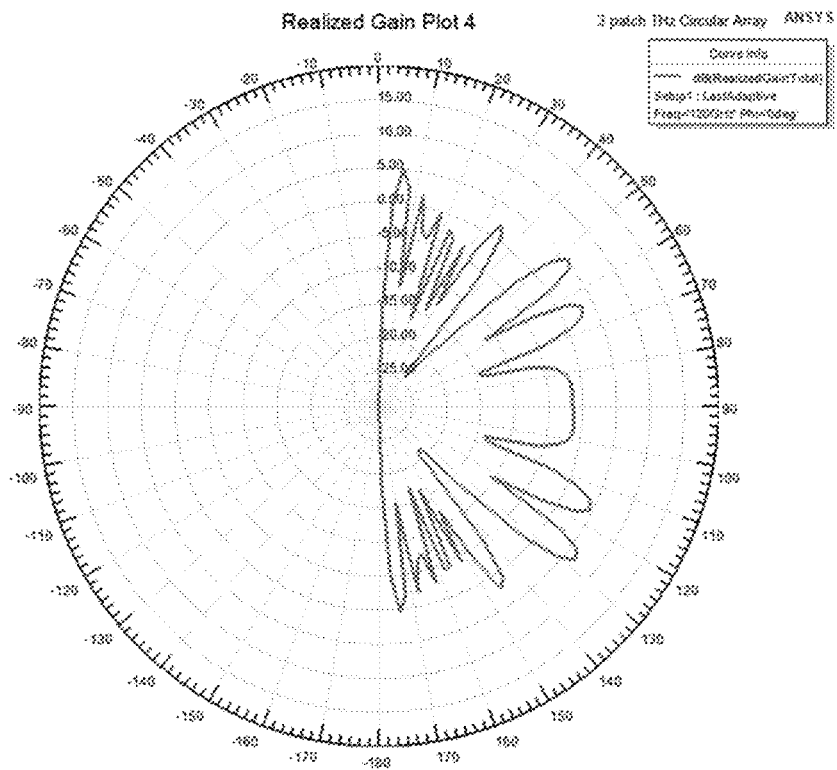
FIG. 21D illustrates a vertical cross section of realized gains in OAM state I=3.

FIGS. 21A to 21D illustrate an example (non-orthogonal OAM state I=2,I=3) of OAM having a non-orthogonal beam in the antenna arrays of FIGS. 19A to 19B. Specifically, FIG. 21A illustrates realized gains in OAM state I=2. FIG. 21B illustrates a vertical cross section of (phi=0) realized gains in OAM state I=2. FIG. 21C illustrates realized gains in OAM state I=3. FIG. 21D illustrates a vertical cross section of (phi=0) of realized gains in OAM state I=3.

As in FIGS. 20A to 20D and FIGS. 21A to 21D, since there is a beam that is orthogonal or not orthogonal among beams corresponding to maximum OAM states, an orthogonal OAM state for increasing the actual number of streams is M (M=<N) of a total of N OAM states. Accordingly, the antenna may be design so that the number of orthogonal OAM states becomes close to N. Furthermore, in an example in which OAM is applied to a cellular system, an orthogonal OAM state may always change depending on a channel situation. Accordingly, there is a need for a method for applying an orthogonal OAM state according to a channel change.

Furthermore, whether a UE can receive OAM needs to be considered with respect to the OAM capability of a base station. The UE needs to have a minimum OAM capability of the base station or a base station OAM capability may be maintained based on a UE having the lowest OAM capability among UEs connected to the base station. In addition, UEs not having a given OAM capability may be excluded, and a method of applying OAM to other UEs may be considered.

Furthermore, in the existing (Type-1) codebook of NR, upon digital beamforming, a method using V/H polarization through a co-phase factor depending on a channel rank was introduced. That is, polarization could be represented by multiplying a codebook by the same co-phase in the same beam, and the number of streams could be increased. In contrast, in an operation of increasing the number of streams through OAM, an OAM state cannot be represented as a co-phase. Accordingly, an incremental or decrement phase needed to be applied to each logical port.

The following lists the aforementioned problems.

An antenna design problem suitable for an OAM operation (an antenna having M orthogonal M OAM states among N OAM states)

A basic configuration problem for an OAM operation

A network operation problem according to an OAM operation capability (a problem according to a transmission and reception OAM state asymmetry)

A feedback method and application method for OAM

Upon OAM application, whether beamforming is possible or whether OAM needs to be applied after a beamforming application A codebook for an OAM application A proposed method of the present disclosure is to solve the aforementioned problems.

In the present disclosure, the concept of OAM is described.

Concept of Radio OAM

A radio OAM technology is a technology capable of obtaining a high transmission speed in a line-of-sight (LoS) channel by performing mode split multiplexing transmission on multiple signals in modes having different helical phase fronts, and is a technology which is recently started to be researched in the optical communication field and has recently been in the spotlight in the wireless communication field. It was found that OAM of electromagnetic waves has been associated with a helical transverse phase structure that changes depending on a twisting degree of a phase front. It was found that a beam having the same characteristic as an OAM signal can be transmitted using a uniform circular array (UCA) antenna. A technology for increasing the capacity of a channel by transmitting OAM multiple modes using a UCA antenna is actively researched.

Figure 22A:
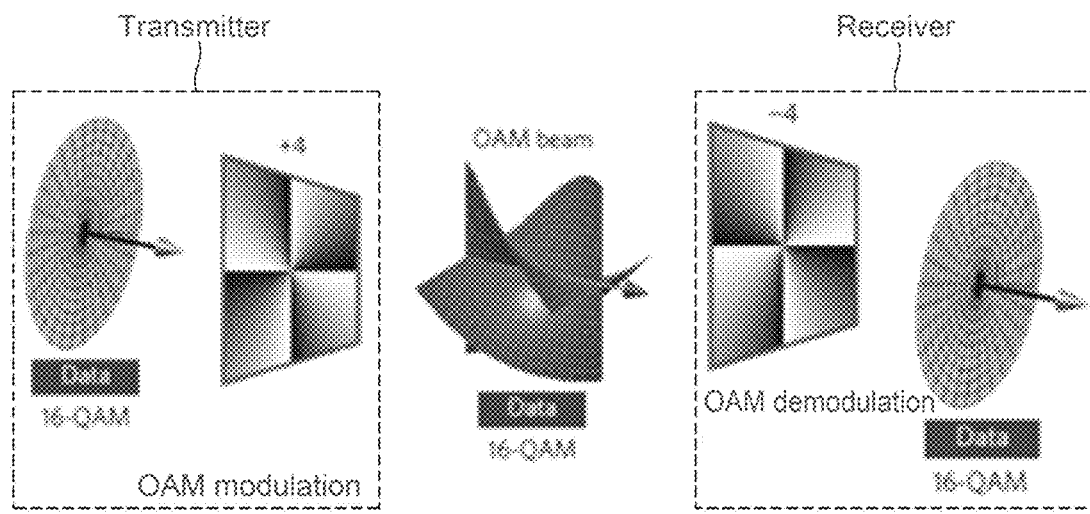
FIG. 22A illustrates a method of generating and receiving an OAM signal having mode 4.
Figure 22B:
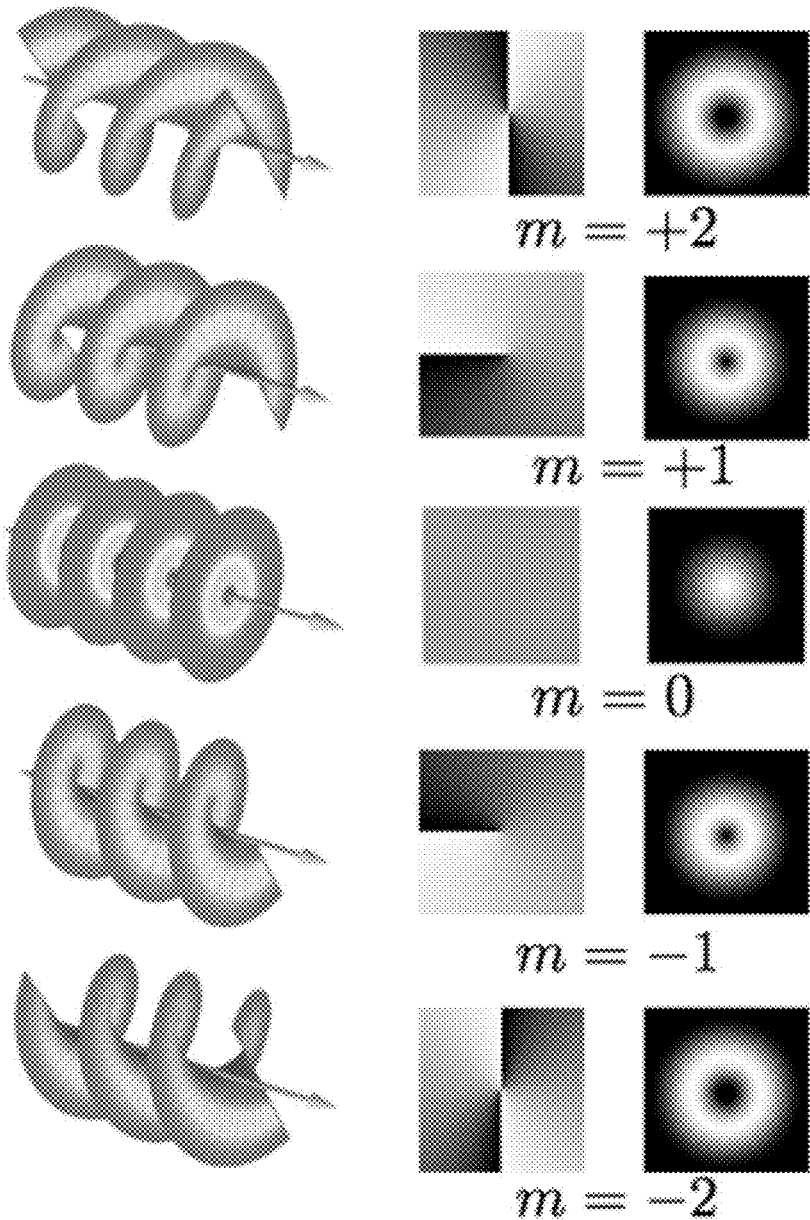
FIG. 22B illustrates phases and intensity profiles in OAM modes.

FIG. 22A illustrates a method of generating and receiving an OAM signal having mode 4. FIG. 22B illustrates phases and intensity profiles in OAM modes. As in FIGS. 22A to 22B, a radio OAM signal is generated so that a phase thereof is linearly changed from 0 to 2 πm clockwise along an arc on a plane vertical to the direction in which electromagnetic waves proceed. In this case, the signal is said to have a mode m. As described above, in a radio OAM system, different mode signals have phases varying at different speeds in the space. If the orthogonality of the phase is used, a desired signal can be completely separate on the reception side although multiple mode signals are overlapped and transmitted using the same space. According to a proposed method of the present disclosure, a UE may transmit a detectable (orthogonal) OAM state(s) (or the number of (orthogonal) OAM states) to a base station. The base station may perform data transmission and reception with a high communication capacity by considering (performing OAM modulation and demodulation of data as in FIG. 22A), such as a detectable (orthogonal) OAM state(s).

The radio OAM technology is different from the existing LoS-MIMO technology. In the existing MIMO technology, in order to form N independent channels between transmit antenna and reception antennas, there is overhead that a channel estimated on the reception side needs to be fed back to the transmission side as an example of a Singular Value Decomposition-Multiple Input Multiple Output (SVD-MIMO) method. In contrast, the OAM method can configure N independent channels even without such channel feedback (i.e., even without channel information).

The greatest problem with the radio OAM technology is that since a signal is transmitted with a phase varying from 0 to $2\pi m$ in the space in high-degree modes except mode 0 and the amplitude of the signal becomes null in an axis in which electromagnetic waves travel, the intensity of a high-degree mode signal is relatively small in a receiver distant from a transmitter compared to mode 0. In such a characteristic, when a THz channel, in particular, a higher band is considered, there is a good possibility that a delay profile characteristic in a time axis will be configured as one or two clusters. Although the delay profile characteristic is configured as two cluster, there is a good possibility that a power difference of a second cluster compared to an LoS cluster will become about 30 dB. In this case, if a sharper beam is used compared to the existing system, when a beam is well directed toward the first AoA, there is a good possibility that the second cluster is rarely seen. Accordingly, if a THz frequency is higher than a measurement band of 300 GHz, the rank of a channel will become 1 or two to a maximum extent.

However, according to the proposed method of the present disclosure, such a problem can be solved because n multiplexing can be used.

Hereinafter, the OAM concept is more specifically described through equations.

OAM Concept

Electromagnetic radiation basically delivers both energy and momentum. The momentum is a physical quantity indicating a motion of particles by a radio wave, and moves linearly and angularly. Basically, linear momentum $P_i^{mech}$ of nonrelativistic, spinless, classical particles has angular momentum. Angular momentum (linear) $J^{mech}$ at a radiation point $x_i$ is the same as Equation 1.

$$J^{mech} = \sum_i (x_i - x_0) \times P_i^{mech} \quad \text{[Equation 1]}$$

FIG. 23 is an example illustrating angular momentum $J^{mech}$. That is, FIG. 23 illustrates angular momentum of a given point $x_0$ in a radiation source reference.

Total angular momentum is the same as Equation 2.

$$J^{tot} = J^{mech} + J^{EM} \quad \text{[Equation 2]}$$

In this case, $J^{EM}$ is the sum of spin angular momentum (SAM) $S^{EM}$ and orbital angular momentum (OAM) $L^{EM}$, and is the same as Equation 3.

$$J^{EM} = S^{EM} + L^{EM} = \int (x - x_0) \times (E \times B) d^3 x \quad \text{[Equation 3]}$$

Total angular momentum is always the same under the same field condition according to an energy conservation law. OAM is a factor influenced by a spatial distribution of a field, and may change a spatial structure in linear momentum in an OAM form by changing the spatial structure.

FIG. 22B illustrates an example of an OAM mode. A representative example of OAM is a helical mode. Helical modes of an electromagnetic field mean that a wavefront has a helix shape based on the center reference, and has modes other than m=0. Such a helical mode has already been used in the existing laser region, and a representative thereof is a Laguerre-Gaussian (LG) mode. For example, the mode may correspond to an OAM state.

FIGS. 24A to 24D are examples of various orthogonal beams and E field distribution diagrams according to OAM states. For example, FIGS. 24A to 24D may be examples of orthogonal beams and E field distribution diagrams according to an array including inner circle 8 arrays and outer circle 16 arrays. Specifically, FIG. 24A is an example of an orthogonal beam and E field distribution diagram according to OAM state I=0. FIG. 24B is an example of an orthogonal beam and E field distribution diagram according to OAM state I=1. FIG. 24C is an example of an orthogonal beam and E field distribution diagram according to OAM state I=2. FIG. 24D is an example of an orthogonal beam and E field distribution diagram according to OAM state I=4.

Assuming that a beam or propagation direction is a z axis, an OAM state has an OAM component of $$J_z^{EM} = \frac{jM}{w}$$

on the basis of the beam direction (z) and is influenced by a vertical phase of $e^{jl\varphi}$. In this case, M indicates field energy, and w indicates a frequency.

In FIGS. 24A to 24D, in order to research an application possibility of OAM, an equal interval circular array antenna (a form having storing right-hand circular polarization) was considered. Accordingly, if the $J_z^{EM}$ is predictable and received energy M can be measured, an OAM state $\hat{l}$ may be inversely estimated. For example, $J_z^{EM}$ may be estimated on the reception side based on a transmission and reception distance $x_0$ and an E and H field or a poynting vector value or may be provided by a transmitter.

Table 28 illustrates an example of a comparison between an estimated OAM state $\hat{l}$ and actual l.

Table 28 is a comparative example in a right-hand circular polarized beam (s=−1) formed by a ring array of 10 crossed dipoles, Array 간 interval D=λ, 0.1λ over perfect ground, polar angle θ=0.

That is, a UE may compute $\hat{j}$ based on the $J_z^{EM}$ and received energy M, and may estimate $\hat{l}$ based on $\hat{j}$-s. In this case, s may have a fixed value of −1 as in Table 28. That is, the present disclosure proposes an antenna array structure of s=−1 in order to increase estimation accuracy of an OAM state. In the present disclosure, for convenience of description, an example of a ring array is basically described, but the present disclosure may be applied to any form of an antenna array structure having a structure of s=−1. That is, hereinafter, the ring array of the present disclosure may be applied by being replaced with any form of an antenna array structure having the structure of s=−1.

TABLE 28

| l | s | j = l + s | $\hat{j} = \frac{w \cdot J_z^{EM}}{M}$ | $\hat{l}$ |
|---|---|---|---|---|
| 0 | −1 | −1 | −1.019 | −0.019 |
| 1 | −1 | 0 | −0.022 | 0.978 |

TABLE 28-continued

| l | s | j = l + s | $\hat{j} = \dfrac{w \cdot J_z^{EM}}{M}$ | $\hat{l}$ |
|---|---|---|---|---|
| 2 | −1 | 1 | 0.971 | 1.971 |
| 3 | −1 | 2 | 1.81 | 2.81 |

Furthermore, basically, a total of generable OAM states kinds N is the same as the number of antennas/2 on a ring vertical to a beam direction (however, in the case of the 1-Tier ring array (refer to FIG. 19A)), the number of estimable OAM states has the following relation of Equation 4.

$$|\hat{l}| < \text{total number of antenna elements} \times \frac{\pi R}{D} \quad \text{[Equation 4]}$$

Accordingly, for OAM transmission for obtaining the number of estimable OAM states as many as possible, an R>>D condition needs to be satisfied. In this case, a distance from R=center to the array, D=distance between two adjacent antenna elements is indicated.

In the present disclosure, a base station may refer to a station or transmitter/receiver, that is, the subject of control, data and/or synchronization protocol(s) of a network. The present disclosure has been written based on a frequency band in which a rank of a channel itself is basically 1, but this is merely for convenience of description and does not limit the technical scope of the present disclosure. Accordingly, the present disclosure may also be applied based on a frequency band of a channel rank 2 or more.

Hereinafter, a proposed method of the present disclosure is described based on the aforementioned contents.

Hereinafter, the present disclosure proposes a method of indicating, by a base station, the capability of an (orthogonal) OAM state (hereinafter a first embodiment), and a method for applying a precoding matrix (or codebook) to OAM (hereinafter a second embodiment).

Hereinafter, embodiments described in the present disclosure have been merely divided for convenience of description. Some method and/or some configuration of an embodiment may be substituted with a method and/or configuration of another embodiment or they may be combined and applied.

In the present disclosure, "( )" may be interpreted as both a case where contents within "( )" are excluded and a case where contents within "( )" are included.

In the present disclosure, "/" may mean that all contents divided by / are included (and) or only some of the contents are included (or).

First Embodiment

The present embodiment proposes a method of indicating, by a base station, capability information for an orthogonal OAM state. The base station may indicate one or multiple pieces of information among the following information through a higher layer, a medium access control-control element (MAC-CE) and/or downlink control information (DCI).

For example, the orthogonal OAM state information may include at least one of i) information for a total number of OAM states of a base station (e.g., the total number of OAM states N of a base station), ii) information for a maximum number of orthogonal OAM states of a base station (e.g., a maximum number of orthogonal OAM states M of a base station), iii) information for a total of OAM states and/or an OAM state set for orthogonal OAM states in a base station (e.g., the number of OAM state sets, OAM state set index(s)), iv) information for a total of OAM states and/or OAM state subsets for orthogonal OAM states in a base station (e.g., the number of OAM state subsets, OAM state subset index(s)), v) information for the number of base station ring arrays (e.g., the number of base station ring arrays), vi) information for the number of ring array ports (e.g., a total of number of antenna ports of a ring array Ω), and/or vii) information for a base station ring array operation transmission mode.

For example, the information for a base station ring array operation transmission mode may include y bits, and may be information for estimating estimate OAM states provided by a base station. In this case, y may be a value predefined based on the number of transmission modes. A proposed method of the present disclosure may also be applied to an antenna array having the structure of s=−1 in addition to a ring array. In other words, a proposed method of the present disclosure may be applied by substituting the "ring array" with an "antenna array having the structure of s=−1."

For example, when the total number of OAM states N is set by a higher layer, a MAC-CE and/or DCI, a UE may report, to a base station, the number of detectable OAM states K (e.g., K<=N) among the number of OAM states N. In this case, the total number of OAM states N may be set through • • •, • bits. And/or when the N OAM states is set by a higher layer, a MAC-CE and/or DCI, the UE may report, to the base station, K (K<=N) OAM states among the N OAM states.

For example, the base station may configure/transmit the number of OAM states N and/or the N OAM states to the UE. In this case, the UE may measure a Received Signal Strength Indicator (RSSI)/Layer 1-Reference Signal Received Power (L1-RSRP)/Layer 1-Reference Signal Received Quality (L1-RSRQ) of the N OAM states. The UE may transmit, to the base station, K OAM states having the highest RSSI/L1-RSRP/L1-RSRQ and/or the number of OAM states (i.e., the number of detectable OAM states) K whose RSSI/L1-RSRP/L1-RSRQ is a reference value or higher. Thereafter, the base station may form an OAM beam by using OAM states corresponding to the number of detectable OAM states. If the base station does not receive the number of detectable OAM states from a specific UE, the base station may not perform OAM transmission and reception with a specific UE or may request a specific UE to report the number of OAM states (again).

In the present disclosure, to report/transmit an (orthogonal) OAM state set(s)/(orthogonal) OAM state subset(s)/(orthogonal) OAM state(s) may mean that an OAM state set index(ices)/OAM state subset index(ices)/OAM state index(ices) is reported/transmitted.

And/or when the total number of OAM states N is set by a higher layer, a MAC-CE and/or DCI, a UE may report, to a base station, the number of orthogonal OAM state subsets K1 (K1<=K) among the number of detectable OAM states K. And/or when the total number of OAM states N is set by a higher layer, a MAC-CE and/or DCI, the UE may report an orthogonal OAM state subset(s) including an orthogonal OAM state(s) of K1 (K1<=K) among detectable K OAM states or orthogonal OAM states of K1 (K1<=K). For example, the orthogonality of OAM states may be checked by calculating/determining/measuring correlations based on a Zadoff-Chu (ZC) sequence/Pseudo-Noise (PN) sequence/Golay sequence corresponding to the OAM states.

And/or the UE may report a channel rank through a rank indicator (RI) and/or may report a channel covariance matrix.

As in FIG. 19A, in the 1-tier ring array structure, a UE may be implicitly aware of the total number of OAM states N based on the number of CSI-RS ports instead of the total number of OAM states N. The UE may estimate a phase value of each ring element of a base station based on the total number of OAM states N or the number of antenna ports/2 (i.e., the number of CSI-RS ports/2) (e.g., 360/(2*N)). That is, after obtaining basic information (e.g., orthogonal OAM state information) that enables to estimate a base station (e.g., a transmitter) OAM state, the UE may estimate the number of detectable OAM states K and/or OAM states.

Figure 25A:
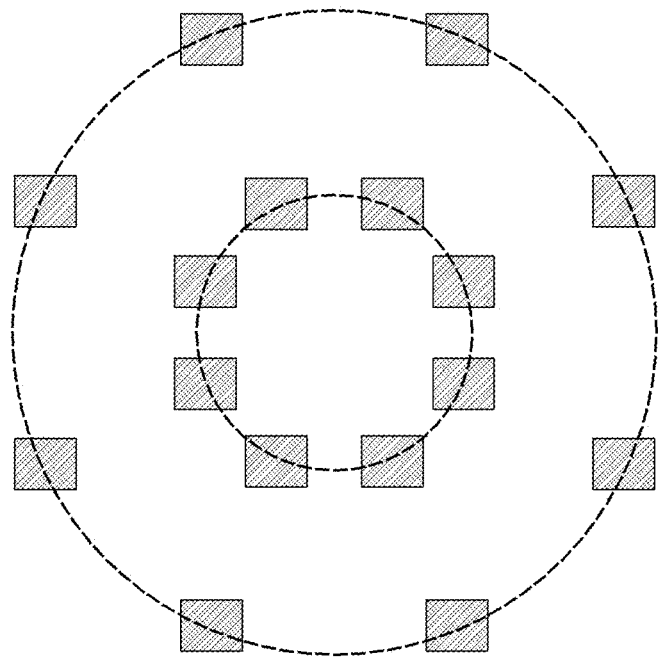
FIG. 25A illustrates an example of an OAM-operable 16 port 2-tier ring array.
Figure 25B:
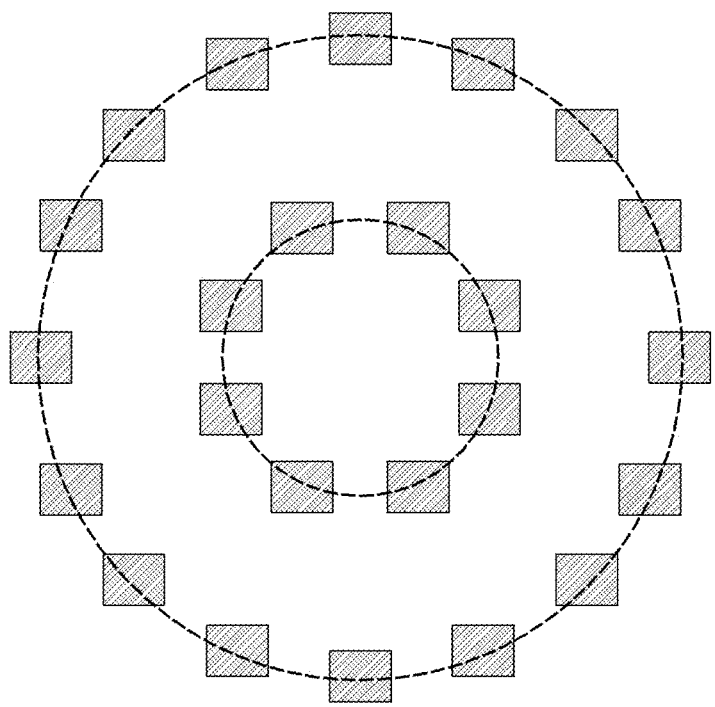
FIG. 25B illustrates an example of an OAM-operable 24 port 2-tier ring array.

FIG. 25A illustrates an example of an OAM-operable 16 port 2-tier ring array. FIG. 25B illustrates an example of an OAM-operable 24 port 2-tier ring array.

In contrast, in the case of a ring array having multiple tiers as in FIGS. 25A to 25B, although a total OAM quantity N indicates the number of antenna ports or the number of single antenna elements versus a total OAM quantity N, a maximum OAM quantity N={the number of ports or the number of single antenna elements}/2 may not be established. Accordingly, it is not easy to estimate a phase value of each ring element for a ring array structure or OAM based on a maximum number of OAM states N. For phase estimation for OAM, a 1st tier and a 2nd tier may need to be differently formed. To this end, a base station may configure a maximum number of OAM states of each tier (i.e., a maximum number of OAM states $N_1$ of the 1st tier and the number of OAM states $N_2$ of the 2nd tier) through a higher layer, a MAC-CE and/or DCI.

When the relation of the number of antenna ports=2× ($N_1*N_2$) is established (i.e., when the base station sets $N_1$, $N_2$ so that the relation is established), a UE may estimate that a phase value of each ring element of each base station is 360/(2*$N_2$) degrees in the case of the 1-tier and 360/(2*$N_1$) in the case of the 2-tier. And/or the base station may configure OAM state values $N_1$~$N_D$ corresponding to the number of multiple tiers D through a higher layer, a MAC-CE and/or DCI.

When the number of antenna ports=2×($N_1*N_2$) is not established, the base station may configure the number of ring array ports Ω or the number of elements of each tier. For example, in the case of the 2-tier ring array, the number of ports $Ω_1$ of a first ring array may be set, and the number of ports $Ω_2$ of a second ring array may be set.

And/or the base station may transmit the total number of OAM states N and the number of orthogonal OAM states M to the UE separately (both). And/or the base station may configure an indicator to distinguish between a total of OAM states N and a maximum number of transmittable orthogonal OAM states M. The number of OAM states may be transmitted along with the indicator. The UE may be aware of whether the number of OAM states set through the indicator is a value corresponding to N or a value corresponding to M. For example, if the number of OAM states is transmitted along with an indicator indicating the total of OAM states, the UE may interpret the number of corresponding OAM states as the total number of OAM states. Alternatively, if the number of OAM states is transmitted along with an indicator indicating the maximum number of transmittable orthogonal OAM states, the UE may interpret the number of corresponding OAM states as a maximum number of transmittable orthogonal OAM states.

And/or if the base station sets the maximum number of transmittable orthogonal OAM states M through a higher layer, a MAC-CE and/or DCI, the UE may report an orthogonal OAM state set(s) or an orthogonal OAM state subset(s) which may be received (i.e., may be received based on an SNR, SINR or RSRP) among the OAM states. And/or when the total number of OAM states N is set by the base station, the UE may report an OAM state set(s) and/or a subset(s) which may be received among them. For example, one OAM state set may include one or more OAM state subsets, and one OAM state subset may include one or more OAM states. The OAM state set may also be represented as an OAM state group or an OAM state pool.

And/or when a base station sets the number of orthogonal OAM states M and orthogonal OAM state sets and/or orthogonal OAM state subsets corresponding thereto through a higher layer, a UE may report an indicator corresponding to an L orthogonal OAM state set(s) and/or an L orthogonal OAM state subset(s) having the best link performance or may report an L (orthogonal) OAM state(s). For example, the L value (i.e., how many values are reported) may be predefined or may be configured in the UE. Alternatively, L may be determined based on a Rank Indicator (RI).

Table 29 is an example of an orthogonal OAM state subset table when an orthogonal OAM state set index is k and an orthogonal OAM state indices={$i_{1,k}$, $i_{2,k}$, $i_{3,k}$, $i_{4,k}$ ... $i_{M,k}$}. For example, when the orthogonal OAM state indices={$e_{1,1}$, $i_{2,1}$, $i_{3,1}$, $i_{4,1}$ ... $i_{M,1}$}, reference may be made to Table 29. In Table 29, the number of kinds or bits may vary depending on an OAM orthogonal state subset capability of a base station.

For example, multiple orthogonal OAM state sets may be predefined or may be configured in a UE. For example, in Table 29, an orthogonal OAM state set 0 (k=0) may be configured in the UE. In Table 30, an orthogonal OAM state set 1 may be configured in the UE. And/or the UE may transmit, to the base station, information for an OAM state set/OAM state subset(s)/OAM state(s) (e.g., OAM state set index/OAM state subset index(ices)/OAM state index(ices) and/or the number of OAM state subsets/the number of OAM states) based on Table 29 and Table 30. And/or the UE may receive information indicative of Table 29 from the base station, and may transmit, to the base station, information for an OAM state subset(s)/OAM state(s) (e.g., an OAM state subset index(ices)/OAM state index(ices) and/or the number of OAM state subsets/the number of OAM states) based on Table 29. In this case, the orthogonal OAM state set/orthogonal OAM state subset may be a set including an orthogonal OAM state(s). Although the orthogonal OAM state set/orthogonal OAM state subset has been basically described, the base station and the UE may perform transmission and reception based on an OAM state set/OAM state subset, that is, a set including an OAM state(s).

For example, the base station may configure a higher orthogonal OAM state set index k and L=2 in the UE. The UE may report, to the base station, an orthogonal OAM subset index 011 including a detectable (or estimable) orthogonal OAM state {$i_{3,k}$, $i_{4,k}$}. Table 29 may be previously agreed/predefined between the base station and the UE or the base station may previously configure Table 29 in the UE. Furthermore, tables corresponding to T orthogonal OAM state set indices in addition to Table 29 corresponding to an orthogonal OAM state set index k may be agreed/predefined between the base station and the UE or the base station may previously configure the tables in the UE.

TABLE 29

| | Orthogonal OAM state subset (case in Orthogonal OAM state Set = k) | | | | |
|---|---|---|---|---|---|
| | 000 | 001 | 011 | 010 | Reserved |
| L = 1 | {$i_{1,k}$} | {$i_{2,k}$} | {$i_{3,k}$, k} | {$i_{4,k}$} | — |
| L = 2 | {$i_{1,k}$, $i_{2,k}$} | {$i_{2,k}$, $i_{3,k}$} | {$i_{3,k}$, $i_{4,k}$} | {$i_{4,k}$, $i_{5,k}$} | — |
| L = 3 | {$i_{1,k}$, $i_{2,k}$, $i_{3,k}$} | {$i_{2,k}$, $i_{3,k}$, $i_{4,k}$} | {$i_{1,k}$, $i_{3,k}$, $i_{4,k}$} | {$i_{1,k}$, $i_{2,k}$, $i_{4,k}$} | — |
| L = 4 | {$i_{1,k}$, $i_{2,k}$, $i_{3,k}$, $i_{4,k}$} | {$i_{2,k}$, $i_{3,k}$, $i_{4,k}$, $i_{5,k}$} | {$i_{1,k}$, $i_{3,k}$, $i_{4,k}$, $i_{5,k}$} | {$i_{1,k}$, $i_{2,k}$, $i_{3,k}$, $i_{5,k}$} | — |
| . | . | . | . | . | |
| . | . | . | . | . | |
| . | . | . | . | . | |
| L = M | {$i_{1,k}$, $i_{2,k}$, $i_{3,k}$, ..., $i_{M,k}$} | Reserved | Reserved | Reserved | — |

Table 30 is an example of an orthogonal OAM subset table when the number of OAM states N=10 and an orthogonal OAM state index={0,2,4,6,8}.

For example, when the total number of OAM states of a base station is N=10 and an orthogonal OAM state set=1 is selected, if orthogonal OAM states indices among them are {0,2,4,6,8}, an orthogonal OAM state subset may be configured based on Table 30.

TABLE 30

| | Orthogonal OAM state subset (Orthogonal OAM state set = 1) | | | | |
|---|---|---|---|---|---|
| | 000 | 001 | 011 | 010 | Reserved |
| L = 1 | {0} | {2} | {4} | {6} | — |
| L = 2 | {0, 2} | {2, 4} | {4, 6} | {6, 8} | — |
| L = 3 | {0, 2, 4} | {2, 4, 6} | {0, 6, 8} | {0, 2, 6} | — |
| L = 4 | {0, 2, 4, 6} | {2, 4, 6, 8} | {0, 4, 6, 8} | {0, 2, 4, 8} | — |

A UE may report an orthogonal OAM state subset index including OAM states corresponding to L best links in an orthogonal OAM state set selected based on Table 29 or corresponding OAM states. The report may be transmitted through a higher layer, a MAC-CE and/or DCI. Alternatively, the UE may report an OAM state index corresponding to K detectable OAM states among N OAM states by using Table 29. In this case, the UE may report, to the base station, OAM state subset for K by interpreting the L (meaning the L best links) as the number of detectable states K.

Alternatively, multiple orthogonal OAM state subsets may be determined based on the number of orthogonal OAMs M and the orthogonal OAM state set k (e.g., the base station configures M and k in the UE). The UE may report OAM states corresponding to L of them. For example, when L=4 in Table 30, the UE may report {0,2,4,6} (e.g., assuming that a subset 000 has good performance) or may report a subset index (e.g., 000).

If the number of orthogonal OAM state subsets is many, differential indicators may be reported every layer based on a reference OAM state (e.g., an OAM state corresponding to the first layer/OAM state having the best link performance). For example, if a total number of OAM states N=20, in order to report an OAM state subset for 10 links among them, $_{20}C_{10}$ kinds are required, and a total of $\log_2(_{20}C_{10})$ bits may be necessary. Accordingly, if differential OAM indicators are used, signal overhead can be improved. For example, if an orthogonal OAM state interval between sequential layers is three or less, a report can be made using 2 bits. Accordingly, a UE may make a report with overhead of 2×10 bits.

And/or a base station may configure a transmission mode (TM) for a ring array operation. The transmission mode may be information indicating on which array structure (e.g., a ring tier configuration/port configuration) OAM transmission/reception is performed. For example, multiple TMs may be defined based on an array structure (e.g., a ring tier configuration/port configuration). For example, OAM TM1 may mean through 1-Tier 16 port transmission, and OAM TM2 may mean 2-Tier 32 port transmission as OAM transmission. And/or OAM TM2-1 is 2-Tier 32 Port transmission, and may mean 1st tier 8 Port, 2nd tier 24 port transmission. The base station may configure the TM in a UE so that the UE can OAM-estimable OAM states provided/transmitted by the base station. Accordingly, UEs capable of detecting the OAM TM may report the feedbacks (i.e., feedback through which UEs for which a TM(s) supported by the base station can be supported notifies that an OAM TM can be detected).

If the feedback is not reported within a specific time T or specific transmission unit nT (e.g., n symbol/n sub-slot/n slot/n frame/n subframe), the base station may not transmit a corresponding OAM TM to the UE. And/or the UE may report, to the base station, TM modes (e.g., through a UE capability) supportable by the UE. The base station may perform OAM transmission through one of the TM modes supportable by the UE.

Second Embodiment

Hereinafter, the present embodiment proposes a method of applying a phase value for OAM within a codebook. As described in the aforementioned precoding matrix indicator (PMI), referring to Tables 17 to 19, for the two layers, $$W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}.$$

Beam vectors are formed based on a beam index l, m for the first layer and a beam index l', m' for the second layer, and an X-pole is represented by multiplying the beam vector by a co-phase, that is, a constant. In this case, a value of the co-phase may need to be applied incrementally or decrementally. For example, in ring arrays, elements of a single ring array may be deployed at the same phase interval between adjacent elements, and a co-phase of each element may be represented like $$e^{jxl\frac{2\pi\theta}{N}}$$

based on specific element. In this case, x=0, 1, ... (the number of elements within a single ring array is −1). That is, θ indicates an angle between adjacent antenna elements based on a single ring array, and l may mean an OAM state.

Furthermore, x may mean an element index of each ring array. For example, the $W_{ll,mm,n}^{(2)}$ may be configured by substituting $\varphi_n$ and $v_{l,m}$ to be described later into $$\frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}.$$

Figure 26A:
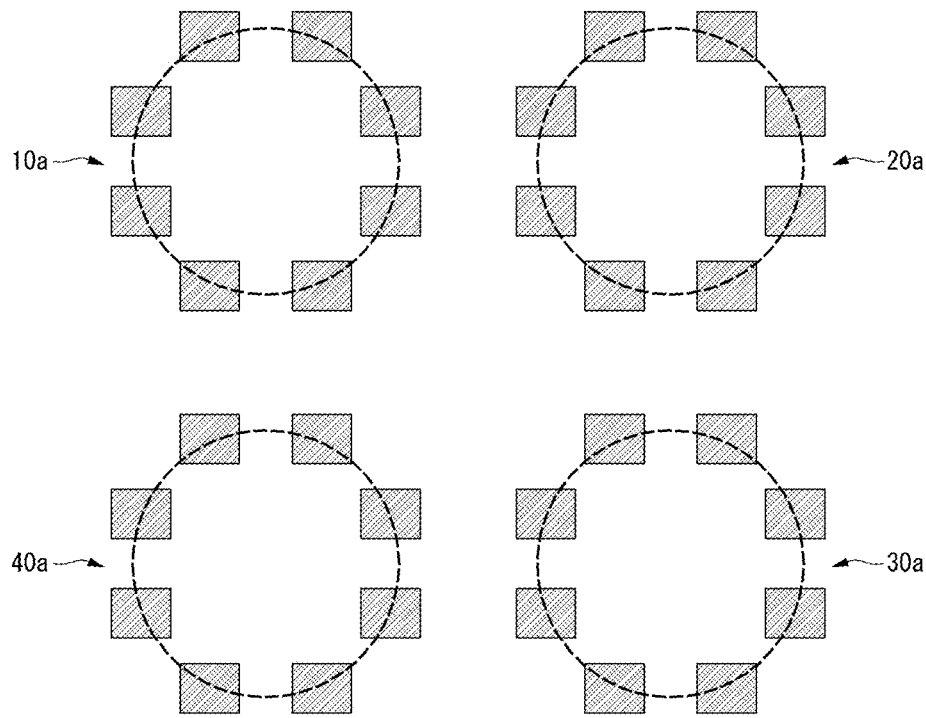
FIG. 26A illustrates an example of a 2×2 Array by 8 ring arrays.
Figure 26B:
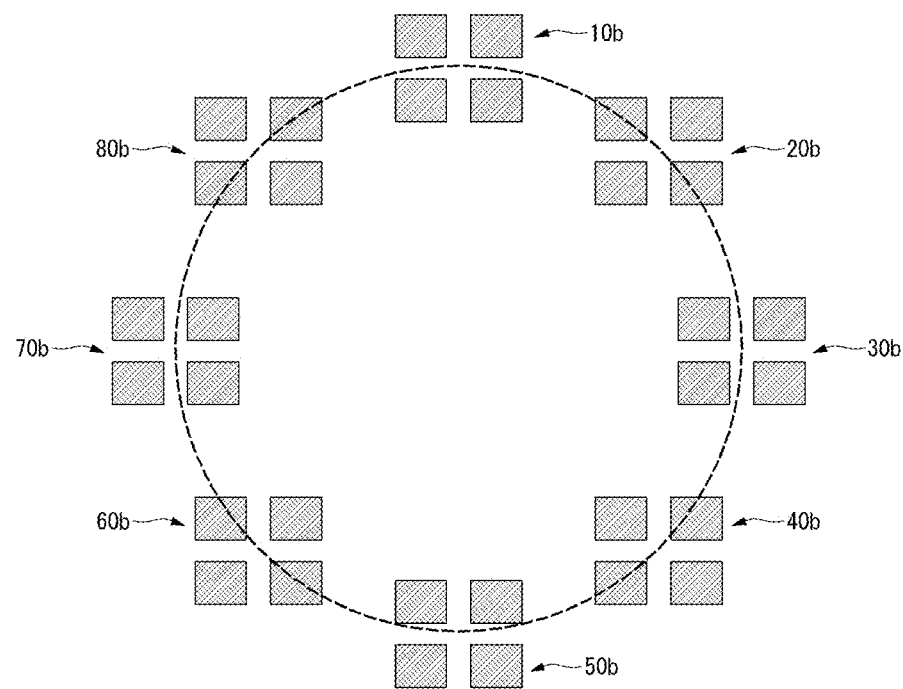
FIG. 26B illustrates an example of an 8 ring array by 2×2 Arrays.

FIGS. 26A and 26B area exemplary deployment diagrams for beamforming of a ring array.

FIG. 26A illustrates an example of a 2×2 array by 8 ring arrays, and FIG. 26B illustrates an example of an 8 ring array by 2×2 arrays. For example, 32 antenna ports may be applied to the array of FIG. 26A and the array of FIG. 26B.

In the arrays of FIGS. 26A and 26B, assuming that ports are orthogonal to each other, $\varphi_n$ and $v_{l,m}$ may be represented.

For example, in the case of FIG. 26A, $$\varphi_n = \begin{bmatrix} 1 \\ e^{j l \frac{2\pi\theta}{N}} \\ e^{j 2 l \frac{2\pi\theta}{N}} \\ e^{j 3 l \frac{2\pi\theta}{N}} \\ e^{j 4 l \frac{2\pi\theta}{N}} \\ e^{j 5 l \frac{2\pi\theta}{N}} \\ e^{j 6 l \frac{2\pi\theta}{N}} \\ e^{j 7 l \frac{2\pi\theta}{N}} \end{bmatrix}_{8\times1},$$

$$v_{l,m} = \begin{bmatrix} e_{1,m} I_{8\times8} \\ e_{2,m} I_{8\times8} \\ e_{3,m} I_{8\times8} \\ e_{4,m} I_{8\times8} \end{bmatrix}_{32\times8}$$

may be represented.

In this case, $\vartheta$ may indicate an angle between adjacent elements based on the center of a single ring array, and an m-th beamforming vector $e_{k,m}$ may be an m (e.g., m=1, 2 . . . , 8)-th beamforming element of k (e.g., k=1, 2, 3, 4)-th ring array ports. Furthermore, l may be an OAM state, N may be a maximum number of OAM states, and I may be an identity matrix. Alternatively, N may be antenna elements of a single ring array. In this case, an OAM application type-1 codebook may be represented like Equation 5.

$$\varphi_n v_{l,m} \rightarrow [v_{l,m}\varphi_n]_{32\times 1} \quad \text{[Equation 5]}$$

or, assuming $$E_{l,m} = \begin{bmatrix} e_{1,m} \\ e_{2,m} \\ e_{3,m} \\ e_{4,m} \end{bmatrix}_{4\times 1},$$

$v_{l,m}=E_{l,m} \otimes I_{8\times 8}$ may be represented.

For another example, in the case of FIG. 26B, $$\varphi_n = \begin{bmatrix} \varphi_{1,k} I_{4\times4} \\ \varphi_{2,k} I_{4\times4} \\ \varphi_{3,k} I_{4\times4} \\ \varphi_{4,k} I_{4\times4} \\ \varphi_{5,k} I_{4\times4} \\ \varphi_{6,k} I_{4\times4} \\ \varphi_{7,k} I_{4\times4} \\ \varphi_{8,k} I_{4\times4} \end{bmatrix} = \begin{bmatrix} 1 \cdot I_{4\times4} \\ e^{j l \frac{2\pi\theta}{N}} I_{4\times4} \\ e^{j 2 l \frac{2\pi\theta}{N}} I_{4\times4} \\ e^{j 3 l \frac{2\pi\theta}{N}} I_{4\times4} \\ e^{j 4 l \frac{2\pi\theta}{N}} I_{4\times4} \\ e^{j 5 l \frac{2\pi\theta}{N}} I_{4\times4} \\ e^{j 6 l \frac{2\pi\theta}{N}} I_{4\times4} \\ e^{j 7 l \frac{2\pi\theta}{N}} I_{4\times4} \end{bmatrix}_{32\times 4},$$

$$v_{l,m} = \begin{bmatrix} e_{1,m} \\ e_{2,m} \\ e_{3,m} \\ e_{4,m} \end{bmatrix}_{4\times 1}$$

may be represented.

In this case, an m-th beamforming vector $e_{k,m}$ may be an m (e.g., m=1, 2, . . . , 8)-th beamforming element of k (e.g., k=1, 2, 3, 4)-th 2×2 array ports (i.e., antenna ports of a 2×2 array), l may be an OAM state, $\vartheta$ may be an angle between adjacent 2×2 arrays based on the center of a ring array, N may be a maximum number of OAM states, and I may be an identity matrix.

In this case, an OAM-applied type-1 codebook may be represented like Equation 6.

$$\varphi_n v_{l,m} \rightarrow [\varphi_n v_{l,m}]_{32\times 1} \quad \text{[Equation 6]}$$

or, assuming $$\varphi_{l,m} = \begin{bmatrix} 1 \\ e^{j l \frac{2\pi\theta}{N}} \\ e^{j 2 l \frac{2\pi\theta}{N}} \\ e^{j 3 l \frac{2\pi\theta}{N}} \\ e^{j 4 l \frac{2\pi\theta}{N}} \\ e^{j 5 l \frac{2\pi\theta}{N}} \\ e^{j 6 l \frac{2\pi\theta}{N}} \\ e^{j 7 l \frac{2\pi\theta}{N}} \end{bmatrix}_{8\times 1},$$

$\varphi_n = \varphi_{l,m} \otimes I_{4\times 4}$ may be represented.

For example, the antenna elements of the array of FIG. 26A may be mapped to the respective matrix elements of Equation 5. The antenna elements of the array of FIG. 26B may be mapped to the respective matrix elements of Equation 6. That is, the elements constituting the antenna array of each of FIGS. 26A and 26B may be mapped to antenna ports, respectively. The codebook (or precoding matrix) of Equation 5 or 6 may also be extended and applied to multiple layers in addition to the one layer. For example, in the case of two layers, the beam index l, m of Equation 5 or 6 may be extended by being substituted with a beam index l',m' and applied to the second layer. And/or a codebook (or precoding matrix) may have a form obtained by multiplying the matrix or an extended matrix of Equation 5 or 6 by a constant value or a scaling value.

The OAM state l may be configured to have a different value for each layer.

A UE may perform a CSI (e.g., PMI) report to a base station based on a codebook of the second embodiment. For an operation of the UE performing the CSI report, reference may be made to the aforementioned description of the CSI-related operation. For example, the UE may report, to the base station, CSI including a PMI based on a codebook of the second embodiment as in FIG. 17.

Figure 27:
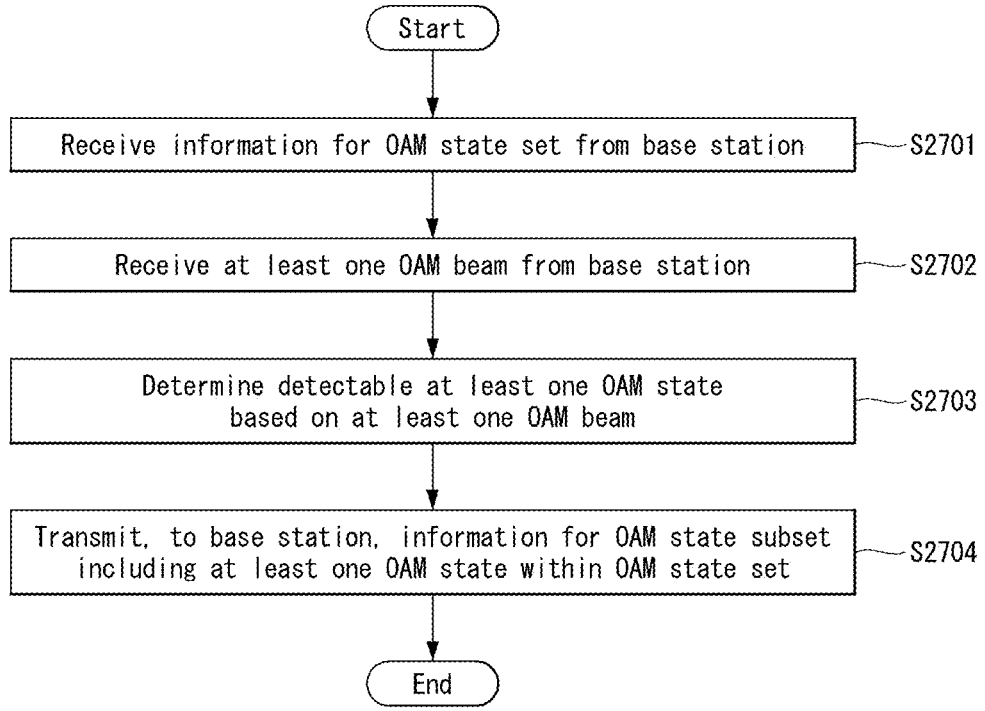
FIG. 27 is a flowchart for describing an operating method of a UE proposed in the present disclosure.

FIG. 27 is a flowchart for describing an operating method of a UE proposed in the present disclosure.

Referring to FIG. 27, first, in step S2701, the UE (100*x*/120 in FIG. 1, 200*a*/200*b* in FIG. 2, 400 in FIG. 4 or 500 in FIG. 5) may receive, from a base station, information for an orbital angular momentum (OAM) state set. The OAM state set may include multiple OAM state subsets, and each of the multiple OAM state subsets may include one or two or more OAM states. That is, information for the OAM state set may be information for grouped OAM states. Each of the multiple OAM state subsets may be a subset including a different OAM state(s).

And/or the OAM state subsets may be a set including L OAM states based on the number of links L or detectable OAM states L as in Table 30. In this case, the UE may be separately configured with L by the base station or may randomly determine L and transmit, to the base station, an OAM state subset (index) including a detectable L OAM state(s). For example, referring to Table 30, if the UE determines OAM states {0,4,6,8} as detectable OAM states, the UE may transmit an OAM state subset 011 to the base station.

And/or multiple OAM state sets may be configured depending on a predefined method. The base station may receive information indicative of one of the multiple OAM state sets. For example, the UE may receive information (e.g., OAM state set index=1) indicative of one OAM state set and use Table 30.

And/or the information for the OAM state set and/or the information indicative of the OAM state set may be received through a higher layer signal, a medium access control-control element (MAC-CE) or downlink control information.

For example, the operation of receiving, by the UE, information for the OAM state set in step S2701 may be implemented by the apparatus of FIGS. 1 to 5. For example, referring to FIG. 2, one or more processors 200*a*/200*b* may control one or more memories 204*a*/204*b* and/or one or more transceivers 206*a*/206*b* in order to receive the information for the OAM state set.

And/or in step S2702, the UE (100*x*/120 in FIG. 1, 200*a*/200*b* in FIG. 2, 400 in FIG. 4 or 500 in FIG. 5) may receive at least one OAM beam from the base station. For example, the OAM beam may be a beam illustrated in FIGS. 19B, 20A, 20C, 21A and/or 21C and/or may be the OAM-modulated OAM beam of FIG. 22A and/or may be the OAM beam of FIGS. 24A to 24D.

Alternatively, the UE may receive at least one OAM signal from the base station. In this case, the OAM signal may mean OAM-modulated data. In this case, the UE may estimate an OAM state through the OAM signal.

For example, the operation of receiving, by the UE, at least one OAM beam in step S2702 may be implemented by the apparatus of FIGS. 1 to 5. Referring to FIG. 2, the one or more processors 200*a*/200*b* may control the one or more memories 204*a*/204*b* and/or the one or more transceivers 206*a*/206*b* in order to receive the at least one OAM beam.

And/or in step S2703, the UE (100*x*/120 in FIG. 1, 200*a*/200*b* in FIG. 2, 400 in FIG. 4 or 500 in FIG. 5) may determine a detectable at least one OAM state based on the at least one OAM beam. For example, the at least one OAM state may be determined based on an OAM component (e.g., $J_z^{EM}$), received energy (e.g., M) and a frequency (e.g., w) of the at least one OAM beam. For example, the UE may compute/determine $$\hat{j} = \frac{w \cdot J_z^{EM}}{M},$$

and may determine an estimable OAM state $\hat{l}$ by computing/determining $\hat{j}$–s. In this case, s=−1 may be fixed. That is, an antenna array of the base station may be an antenna array forming a right-hand circular polarized beam. And/or the right-hand circular polarized beam may be a beam having spin angular momentum (SAM)=−1.

For example, the operation of determining, by the UE, the detectable at least one OAM state in step S2703 may be implemented by the apparatus of FIGS. 1 to 5. Referring to FIG. 2, the one or more processors 200*a*/200*b* may control the one or more memories 204*a*/204*b* and/or the one or more transceivers 206*a*/206*b* in order to determine the detectable at least one OAM state.

And/or in step S2704, the UE (100*x*/120 in FIG. 1, 200*a*/200*b* in FIG. 2, 400 in FIG. 4 or 500 in FIG. 5) may transmit, to the base station, information for an OAM state subset including at least one OAM state within an OAM state set. For example, the UE may determine a detectable OAM state {4,6}, and may transmit information for the OAM state set (e.g., an OAM state subset index 011) based on information for the OAM state set (e.g., Table 30).

For example, the operation of transmitting, by the UE, information for the OAM state subset in step S2704 may be implemented by the apparatus of FIGS. 1 to 5. Referring to FIG. 2, the one or more processors 200*a*/200*b* may control the one or more memories 204*a*/204*b* and/or the one or more transceivers 206*a*/206*b* in order to transmit the information for the OAM state subset. The one or more transceivers 206*a*/206*b* may transmit the information for the OAM state subset.

And/or the OAM state may be an orthogonal OAM state. For example, the UE may receive information for the orthogonal OAM state set. And/or the UE may determine a detectable orthogonal OAM state. And/or the UE may transmit the information for the orthogonal OAM state including an orthogonal OAM state(s).

And/or an antenna array of the base station may be an a×b array by r ring arrays. For example, an a×b array by r ring arrays may be an array antenna deployed as an a×b array structure by using a×b r ring arrays as array elements. In this case, the a×b array structure may be a rectangular/square array structure including transverse a ring arrays and longitudinal b ring arrays. Furthermore, the r ring array may be an array antenna in which r antenna elements are arranged as a circular structure. For example, an antenna array of the base station may be the antenna array of FIG. 26A. That is, an antenna array of the base station may be a form in which 4 arrays 10*a*, 20*a*, 30*a*, and 40*a* are arranged as a 2×2 array and 8 antenna elements are arranged as a ring array in each of the arrays 10*a*, 20*a*, 30*a*, and 40*a*. And/or g1-ports may be applied to the antenna array of the base station. However, g1 may be r×a×b. For example, if an antenna array of the base station includes 2×2 arrays and an element array is composed of 8 ring arrays, 2×2×8=32 antenna ports may be applied (i.e., 32-ports). And/or a value of g1 may be set by the base station. And/or the a×b array by r ring arrays may be based on the type-1 codebook.

For example, if an antenna array of the base station is an 2×2 array by 8 ring arrays, the 2×2 array by 8 ring arrays may be based on the type-1 codebook $[v_{l,m}\varphi_n]_{32\times1}$, and $$v_{l,m} = \begin{bmatrix} e_{1,m}I_{8\times8} \\ e_{2,m}I_{8\times8} \\ e_{3,m}I_{8\times8} \\ e_{4,m}I_{8\times8} \end{bmatrix}_{32\times8},$$

$$\varphi_n = \begin{bmatrix} 1 \\ e^{j1\frac{2\pi\theta}{N}} \\ e^{j2l\frac{2\pi\theta}{N}} \\ e^{j3l\frac{2\pi\theta}{N}} \\ e^{j4l\frac{2\pi\theta}{N}} \\ e^{j5l\frac{2\pi\theta}{N}} \\ e^{j6l\frac{2\pi\theta}{N}} \\ e^{j7l\frac{2\pi\theta}{N}} \end{bmatrix}_{8\times1},$$

$e_{k,m}$ may be an m (e.g., m=1, 2, . . . , 8)-th beamforming element of k (e.g., k=1, 2, 3, 4)-th ring array ports (i.e., antenna ports of a ring array), l may be an OAM state, ϑ may be an angle between adjacent elements based on the center of a single ring array, N may be a maximum number of OAM states, and I may be an identity matrix. Alternatively, N may be antenna elements of a single ring array. In this case, the antenna ports may be mapped to the antenna elements in a 1-to-1 way. A maximum number of OAM states may be previously configured in the UE. The type-1 codebook may also be applied to an a×b array by r ring arrays in addition to the 2×2 array by 8 ring arrays.

And/or the antenna array of the base station may be an r ring array by a×b arrays. For example, the r ring array by a×b arrays may be an array antenna arranged as an r ring array structure by using r a×b arrays as array elements. In this case, the r ring array structure may be an array structure in which the r a×b arrays are circularly arranged. Furthermore, the a×b array may be an array having a rectangle/square form including transverse a antenna elements and longitudinal b antenna elements. For example, an antenna array of the base station may be an antenna array of FIG. 26B. That is, the antenna array of the base station may be a form in which eight 2×2 arrays 10b, 20b, . . . , 80b are arranged as a ring array. And/or g1-ports may be applied to the antenna array of the base station. In this case, g1 may be r×a×b. For example, if the antenna array of the base station includes eight ring arrays and an element array includes a 2×2 ring array, 8×2×2=32 antenna ports may be applied (i.e., 32-ports). And/or a value of g1 may be set by the base station. And/or the r ring array by a×b arrays may be based on the type-1 codebook.

For example, if an antenna array of the base station is an 8 ring array by 2×2 arrays, the 8 ring array by 2×2 arrays may be based on a type-1 codebook $[\varphi_n v_{l,m}]_{32\times1}$, and $$\varphi_n = \begin{bmatrix} 1 \cdot I_{4\times4} \\ e^{j1\frac{2\pi\theta}{N}}I_{4\times4} \\ e^{j2l\frac{2\pi\theta}{N}}I_{4\times4} \\ e^{j3l\frac{2\pi\theta}{N}}I_{4\times4} \\ e^{j4l\frac{2\pi\theta}{N}}I_{4\times4} \\ e^{j5l\frac{2\pi\theta}{N}}I_{4\times4} \\ e^{j6l\frac{2\pi\theta}{N}}I_{4\times4} \\ e^{j7l\frac{2\pi\theta}{N}}I_{4\times4} \end{bmatrix}_{32\times4},$$

$$v_{l,m} = \begin{bmatrix} e_{1,m} \\ e_{2,m} \\ e_{3,m} \\ e_{4,m} \end{bmatrix}_{4\times1}$$

and $e_{k,m}$ may be an m (e.g., m=1, 2, . . . , 8)-th beamforming element of k (e.g., k=1, 2, 3, 4)-th 2×2 array ports (i.e., antenna ports of a 2×2 array), l may be an OAM state, ϑ may be an angle between adjacent 2×2 arrays based on the center of a ring array, N may be a maximum number of OAM states, and I may be an identity matrix. In this case, the antenna ports may be mapped to antenna elements in a 1-to-1 way. A maximum number of OAM states may be previously configured in the UE. The type-1 codebook may also be applied to the r ring array by a×b arrays in addition to the 8 ring array by 2×2 arrays.

The UE and the base station may perform an operation, such as beamforming/CSI reporting, based on the type-1 codebook (or precoding matrix). For example, the UE may report channel state information (CSI) including a precoding matrix indicator (PMI) based on the type-1 codebook. For example, the CSI reporting operation may be performed with reference to the aforementioned CSI-related operation.

The operation of the UE described with reference to FIG. 27 is the same as the operation of the UE (e.g., the first embodiment to the second embodiment) described with reference to FIGS. 1 to 26, and thus other detailed descriptions thereof are omitted.

The aforementioned signaling and operation may be implemented by an apparatus (e.g., FIGS. 1 to 5 or FIGS. 12 to 16) to be described hereinafter. For example, the aforementioned signaling and operation may be processed by the one or more processor of FIGS. 1 to 5. The aforementioned signaling and operation may be stored in a memory in the form of an instruction/program (e.g., an instruction or an executable code) for driving the at least one processor of FIGS. 1 to 5.

For example, an apparatus configured to control a UE in order to transmit a detectable OAM state in a wireless communication system includes at least one processor and at least one memory operably connectable to the at least one processor and storing instructions that perform operations based on being executed by the at least one processor. The operations may include steps of receiving, from a base station, information for an OAM state set, wherein the OAM state set includes multiple OAM state subsets, and each of the multiple OAM state subsets includes one or two or more OAM states, receiving at least one OAM beam from the base station, determining a detectable at least one OAM state based on the at least one OAM beam, and transmitting, to the base station, information for an OAM state subset including the at least one OAM state within the OAM state set.

For another example, in a computer-readable storage medium storing at least one instruction that enables at least one processor to control operations based on being executed by the at least one processor, the operations may include steps of receiving, from a base station, information for an OAM state set, wherein the OAM state set includes multiple OAM state subsets, and each of the multiple OAM state subsets includes one or two or more OAM states, receiving at least one OAM beam from the base station, determining a detectable at least one OAM state based on the at least one OAM beam, and transmitting, to the base station, information for an OAM state subset including the at least one OAM state within the OAM state set.

Figure 28:
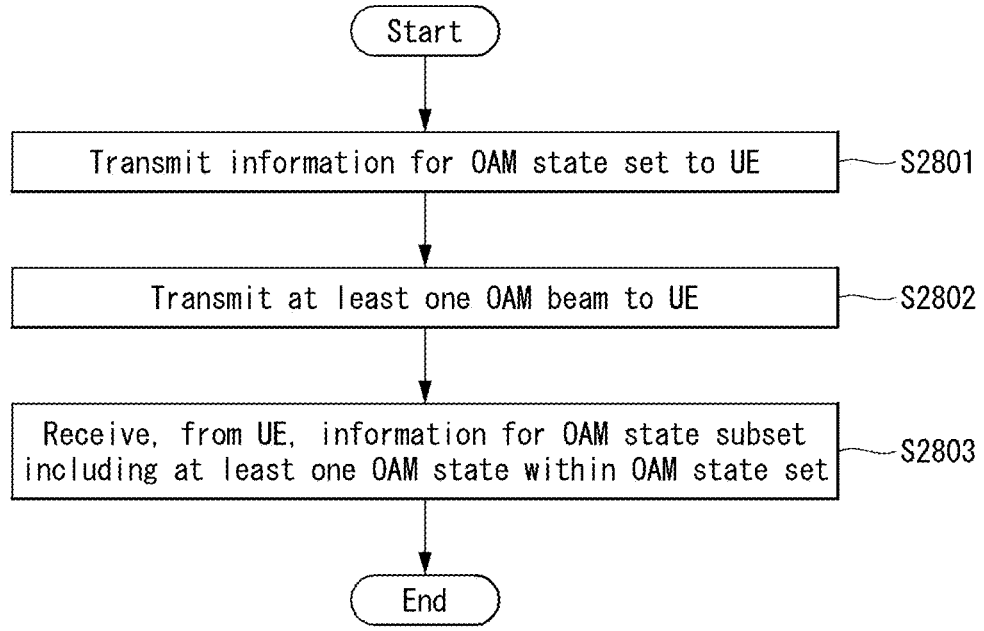
FIG. 28 is a flowchart for describing an operating method of a base station proposed in the present disclosure.

FIG. 28 is a flowchart for describing an operating method of a base station proposed in the present disclosure.

Referring to FIG. 28, first, in step S2801, the base station (100x/120 in FIG. 1, 200a/200b in FIG. 2, 400 in FIG. 4 or 500 in FIG. 5) may transmit information for an orbital angular momentum (OAM) state set to a UE. The OAM state set may include multiple OAM state subsets, and each of the multiple OAM state subsets may include one or two or more OAM states. That is, the information for the OAM state set may be information for grouped OAM states. Each of the multiple OAM state subsets may be a subset including a different OAM state(s).

For example, the OAM state subsets may be a set including L OAM states based on the number of links L or detectable OAM states L as in Table 30. In this case, the UE may be separately configured with L from the base station or may randomly determine L and may transmit, to the base station, an OAM state subset (index) including a detectable L OAM state(s).

For example, referring to Table 30, if the UE determines OAM states {0,4,6,8} as detectable OAM states, the UE may transmit an OAM state subset 011 to a base station.

And/or multiple OAM state sets may be configured according to a predefined method. The base station may receive information indicative of one of the multiple OAM state sets. For example, the UE may receive information indicative of one OAM state set (e.g., OAM state set index=1) and use Table 30.

And/or the information for the OAM state set and/or the information indicative of the OAM state set may be transmitted through a higher layer signal, a medium access control-control element (MAC-CE) or downlink control information.

For example, the operation of transmitting, by the base station, the information for the OAM state set in step S2801 may be implemented by the apparatus of FIGS. 1 to 5. For example, referring to FIG. 2, the one or more processors 200a/200b may control the one or more memories 204a/204b and/or the one or more transceivers 206a/206b in order to transmit the information for the OAM state set.

And/or in step S2802, the base station (100x/120 in FIG. 1, 200a/200b in FIG. 2, 400 in FIG. 4 or 500 in FIG. 5) may transmit at least one OAM beam. For example, the OAM beam may be a beam illustrated in FIGS. 19B, 20A, 20C, 21A and/or 21C and/or may be the OAM-modulated OAM beam of FIG. 22A and/or may be the OAM beam of FIGS. 24A to 24D.

And/or the base station may transmit the at least one OAM signal to the UE. In this case, the OAM signal may mean OAM-modulated data. In this case, the UE may estimate an OAM state through the OAM signal.

The UE may determine a detectable at least one OAM state based on the at least one OAM beam. For example, the at least one OAM state may be determined based on an OAM component (e.g., $J_Z^{EM}$), received energy (e.g., M) and a frequency (e.g., w) of the at least one OAM beam. For example, the UE may compute/determine $$\hat{j} = \frac{w \cdot J_z^{EM}}{M},$$

and may determine an estimable OAM state $\hat{l}$ by computing/determining $\hat{j}-s$. In this case, $s=-1$ may be fixed. That is, an antenna array of the base station may be an antenna array forming a right-hand circular polarized beam. And/or the right-hand circular polarized beam may be a beam having spin angular momentum (SAM)=−1.

For example, the operation of transmitting, by the base station, the at least one OAM beam in step S2802 may be implemented by the apparatus of FIGS. 1 to 5. Referring to FIG. 2, the one or more processors 200a/200b may control the one or more memories 204a/204b and/or the one or more transceivers 206a/206b in order to transmit the at least one OAM beam.

And/or in step S2803, the base station (100x/120 in FIG. 1, 200a/200b in FIG. 2, 400 in FIG. 4 or 500 in FIG. 5) may receive, from the UE, information for an OAM state subset including at least one OAM state within an OAM state set. For example, the UE may determine a detectable OAM state {4,6}, and may transmit information for an OAM state set (e.g., an OAM state subset index 011) based on the information for the OAM state set (e.g., Table 30).

For example, the operation of receiving, by the base station, the information for an OAM state subset in step S2803 may be implemented by the apparatus of FIGS. 1 to 5. Referring to FIG. 2, the one or more processors 200a/200b may control the one or more memories 204a/204b and/or the one or more transceivers 206a/206b in order to receive the information for the OAM state subset. The one or more transceivers 206a/206b may transmit the information for the OAM state subset.

And/or the OAM state may be an orthogonal OAM state. For example, the base station may transmit information for an orthogonal OAM state set. And/or the UE may determine a detectable orthogonal OAM state. And/or the base station may receive the information for the orthogonal OAM state including an orthogonal OAM state(s).

And/or an antenna array of the base station may be an a×b array by r ring arrays. For example, an a×b array by r ring arrays may be an array antenna deployed as an a×b array structure by using a×b r ring arrays as array elements. In this case, the a×b array structure may be a rectangular/square array structure including transverse a ring arrays and longitudinal b ring arrays. Furthermore, the r ring array may be an array antenna in which r antenna elements are arranged as a circular structure. For example, an antenna array of the base station may be the antenna array of FIG. 26A. That is, an antenna array of the base station may be a form in which 4 arrays 10a, 20a, 30a, and 40a are arranged as a 2×2 array and 8 antenna elements are arranged as a ring array in each of the arrays 10a, 20a, 30a, and 40a. And/or g1-ports may be applied to the antenna array of the base station. However, g1 may be r×a×b. For example, if an antenna array of the base station includes 2×2 arrays and an element array is composed of 8 ring arrays, 2×2×8=32 antenna ports may be applied (i.e., 32-ports). And/or a value of g1 may be set by the base station. And/or the a×b array by r ring arrays may be based on the type-1 codebook.

For example, if an antenna array of the base station is an 2×2 array by 8 ring arrays, the 2×2 array by 8 ring arrays may be based on the type-1 codebook $[v_{l,m}\varphi_n]_{32\times 1}$, and $$v_{l,m} = \begin{bmatrix} e_{1,m}I_{8\times 8} \\ e_{2,m}I_{8\times 8} \\ e_{3,m}I_{8\times 8} \\ e_{4,m}I_{8\times 8} \end{bmatrix}_{32\times 8},$$

$$\varphi_n = \begin{bmatrix} 1 \\ e^{j1\frac{2\pi\theta}{N}} \\ e^{j2\frac{2\pi\theta}{N}} \\ e^{j3\frac{2\pi\theta}{N}} \\ e^{j4\frac{2\pi\theta}{N}} \\ e^{j5\frac{2\pi\theta}{N}} \\ e^{j6\frac{2\pi\theta}{N}} \\ e^{j7\frac{2\pi\theta}{N}} \end{bmatrix}_{8\times 1},$$

$e_{k,m}$ may be an m (e.g., m=1, 2, . . . , 8)-th beamforming element of k (e.g., k=1, 2, 3, 4)-th ring array ports (i.e., antenna ports of a ring array), l may be an OAM state, ϑ may be an angle between adjacent elements based on the center of a single ring array, N may be a maximum number of OAM states, and I may be an identity matrix. Alternatively, N may be antenna elements of a single ring array. In this case, the antenna ports may be mapped to the antenna elements in a 1-to-1 way. A maximum number of OAM states may be previously configured in the UE. The type-1 codebook may also be applied to an a×b array by r ring arrays in addition to the 2×2 array by 8 ring arrays.

And/or the antenna array of the base station may be an r ring array by a×b arrays. For example, the r ring array by a×b arrays may be an array antenna arranged as an r ring array structure by using r a×b arrays as array elements. In this case, the r ring array structure may be an array structure in which the r a×b arrays are circularly arranged. Furthermore, the a×b array may be an array having a rectangle/square form including transverse a antenna elements and longitudinal b antenna elements. For example, an antenna array of the base station may be an antenna array of FIG. 26B. That is, the antenna array of the base station may be a form in which eight 2×2 arrays 10b, 20b, . . . ,80b are arranged as a ring array. And/or g1-ports may be applied to the antenna array of the base station. In this case, g1 may be r×a×b. For example, if the antenna array of the base station includes eight ring arrays and an element array includes a 2×2 ring array, 8×2×2=32 antenna ports may be applied (i.e., 32-ports). And/or a value of g1 may be set by the base station. And/or the r ring array by a×b arrays may be based on the type-1 codebook.

For example, if an antenna array of the base station is an 8 ring array by 2×2 arrays, the 8 ring array by 2×2 arrays may be based on a type-1 codebook $[\varphi_n v_{l,m}]_{32\times 1}$, and $$\varphi_n = \begin{bmatrix} 1 \cdot I_{4\times 4} \\ e^{j1\frac{2\pi\theta}{N}}I_{4\times 4} \\ e^{j2\frac{2\pi\theta}{N}}I_{4\times 4} \\ e^{j3\frac{2\pi\theta}{N}}I_{4\times 4} \\ e^{j4\frac{2\pi\theta}{N}}I_{4\times 4} \\ e^{j5\frac{2\pi\theta}{N}}I_{4\times 4} \\ e^{j6\frac{2\pi\theta}{N}}I_{4\times 4} \\ e^{j7\frac{2\pi\theta}{N}}I_{4\times 4} \end{bmatrix}_{32\times 4},$$

$$v_{l,m} = \begin{bmatrix} e_{1,m} \\ e_{2,m} \\ e_{3,m} \\ e_{4,m} \end{bmatrix}_{4\times 1},$$

$e_{k,m}$ may be an m (e.g., m=1, 2, . . . , 8)-th beamforming element of k (e.g., k=1, 2, 3, 4)-th 2×2 array ports (i.e., antenna ports of a 2×2 array), l may be an OAM state, ϑ may be an angle between adjacent 2×2 arrays based on the center of a ring array, N may be a maximum number of OAM states, and I may be an identity matrix. In this case, the antenna ports may be mapped to antenna elements in a 1-to-1 way. A maximum number of OAM states may be previously configured in the UE. The type-1 codebook may also be applied to the r ring array by a×b arrays in addition to the 8 ring array by 2×2 arrays.

The UE and the base station may perform an operation, such as beamforming/CSI reporting, based on the type-1 codebook (or precoding matrix). For example, the UE may report channel state information (CSI) including a precoding matrix indicator (PMI) based on the type-1 codebook. For example, the CSI reporting operation may be performed with reference to the aforementioned CSI-related operation.

The operation of the UE described with reference to FIG. 27 is the same as the operation of the UE (e.g., the first embodiment to the second embodiment) described with reference to FIGS. 1 to 26, and thus other detailed descriptions thereof are omitted.

The aforementioned signaling and operation may be implemented by an apparatus (e.g., FIGS. 1 to 5 or FIGS. 12 to 16) to be described hereinafter. For example, the aforementioned signaling and operation may be processed by the one or more processor of FIGS. 1 to 5. The aforementioned signaling and operation may be stored in a memory in the form of an instruction/program (e.g., an instruction or an executable code) for driving the at least one processor of FIGS. 1 to 5.

For example, an apparatus configured to control a base station in order to receive a detectable OAM state in a wireless communication system includes at least one processor and at least one memory operably connectable to the at least one processor and storing instructions that perform operations based on being executed by the at least one processor. The operations may include steps of transmitting, to a user equipment (UE), information for an OAM state set, wherein the OAM state set includes multiple OAM state subsets, and each of the multiple OAM state subsets includes one or two or more OAM states, transmitting at least one OAM beam to the UE, wherein a detectable at least one OAM state is determined based on the at least one OAM beam, and receiving, from the UE, information for an OAM state subset including the at least one OAM state within the OAM state set.

For another example, in a computer-readable storage medium storing at least one instruction that enables at least one processor to control operations based on being executed by the at least one processor, the operations may include steps of transmitting, to a user equipment (UE), information for an OAM state set, wherein the OAM state set includes multiple OAM state subsets, and each of the multiple OAM state subsets includes one or two or more OAM states, transmitting at least one OAM beam to the UE, wherein a detectable at least one OAM state is determined based on the at least one OAM beam, and receiving, from the UE, information for an OAM state subset including the at least one OAM state within the OAM state set.

In this case, a wireless communication technology implemented in the wireless device 200a, 200b of the present disclosure may include Narrowband Internet of Things for low energy communication in addition to LTE, NR and 6G. In this case, for example, the NB-IoT technology may be an example of a Low Power Wide Area Network (LPWAN) technology, and may be implemented by standards, such as LTE Cat NB1 and/or LTE Cat NB2, and the present disclosure is not limited to the aforementioned names. Additionally or alternatively, a wireless communication technology implemented in a wireless device (XXX, YYY) of the present disclosure may perform communication based on the LTE-M technology. In this case, for example, the LTE-M technology may be an example of the LPWAN technology and may be called various names, such as enhanced Machine Type Communication (eMTC). For example, the LTE-M technology may be implemented by at least any one of various standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/ or 7) LTE M, and the present disclosure is not limited to the aforementioned names. Additionally or alternatively, a wireless communication technology implemented in a wireless device (XXX, YYY) of the present disclosure may include at least any one of ZigBee, Bluetooth and a Low Power Wide Area Network (LPWAN) in which low energy communication is considered, and the present disclosure is not limited to the aforementioned names. For example, the ZigBee technology may generate a personal area networks (PAN) related to small/low-power digital communication based on various standards, such as IEEE 802.15.4, and may be called various names.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means. It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

Although the method of transmitting and receiving information for OAM state subset in the wireless communication system of the present disclosure has been described in connection with examples in which it applies to 3GPP LTE/LTE-A system, 5G system (new RAT systems), and 6G/Beyond 6G systems, the method is also applicable to other various wireless communication systems.

What is claimed is:

1. A method of transmitting a detectable orbital angular momentum (OAM) state in a wireless communication system, the method performed by a user equipment (UE) comprising:
   receiving, from a base station, information for an OAM state set, wherein the OAM state set includes multiple OAM state subsets, and each of the multiple OAM state subsets includes one or two or more OAM states;
   receiving at least one OAM beam from the base station;
   determining a detectable at least one OAM state based on the at least one OAM beam; and
   transmitting, to the base station, information for an OAM state subset including the at least one OAM state within the OAM state set.

2. The method of claim 1,
   wherein the information for the OAM state set is received through a higher layer signal, a medium access control-control element (MAC-CE), or downlink control information.

3. The method of claim 1,
   wherein the at least one OAM state is determined based on an OAM component, received energy, and a frequency of the at least one OAM beam.

4. The method of claim 1,
   wherein the OAM state is an orthogonal OAM state.

5. The method of claim 1,
   wherein an antenna array of the base station is an antenna array forming a right-hand circular polarized beam.

6. The method of claim 5,
   wherein the right-hand circular polarized beam is a beam having spin angular momentum (SAM)=−1.

7. The method of claim 1,
   wherein an antenna array of the base station is an a×b array by r ring arrays.

8. The method of claim 7, wherein the a×b array by r ring arrays is based on a type-1 codebook $[v_{l,m}\varphi_n]_{32\times1}$, and wherein $$v_{l,m} = \begin{bmatrix} e_{1,m}I_{8\times8} \\ e_{2,m}I_{8\times8} \\ e_{3,m}I_{8\times8} \\ e_{4,m}I_{8\times8} \end{bmatrix}_{32\times8},$$

$$\varphi_n = \begin{bmatrix} 1 \\ e^{j1\frac{2\pi\theta}{N}} \\ e^{j2l\frac{2\pi\theta}{N}} \\ e^{j3l\frac{2\pi\theta}{N}} \\ e^{j4l\frac{2\pi\theta}{N}} \\ e^{j5l\frac{2\pi\theta}{N}} \\ e^{j6l\frac{2\pi\theta}{N}} \\ e^{j7l\frac{2\pi\theta}{N}} \end{bmatrix}_{8\times1},$$

$e_{k,m}$ is an m-th beamforming element of k-th ring array ports, l is an OAM state, ϑ is an angle between adjacent elements based on a center of a single ring array, N is a maximum number of OAM states, and I is an identity matrix.

9. The method of claim 1, wherein an antenna array of the base station is an r ring array by a×b arrays.

10. The method of claim 9, wherein the r ring array by a×b arrays is based on a type-1 codebook $[\varphi_n v_{l,m}]_{32\times1}$, and wherein $$\varphi_n = \begin{bmatrix} 1 \cdot I_{4\times4} \\ e^{j1\frac{2\pi\theta}{N}} I_{4\times4} \\ e^{j2l\frac{2\pi\theta}{N}} I_{4\times4} \\ e^{j3l\frac{2\pi\theta}{N}} I_{4\times4} \\ e^{j4l\frac{2\pi\theta}{N}} I_{4\times4} \\ e^{j5l\frac{2\pi\theta}{N}} I_{4\times4} \\ e^{j6l\frac{2\pi\theta}{N}} I_{4\times4} \\ e^{j7l\frac{2\pi\theta}{N}} I_{4\times4} \end{bmatrix}_{32\times4},$$

$$v_{l,m} = \begin{bmatrix} e_{1,m} \\ e_{2,m} \\ e_{3,m} \\ e_{4,m} \end{bmatrix}_{4\times1},$$

$e_{k,m}$ is an m-th beamforming element of k-th a×b array ports, l is an OAM state, ϑ is an angle between adjacent a×b arrays based on a center of a ring array, N is a maximum number of OAM states, and I is an identity matrix.

11. A user equipment (UE) configured to transmit a detectable orbital angular momentum (OAM) state in a wireless communication system, the UE comprising:

at least one transceiver;

at least one processor; and at least one memory operably connectable to the at least one processor and storing instructions that, based on being executed by the at least one processor, perform operations comprising:

receiving, from a base station, information for an OAM state set, wherein the OAM state set includes multiple OAM state subsets, and each of the multiple OAM state subsets includes one or two or more OAM states;

receiving at least one OAM beam from the base station;

determining a detectable at least one OAM state based on the at least one OAM beam; and transmitting, to the base station, information for an OAM state subset including the at least one OAM state within the OAM state set.

12. The UE of claim 11, wherein the at least one OAM state is determined based on an OAM component, received energy, and a frequency of the at least one OAM beam.

13. The UE of claim 11, wherein an antenna array of the base station is an antenna array forming a right-hand circular polarized beam.

14. The UE of claim 11, wherein an antenna array of the base station is an a×b array by r ring arrays, wherein the a×b array by r ring arrays is based on a type-1 codebook $[v_{l,m}\varphi_n]_{32\times1}$, and wherein $$v_{l,m} = \begin{bmatrix} e_{1,m}I_{8\times8} \\ e_{2,m}I_{8\times8} \\ e_{3,m}I_{8\times8} \\ e_{4,m}I_{8\times8} \end{bmatrix}_{32\times8},$$

$$\varphi_n = \begin{bmatrix} 1 \\ e^{j1\frac{2\pi\theta}{N}} \\ e^{j2l\frac{2\pi\theta}{N}} \\ e^{j3l\frac{2\pi\theta}{N}} \\ e^{j4l\frac{2\pi\theta}{N}} \\ e^{j5l\frac{2\pi\theta}{N}} \\ e^{j6l\frac{2\pi\theta}{N}} \\ e^{j7l\frac{2\pi\theta}{N}} \end{bmatrix}_{8\times1},$$

$e_{k,m}$ is an m-th beamforming element of k-th ring array ports, l is an OAM state, ϑ is an angle between adjacent elements based on a center of a single ring array, N is a maximum number of OAM states, and I is an identity matrix.

15. The UE of claim 11, wherein an antenna array of the base station is an r ring array by a×b arrays, wherein the r ring array by a×b arrays is based on a type-1 codebook $[\varphi_n v_{l,m}]_{32\times1}$, and wherein $$\varphi_n = \begin{bmatrix} 1 \cdot I_{4\times 4} \\ e^{j1\frac{2\pi\theta}{N}} I_{4\times 4} \\ e^{j2l\frac{2\pi\theta}{N}} I_{4\times 4} \\ e^{j3l\frac{2\pi\theta}{N}} I_{4\times 4} \\ e^{j4l\frac{2\pi\theta}{N}} I_{4\times 4} \\ e^{j5l\frac{2\pi\theta}{N}} I_{4\times 4} \\ e^{j6l\frac{2\pi\theta}{N}} I_{4\times 4} \\ e^{j7l\frac{2\pi\theta}{N}} I_{4\times 4} \end{bmatrix}_{32\times 4},$$

$$v_{l,m} = \begin{bmatrix} e_{1,m} \\ e_{2,m} \\ e_{3,m} \\ e_{4,m} \end{bmatrix}_{4\times 1},$$

$e_{k,m}$ is an m-th beamforming element of k-th a×b array ports, l is an OAM state, $\vartheta$ is an angle between adjacent a×b arrays based on a center of a ring array, N is a maximum number of OAM states, and I is an identity matrix.

16. A base station configured to receive a detectable orbital angular momentum (OAM) state in a wireless communication system, the base station comprising:
at least one transceiver;
at least one processor; and
at least one memory operably connectable to the at least one processor and storing instructions that, based on being executed by the at least one processor, perform operations comprising:
transmitting, to a user equipment (UE), information for an OAM state set, wherein the OAM state set includes multiple OAM state subsets, and each of the multiple OAM state subsets includes one or two or more OAM states;
transmitting at least one OAM beam to the UE, wherein a detectable at least one OAM state is determined based on the at least one OAM beam; and
receiving, from the UE, information for an OAM state subset including the at least one OAM state within the OAM state set.

17. The base station of claim 16,
wherein the at least one OAM state is determined based on an OAM component, received energy, and a frequency of the at least one OAM beam.

18. The base station of claim 16,
wherein an antenna array of the base station is an antenna array forming a right-hand circular polarized beam.

19. The base station of claim 16,
wherein an antenna array of the base station is an a×b array by r ring arrays,
wherein the a×b array by r ring arrays is based on a type-1 codebook $[v_{l,m}\varphi_n]_{32\times 1}$, and wherein $$v_{l,m} = \begin{bmatrix} e_{1,m} I_{8\times 8} \\ e_{2,m} I_{8\times 8} \\ e_{3,m} I_{8\times 8} \\ e_{4,m} I_{8\times 8} \end{bmatrix}_{32\times 8},$$

$$\varphi_n = \begin{bmatrix} 1 \\ e^{j1\frac{2\pi\theta}{N}} \\ e^{j2l\frac{2\pi\theta}{N}} \\ e^{j3l\frac{2\pi\theta}{N}} \\ e^{j4l\frac{2\pi\theta}{N}} \\ e^{j5l\frac{2\pi\theta}{N}} \\ e^{j6l\frac{2\pi\theta}{N}} \\ e^{j7l\frac{2\pi\theta}{N}} \end{bmatrix}_{8\times 1},$$

$e_{k,m}$ is an m-th beamforming element of k-th ring array ports, l is an OAM state, $\vartheta$ is an angle between adjacent elements based on a center of a single ring array, N is a maximum number of OAM states, and I is an identity matrix.

20. The base station of claim 16,
wherein an antenna array of the base station is an r ring array by a×b arrays,
wherein the r ring array by a×b arrays is based on a type-1 codebook $[\varphi_n v_{l,m}]_{32\times 1}$, and
wherein $$\varphi_n = \begin{bmatrix} 1 \cdot I_{4\times 4} \\ e^{j1\frac{2\pi\theta}{N}} I_{4\times 4} \\ e^{j2l\frac{2\pi\theta}{N}} I_{4\times 4} \\ e^{j3l\frac{2\pi\theta}{N}} I_{4\times 4} \\ e^{j4l\frac{2\pi\theta}{N}} I_{4\times 4} \\ e^{j5l\frac{2\pi\theta}{N}} I_{4\times 4} \\ e^{j6l\frac{2\pi\theta}{N}} I_{4\times 4} \\ e^{j7l\frac{2\pi\theta}{N}} I_{4\times 4} \end{bmatrix}_{32\times 4},$$

$$v_{l,m} = \begin{bmatrix} e_{1,m} \\ e_{2,m} \\ e_{3,m} \\ e_{4,m} \end{bmatrix}_{4\times 1},$$

$e_{k,m}$ is an m-th beamforming element of k-th a×b array ports, l is an OAM state, $\vartheta$ is an angle between adjacent a×b arrays based on a center of a ring array, N is a maximum number of OAM states, and I is an identity matrix.

* * * * *